(12) United States Patent
Rostami-Hesarsorkh et al.

(10) Patent No.: US 10,200,390 B2
(45) Date of Patent: *Feb. 5, 2019

(54) AUTOMATICALLY DETERMINING WHETHER MALWARE SAMPLES ARE SIMILAR

(71) Applicant: Palo Alto Networks, Inc., Santa Clara, CA (US)

(72) Inventors: Shadi Rostami-Hesarsorkh, Los Altos, CA (US); Sudarshan Vasudevan, Mountain View, CA (US); Farshad Rostamabadi, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/056,980

(22) Filed: Feb. 29, 2016

(65) Prior Publication Data

US 2017/0251003 A1 Aug. 31, 2017

(51) Int. Cl.
| | |
|---|---|
| *H04L 29/06* | (2006.01) |
| *G06F 21/56* | (2013.01) |
| *G06N 5/02* | (2006.01) |

(52) U.S. Cl.
CPC ........ *H04L 63/1425* (2013.01); *G06F 21/562* (2013.01); *G06F 21/566* (2013.01); *G06N 5/02* (2013.01); *G06F 2221/034* (2013.01)

(58) Field of Classification Search
CPC ............. H04L 63/1425; H04L 63/0254; H04L 63/1416; G06F 21/56; G06F 21/566; G06F 21/562; G06F 2221/034; G06N 99/005; G06N 5/02
See application file for complete search history.

(56) References Cited

U.S. PATENT DOCUMENTS

| | | | |
|---|---|---|---|
| 8,032,489 B2 | 10/2011 | Villella | |
| 8,555,385 B1 | 10/2013 | Bhatkar | |
| 8,955,120 B2 | 2/2015 | Antonov | |
| 9,197,665 B1 * | 11/2015 | Cabot | .................. G06F 21/564 |
| 9,245,114 B2 | 1/2016 | Thomas | |
| 9,838,410 B2 | 12/2017 | Muddu | |

(Continued)

OTHER PUBLICATIONS

Bailey et al., Automated Classification and Analysis of Internet Malware, Electrical Engineering and Computer Science Department, University of Michigan, Apr. 26, 2007.

(Continued)

*Primary Examiner* — Joseph P Hirl
*Assistant Examiner* — J. Brant Murphy
(74) *Attorney, Agent, or Firm* — Van Pelt, Yi & James LLP

(57) ABSTRACT

Techniques for automatically determining whether malware samples are similar are disclosed. In some embodiments, a system, process, and/or computer program product for automatically determining whether malware samples are similar includes receiving a plurality of samples for performing automated malware analysis to generate log files based on the automated malware analysis; comparing the log files based on the automated malware analysis; determining whether any of the plurality of samples are similar based on the comparison of the log files based on the automated malware analysis; and performing an action based on determining that at least two samples are similar.

20 Claims, 32 Drawing Sheets

(56) References Cited

U.S. PATENT DOCUMENTS

| | | | |
|---|---|---|---|
| 2011/0041179 A1* | 2/2011 | St Hlberg | G06F 21/566 726/23 |
| 2011/0209196 A1 | 8/2011 | Kennedy | |
| 2012/0079596 A1* | 3/2012 | Thomas | G06F 21/55 726/24 |
| 2012/0304244 A1* | 11/2012 | Xie | G06F 21/00 726/1 |
| 2013/0091571 A1* | 4/2013 | Lu | G06F 21/563 726/23 |
| 2013/0097706 A1* | 4/2013 | Titonis | G06F 21/56 726/24 |
| 2013/0263266 A1* | 10/2013 | Bojaxhi | H04L 63/145 726/23 |
| 2014/0047544 A1 | 2/2014 | Jakobsson | |
| 2014/0201208 A1* | 7/2014 | Satish | G06F 21/564 707/737 |
| 2015/0244730 A1* | 8/2015 | Vu | G06F 21/561 726/24 |
| 2015/0244733 A1* | 8/2015 | Mohaisen | H04L 63/1425 726/23 |
| 2015/0295945 A1* | 10/2015 | Canzanese, Jr. | G06F 9/45545 726/23 |
| 2016/0127388 A1* | 5/2016 | Cabot | G06F 21/564 726/23 |
| 2016/0337388 A1* | 11/2016 | Hu | H04L 63/1425 |
| 2017/0063886 A1 | 3/2017 | Muddu | |
| 2017/0063904 A1 | 3/2017 | Muddu | |
| 2017/0093771 A1* | 3/2017 | Gatti | H04L 51/12 |

OTHER PUBLICATIONS

Jang et al., BitShred: Feature Hashing Malware for Scalable Triage and Semantic Analysis, Oct. 2011.

Kinable et al., Malware Classification based on Call Graph Clustering, Aalto University, Department of Information and Computer Science, Aug. 27, 2010.

Perdisci et al., Behavior Clustering of HTTP-Based Malware and Signature Generation Using Malicious Network Traces, College of Computing, Georgia Institute of Technology, Apr. 2010.

Ye et al., Automatic Malware Categorization Using Cluster Ensemble, Proceedings of the 16th ACM SIGKDD international conference on Knowledge discovery and data mining, Jul. 2010.

Author Unknown, About VirusTotal, downloaded from https_www.virustotal.com_en_about on Feb. 17, 2016.

Author Unknown, Advanced features & tools, VirusTotal, downloaded from https_www.virustotal.com_en_documentation on Feb. 17, 2016.

Author Unknown, File statistics during last 7 days, VirusTotal, downloaded from https_www.virustotal.com_en_statistics on Feb. 17, 2016.

Author Unknown, Frequently Asked Questions, VirusTotal, downloaded from https_www.virustotal.com_en_faq on Feb. 17, 2016.

Canto et al., Large scale malware collection: lessons learned, downloaded from http_www.iseclab.netpaperssrds.pdf on Feb. 17, 2016.

\* cited by examiner

Search

Match [All ▼] of the following conditions:

[Email Subject ▼] [contains ▼] [test]

Match [Any ▼] of the following conditions:

[WildFire Verdict ▼] [is ▼] [Malware ▼]

[WildFire Verdict ▼] [is ▼] [Grayware ▼]

Match [All ▼] of the following conditions:

[First Seen ▼] [is before ▼] [March 13, 2015 | 12:00:00am ▼]

710 — (points to first group)
712 — (points to third group)

FIG. 7B

| Samples | Sessions | Statistics | Domain, URL & IP Address Information |

Found 2 sessions in 6.3 seconds                    ↕ Sort by: Time   ▦ Choose Columns

| Time | Application Name | Company Name | Destination Country | Destination Port | Email Recipient Address | File Name |
|---|---|---|---|---|---|---|
| 2014-10-29 9:59:53am | Manual Upload | Palo Alto Networks | | | | BlackPOS-8a6af8587adf0e743871ad6b9889428b5f75b86 |
| 2014-03-14 11:11:12am | Manual | Palo Alto | | | | pos.000 |

Session u_46407...    904    906

| File Analysis | Related Sessions |

Session Summary
Time        10/29/2014 9:59:53am
Application    Manual Upload
Filename     BlackPOS-8a6af8587adf0e743871ad6b9889428b5f75b86b.dangerous ▶
SHA256      74fe8c68d878cc9699a2781be515bb003931ffa2ad21dc0c2c48eb91cab
Manually Uploaded  Yes ↗ Add to Search

| PAN-DB Categorization 1110 | |
|---|---|
| URL | Category |
| zzux.com | dynamic-dns |
| www.wordpress.zzux.com | malware |
| redirectecs.zzux.com | phishing |
| righi.zzux.com | malware |
| ptliudbjdp.zzux.com | computer-and-internet-info |
| goodluck.zzux.com | malware |
| eu.zzux.com | malware |
| aofublsanf.zzux.com | malware |

Passive DNS History 1112

| Request | Response | Count | Type | First Seen | Last Seen |
|---|---|---|---|---|---|
| zzux.com | 209.208.4.62 | 11,676 | A | 2013-12-20 1:17:03am | 2014-09-23 11:58:10pm |
| zzux.com | ns1.changeip.org | 12,461 | NS | 2013-12-19 11:06:14pm | 2014-09-24 3:55:30am |
| zzux.com | ns2.changeip.org | 12,461 | NS | 2013-12-19 11:06:14pm | 2014-09-24 3:55:30am |
| zzux.com | ns3.changeip.org | 12,349 | NS | 2013-12-19 11:06:14pm | 2014-09-24 3:55:30am |

FIG. 11B

| Alerts Log | Settings | | | | |
|---|---|---|---|---|---|
| Alert On Tag Type | | Action | My Samples | Public Samples | |
| Unit 42 | | None ▼ | ☐ | ☐ | Add Exception |
| Public | | None ▼ | ☐ | ☐ | Add Exception |
| Private | | None ▼ | ☐ | ☐ | Add Exception |
| | | | | | |
| Alert Actions | Type | Endpoint | | | Actions |
| AutoFocus-alerts | Email | name@company.com | | | ☐ 🗑 |
| none | None | | | | |
| Threat-Feed-Alert | HTTPS | https://example.com | | | ☐ 🗑 |
| ⊕ Add Alert Action | | | | | |

1202 (Alert On Tag Type section)
1204 (Alert Actions section)

FIG. 12

| Tag Detail | 1402 | 1404 | 1406 | | | 1410 |
|---|---|---|---|---|---|---|

🔍 example-tag  🔒 Private | 🔓 Public Anonymously ▶ | 👍 Vote Up | 👎 Vote Down | ⚠ Report Make Tag Public ← 1408

- Scope Public
- # Samples 5,114
- Last Hit 14 days ago on 2015-07-22 3:00:18am
- Votes 👍 0  👎 0

| Status | Hits | Last Hit | Definition | Actions |
|---|---|---|---|---|
| Enabled | 5,114 | 2015-07-22 3:00:18am | Match all of the following conditions:<br>WildFire Verdict is Malware<br>File Activity contains sample.exe, Write, Documents and Settings\Administrator\Local Settings\Temp\log_file.log, -1<br>User Agent Fragments is Windows NT 6.2 | 🔍 🗑 ～1412 |

0 Comments

Add a comment

FIG. 14

| WildFire Dynamic Analysis | | | | | Windows 7 | | Windows XP |
|---|---|---|---|---|---|---|---|
| ▲ Observed Behavior | | | | | 5 | | 9 |
| ▼ Process Activity | | | | | 3△ 7! 28 | | 3△ 14! 28 |
| 1510 | #B | #M | #G | Parent Process | Action | Parameters | |
| ▶ | 0 | 2 | 0 | sample.exe | createProcessInternalW | <Null>, cmd /c net start POSWDS | |
| ▶ △ | 0 | 2 | 0 | cmd | createProcessInternalW | <Null>, Windows\system32\net.exe, net start POSWDS | |
| ▶ △ | 0 | 2 | 0 | net.exe | createProcessInternalW | <Null>, Windows\system32\net1 start POSWDS | |
| ▶ ! | 4k | 0.2M | 263 | net1 | LoadLibraryExW | API-MS-WIN-Service-winsvc-L1-1-0.dll,, 0 | |
| ▶ ! | 6k | 0.3M | 4k | net.exe | ZwTerminateProcess | net.exe, | |
| ▶ ! | 8k | 0.3M | 6k | net1 | LoadLibraryExW | API-MS-WIN-Service-Management-L1-1-0.dll,, 0 | |

FIG. 15B

▼ DNS Activity 4 matches    4Q   4△    4

| | #B | #M | #G | Query | Response |
|---|---|---|---|---|---|
| ▷ | 3 | 29 | 0 | zzux.com ▷ | ns1.changeip.org |
| ▷ | 3 | 29 | 0 | zzux.com | ns3.changeip.org |
| ▷ | 3 | 29 | 0 | zzux.com | ns2.changeip.org |
| ▷ | 0 | 3 | 0 | goodluck.zzux.com | 176.31.76.56 |

Add to search

Domain and URL info.... — 1530

FIG. 15D

AUTOMATICALLY DETERMINING WHETHER MALWARE SAMPLES ARE SIMILAR

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 7A-7B are screen shots of a search editor of an interface for the malware analysis platform for threat intelligence made actionable in accordance with some embodiments.

FIG. 9 is a screen shot of a sessions search view of a search editor of an interface for the malware analysis platform for threat intelligence made actionable in accordance with some embodiments.

FIGS. 11A-11B are screen shots of a domain, URL, and IP address information search view of a search editor of an interface for the malware analysis platform for threat intelligence made actionable in accordance with some embodiments.

FIG. 12 is a screen shot of an alerts screen of an interface for the malware analysis platform for threat intelligence made actionable in accordance with some embodiments.

FIG. 14 is a screen shot of a tag detail screen of an interface for the malware analysis platform for threat intelligence made actionable in accordance with some embodiments.

FIGS. 15A-D are screen shots of an interface for viewing and/or performing actions based on artifacts utilizing the malware analysis platform for threat intelligence made actionable in accordance with some embodiments.

DETAILED DESCRIPTION

Figure 1:
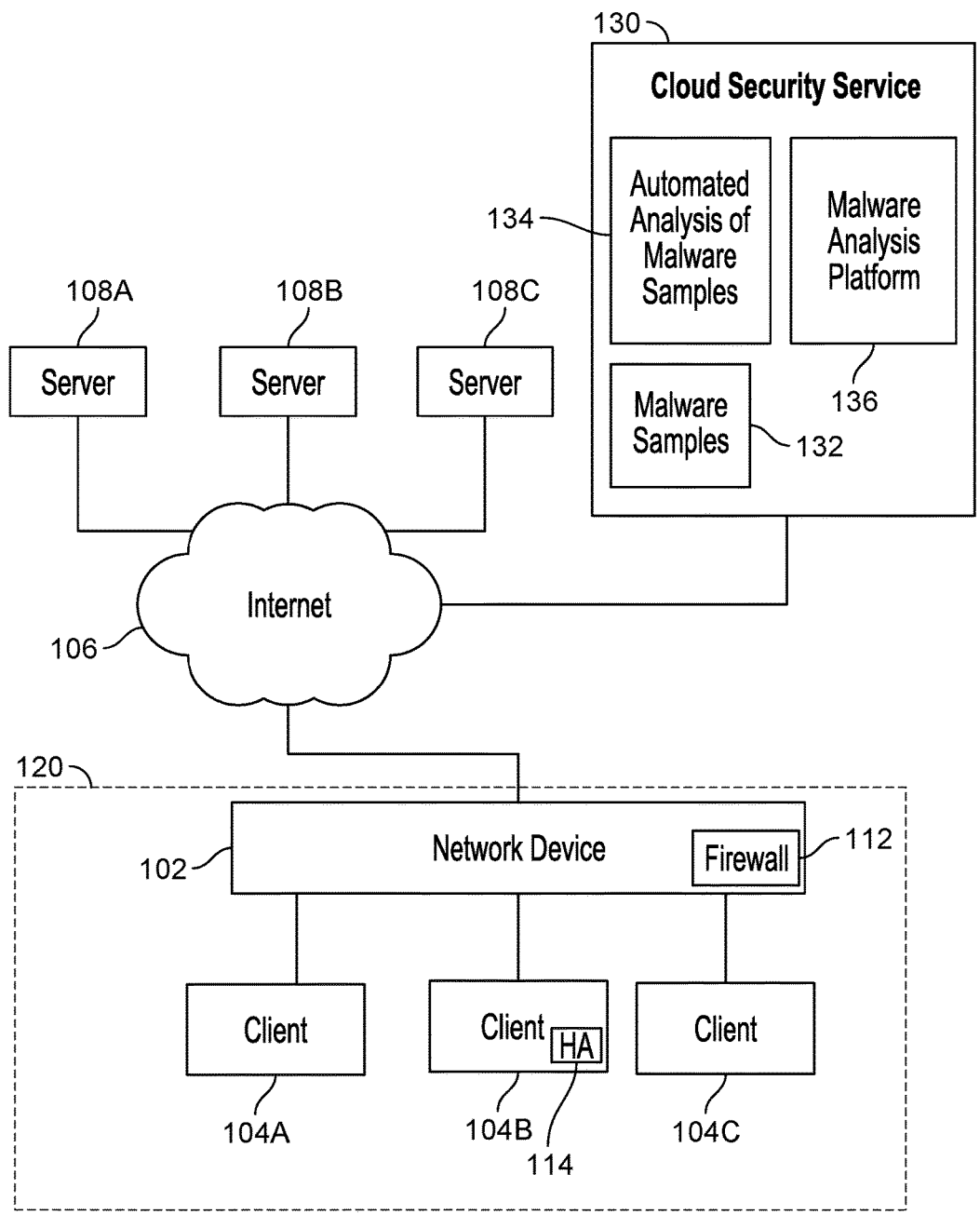
FIG. 1 is a functional diagram of an architecture of a malware analysis platform for threat intelligence made actionable in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Network devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. located in Santa Clara, Calif. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

However, existing technology-based security approaches fail to provide solutions made actionable that can adequately address the above-described problems. For example, existing approaches fail to provide a malware analysis platform that can facilitate viewing, analyzing, and acting upon attributes (e.g., high-risk attributes) associated with malware.

In particular, sophisticated attackers are increasingly using targeted and new unknown variants of malware to avoid detection by existing technology-based security approaches (e.g., traditional security products/solutions). For example, advanced security threats (e.g., advanced cyber-attacks) are employing stealthy, persistent methods to evade traditional security measures (e.g., APTs). Skilled adversaries (e.g., attackers) demand that modern security teams re-evaluate their basic assumptions that traditional intrusion prevention and DLP systems, antivirus, and single-purpose sandbox appliances are up to the task of defeating advanced security threats, such as APTs and other techniques utilized by insider threats to, for example, exfiltrate data from enterprise networks.

Overview of Techniques for a Malware Analysis Platform for Threat Intelligence Made Actionable Thus, what are needed are new and improved techniques for technology-based security solutions that can provide a malware analysis platform for threat intelligence made actionable that can adequately address the above-described problems and/or the various other problems described herein.

Accordingly, techniques for a malware analysis platform for threat intelligence made actionable are disclosed. In one embodiment, the malware analysis platform for threat intelligence made actionable is disclosed that generates an enhanced view of malware analysis results. For example, the malware analysis platform can perform an ingestion and transformation process to process a set of log files including (e.g., selected/important) malware analysis results activity (e.g., such as static malware analysis results and/or dynamic malware analysis results, which can include mutex usages, network activities, registry changes, API calls, and/or various other selected/important malware analysis results activity) to facilitate an enhanced view of malware analysis results.

In addition, the significant amount and complex information that is generated by existing security analysis approaches presents a technical challenge to identify and/or determine the malicious activity a malware is performing and/or to associate patterns or relationships between malware samples and their features and/or behaviors. Accordingly, techniques for determining artifacts associated with malware, grayware, and benign samples are disclosed. In one embodiment, analysis of artifacts can be performed based on malware sample analysis results to generate an enhanced view of malware analysis results as further described herein.

In one embodiment, the malware analysis platform generates an enhanced view of malware analysis results using artifacts (e.g., based on analysis performed using line counting techniques, such as line counting or sub-line counting of log files of malware sample analysis results, such as further described below). For example, the malware analysis platform can perform the above-described ingestion and transformation process to generate a set of log files including (e.g., selected/important) malware analysis results activity (e.g., such as static malware analysis results and/or dynamic malware analysis results, which can include mutex usages, network activities, registry changes, API calls, and/or various other selected/important malware analysis results activity).

For example, line/sub-line counts can be performed on the malware analysis sample results (e.g., log files) to provide a statistical view of the malware analysis results data (e.g., across different enterprise networks of subscribers/customers to the malware analysis platform service, categories of customers/industries, etc.), such as including one or more of the following: (1) common actions/attributes that have been observed at least a threshold number of times in both benign and malware samples; (2) (malicious/suspicious) actions/attributes (e.g., suspicious artifacts) that have been observed at least a threshold number of times in malware samples and only observed a relatively lower threshold number of times in benign samples; and (3) actions/attributes (e.g., highly-suspicious artifacts) that have been observed at least a threshold number of times in benign samples and only observed a relatively lower threshold number of times in malware samples. The disclosed techniques can be performed to identify risky/high-risk artifacts (e.g., suspicious and/or highly-suspicious artifacts), which can then be utilized to perform analysis and/or perform actions based on these artifacts as further described below.

For example, the disclosed techniques can be performed to identify high-risk artifacts (e.g., artifacts determined to be most likely to be detected with malware as Suspicious or Highly Suspicious using various techniques disclosed herein) associated with lines/sub-lines in a log file for a given malware sample (e.g., by determining the lines/sub-lines in the log file that are associated with a high malware count and/or a low benign count, such as further described herein). In this example, the suspicious lines/sub-lines can then also be utilized to automatically generate a new signature for detecting malware for that malware sample to perform actions to block malware that includes the artifact(s) associated with these suspicious lines/sub-lines (e.g., by adding high-risk artifacts, such as high-risk artifacts for Domains, IP addresses, and/or URLs, to be used with a firewall block list or to support a security information and event management (SIEM) solution). In this example, the disclosed techniques can also be performed as a validation/proofing system to test and validate the new signature and examine the line count results.

In some embodiments, a system, process, and/or computer program product for a malware analysis platform for threat intelligence made actionable includes receiving a plurality of samples for performing automated malware analysis to generate log files based on the automated malware analysis (e.g., including results from a dynamic and/or static analysis); processing the log files to determine artifacts associated with malware; and performing an action based on an artifact. For example, if the artifact is determined to be associated with one or more malware samples based on the automated malware analysis, then the artifact can be deemed a high-risk artifact.

In one embodiment, a log file for a sample comprises one or more lines based on the automated malware analysis results for the sample, and a system, process, and/or computer program product for a malware analysis platform for threat intelligence made actionable further includes identifying distinct lines in the log file; and updating a line count for each of the distinct lines based on line counting performed for previously processed log files.

In one embodiment, a log file for a sample comprises one or more lines based on the automated malware analysis results for the sample, and a system, process, and/or computer program product for a malware analysis platform for threat intelligence made actionable further includes identifying distinct lines in the log file; and determining whether any of the distinct lines are suspicious.

In one embodiment, a system/process/computer program product for a malware analysis platform for threat intelligence made actionable includes generating a human readable format of malware analysis result log files (e.g., replacing numeric identifiers and removing not-interesting parameters, such as described herein); determining a first occurrence of each distinct line in each log file (e.g., and removing duplicate lines within the log file); and counting how many times each distinct line is observed in malware samples as compared with benign samples. In one embodiment, the disclosed line counting techniques are similarly applied to generate the sub-line counts, such as further described herein. For example, a subset of each line can be counted, such as to implement sub-line/attribute/parameter counting (e.g., based on a registry name, mutex, file name, and/or other attributes/parameters, rather than the entire/whole line). In one embodiment, the disclosed line counting techniques are similarly applied to generate the line/sub-line counts for a specified date range and/or a specified set of samples, such as further described herein.

In some embodiments, a system, process, and/or computer program product for tagging and alerting using a malware analysis platform for threat intelligence made actionable includes receiving a plurality of samples for performing automated malware analysis to generate log files based on the automated malware analysis (e.g., including results from a dynamic and/or static analysis); processing the log files to extract artifacts associated with the log files; determining whether a tag matches any of the plurality of samples based on the artifacts; and performing an action based on whether a tag matches any of the plurality of samples. For example, if the artifact is determined to be associated with malware based on the automated malware analysis, then the artifact can be deemed a high-risk artifact. In one embodiment, a log file for a sample comprises one or more lines based on the automated malware analysis results for the sample.

In one embodiment, a system, process, and/or computer program product for tagging and alerting using the malware analysis platform for threat intelligence made actionable further includes generating an alert based on the determination that the tag matches at least one of the plurality of samples. For example, an alert can be generated (e.g., for a customer/subscriber of the platform) when there is a matching tag, and there is network traffic for that sample in the monitored network (e.g., the subscriber's enterprise network, or for an alert if the tag is triggered based on a public sample that was detected in another subscriber's enterprise network, such as another subscriber that is in a same industry category).

In one embodiment, a system, process, and/or computer program product for tagging and alerting using the malware analysis platform for threat intelligence made actionable further includes configuring a tag based on a plurality of conditions associated with one or more artifacts; and determining whether the tag matches any of the plurality of samples based on the plurality of conditions associated with one or more artifacts.

As an example, the disclosed techniques can be performed to allow users to learn more information about samples that were found/detected on their network (e.g., enterprise network). Assume that a bank, ACME Bank, is a customer/subscriber of the malware analysis platform for threat intelligence made actionable, ACME Bank could then utilize the platform to determine that 40% of banking customers have found/detected that same malware on their networks. As another example, ACME Bank could utilize the platform to search analysis of malware samples results data that can include additional statistics based on automated analysis of the malware samples results data, which can facilitate identification of pervasive malware, high-risk artifacts associated with malware, and/or reveal connections/associations between malware (e.g., shared high-risk artifacts or other connections/associations). As another example, ACME Bank could utilize the platform to prioritize security events in their network environment by distinguishing between threats or campaigns with global impact (e.g., based on alerting tags) and less impactful threats that do not pose a direct or immediate security risk (e.g., based on informational tags). As such, ACME Bank could utilize the platform to quickly identify threats on their network, and to contextualize such events within an industry, global, and historical context (e.g., utilizing a dashboard interface of the platform to view the top activity for their network, for their industry, and on a global scale) and can also perform actions based on the threat intelligence information, such as further described below.

Accordingly, various techniques for providing a malware analysis platform for threat intelligence made actionable are disclosed. For example, various technical solutions for providing a malware analysis platform for threat intelligence made actionable are disclosed. As will be apparent to one skilled in the art in view of the various techniques and embodiments described herein, the various techniques described herein for providing a malware analysis platform for threat intelligence made actionable can similarly be performed using cloud-based security solutions, network device-based security solutions, host-based/agent-based security solutions, and/or virtualized/software-defined networking (SDN)-based security solutions, such as further described below with respect to various embodiments.

A System Architecture for a Malware Analysis Platform for Threat Intelligence Made Actionable FIG. 1 is a functional diagram of an architecture of a malware analysis platform for threat intelligence made actionable in accordance with some embodiments. As shown in FIG. 1, client devices 104A, 104B, and 104C are in communication with the Internet 106 via a network device 102 (e.g., a data appliance). In one embodiment, network device 102 includes a firewall 112 as shown (e.g., a firewall component that can be implemented in software executed on a hardware processor of the network device, or implemented in hardware at least in part, and/or a combination thereof; as an example, as a commercially available firewall solution from Palo Alto Networks, Inc. or another security vendor can be utilized), which can be used for security for an enterprise network 120. In one embodiment, network device 102 and firewall 112 perform various security operations to protect enterprise network 120 and/or the client, server, and/or other devices within the perimeter of enterprise network 120 (e.g., including providing malware samples to a cloud security service 130 for further analysis, such as further described below). In one embodiment, network device 102 includes a data appliance (e.g., a security appliance), a gateway (e.g., a security gateway), a server (e.g., a server that executes security software including firewall 112), and/or some other network/security device, which, for example, can be implemented using computing hardware, software, virtualized/software-defined networking (SDN)-based solutions, or various combinations thereof.

In one embodiment, one or more of client devices 104A-104C include a host agent (HA) 114 as shown. For example, HA 114 can be implemented as a host-based firewall and/or an agent, such as a network/security agent, executed on the client/host device (e.g., implemented in software that can be executed on a hardware processor of the client/host device) that can perform various functions in coordination with network device 102, firewall 112, and/or cloud security service 130 to facilitate endpoint protection (e.g., including providing malware samples to cloud security service 130 for further analysis, such as further described below). In an example implementation, HA 114 can be provided by a lightweight agent (e.g., a commercially available endpoint agent, such as the Palo Alto Networks® Traps™ agent available from Palo Alto Networks, Inc., which is a highly scalable, lightweight agent for endpoint security, or an endpoint agent from another security vendor can be utilized) that can be executed on, for example, a variety of different client/host device platforms (e.g., Microsoft® Windows® Operating System (OS) platforms and/or other platforms for clients and/or servers) to facilitate endpoint security in coordination with network device 102, firewall 112, and/or cloud security service 130, such as further described below.

For example, client devices 104A-C can include various computing devices that can access the Internet via wired and/or wireless communications, such as computers, laptops, tablets, smart phones, and/or various other types of computing devices with network communication capabilities. As also shown, servers 108A-C are in communication with the Internet 106. For example, a client device can access a service provided by a server via the Internet, such as a web-related service (e.g., web site, cloud-based services, streaming services, or email services, such as web-posting applications, email applications, peer-to-peer related services, and/or any other applications or services that perform network communications via the Internet).

As also shown in FIG. 1, cloud security service 130 includes a data store for storing malware samples 132 and a platform for automated analysis of malware samples 134 and a malware analysis platform 136. For example, malware samples can be received from subscribers of cloud security service 130, such as from firewall 112 of network device 102, HA 114 of client 104B, and/or other devices/components associated with the subscribers of the cloud security service. The malware samples can be, in some cases, files, PCAPs, and/or other data/content that is deemed suspicious by, for example, the firewall and/or HA. The suspicious malware sample can then be automatically sent to the cloud security service for further automated analysis. For example, automated analysis of the malware samples can include automated dynamic analysis and automated static analysis, such as further described herein (e.g., the automated analysis of malware samples can be provided by a commercially available malware analysis service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized).

In an example implementation, the enterprise network is subscribed to the cloud security service, and the network device can securely communicate with the cloud security service (e.g., using a commercially available cloud-based security service, such as provided by Palo Alto Networks that provides API support via the WildFire API, such as for submission of malware samples (e.g., files and/or other data/content can be submitted/uploaded for malware analysis; and after a submitted malware sample is analyzed, other data can be provided as an available download for further analysis, such as PCAP data and/or other data/content for further malware analysis). Another example is using a URL filtering subscription service (e.g., Palo Alto Networks PANdb URL filtering subscription service or another commercially available URL filtering subscription service) to submit one or more URLs (e.g., the submission of a URL, full or part of a web page, statistics/transformed version of a web page, which can include a list of form field names, types, default values, parameters, etc.) for cloud-based, asynchronous analysis. The results of the cloud-based, asynchronous analysis can then be provided back to the firewall and/or other network/filtering devices and/or agents for possible responsive actions. In one embodiment, the results of the cloud-based, asynchronous analysis can also be accessed using malware analysis platform 136, such as further described below.

In one embodiment, malware analysis platform 136 provides a platform for accessing results of the automated analysis of the malware samples generated by automated analysis of malware samples 134. For example, a subscriber can access, analyze, and/or perform actions based on results of the malware sample analysis, which can include results for malware samples provided from the subscriber's enterprise network and/or from other subscribers' enterprise network (e.g., if such are associated with public or non-confidential samples). These and other aspects of malware analysis platform 136 will be further described below.

In one embodiment, malware analysis platform 136 is implemented as a cloud service. For example, malware analysis platform 136 can be implemented using an internal data center or can be implemented using a cloud-based computing/storage data center service (e.g., such as cloud-based computing services provided by Amazon (Amazon Web Services®), Google, IBM, Microsoft, or other commercially available cloud-based computing/storage services). In one embodiment, a customer (e.g., an enterprise with their own enterprise data center) can implement the disclosed malware analysis system executed in their own data center for their own malware data samples processed by the automated malware analysis system (e.g., utilizing a WF-500 WildFire™ appliance that is commercially available from Palo Alto Networks, Inc., which can be deployed within a subscriber's enterprise network to implement an on-premises WildFire™ private cloud, enabling customers/subscribers to analyze suspicious files in a sandbox environment without requiring the malware samples (e.g., files) to be sent outside of their network to the WildFire™ public cloud).

Sample Analysis Categories

In one embodiment, firewalls with subscriptions are configured to forward unknown samples to cloud security service 130, where the sample undergoes analysis in a sandbox environment. For example, static analysis can be performed based on properties of a sample that can be detected and observed without executing the sample. Dynamic analysis can be performed utilizing the sandbox environment to monitor activities associated with opening and/or executing the sample in a sandbox environment (e.g., using one or more instrumented virtual execution environments).

Example file analysis information determined using a static file analysis and/or a dynamic file analysis can be grouped into the following example categories: file property details, static analysis results, and dynamic analysis results. In this example, the file property details and the static analysis results can be determined based on observations of the sample during the static analysis, and the dynamic analysis results can be determined based on observations of the activities and behaviors seen when the sample was executed in the sandbox environment during the dynamic analysis.

In an example implementation, file property details can include one or more of the following: a verdict (e.g., an assignment of the sample to malware, grayware, or benign based on properties, behaviors, and activities observed for the file or email link during static and/or dynamic analysis, such as using the disclosed techniques); a hash value(s) (e.g., SHA256, MD5, or other hash algorithm can be utilized to generate unique cryptographic hashes of the sample); a type (e.g., sample file type, such as email link, Adobe Flash File, PDF file, or another file type); size (e.g., sample size in bytes); a created time stamp (e.g., a date and time that the sample was first forwarded or uploaded to the cloud security service); a finished time stamp (e.g., a date and time that the analysis of the sample was completed by the cloud security service); a digital signature; a VirusTotal hit (e.g., a number of times that this sample has been detected by VirtusTotal); and a MultiScanner hit (e.g., a number of other vendors that have also identified this sample as malware using multiscanners (e.g., antivirus engines running concurrently)).

In an example implementation, dynamic analysis results can include one or more of the following: observed behavior (e.g., lists behaviors seen for the sample in the sandbox environment, such as whether the sample created or modified files, started a process, spawned new processes, modified the registry, or installed browser help objects (BHOs), in which each behavior can also be assigned a risk level of high, medium, low, or informational); connection activity (e.g., lists processes that accessed other hosts on the network when the sample was executed in a sandbox environment, in which information listed can include the process that accessed other hosts on the network, the port through which the process connected, the protocol used for the connection, and the IP address and country of the host); DNS activity (e.g., lists DNS activity observed when the sample was executed in the sandbox environment, which can include the hostname that was translated (Query), the resolved domain name or IP address (Response), and the Type of DNS resource record used to resolve the DNS query); file activity (e.g., lists files that showed activity as a result of the sample being executed in the sandbox environment; information for each artifact can include the parent process that showed activity, the action the parent process performed, and the file which was altered (created, modified, deleted, etc.)); HTTP activity (e.g., lists the HTTP requests made when the sample was executed in the sandbox environment, in which information for each artifact can include the domain to which the HTTP request was sent, the HTTP method used by the host, the URL for the resource being requested, and the string originating the request (User Agent column)); Java API activity (e.g., lists Java runtime activity seen when the sample was executed in the sandbox environment); other API activity (e.g., lists API activity seen in the sandbox environment when the sample was executed, in which listed details can include the parent process that was active, the API calls made by the parent process, and the process that was modified); Mutex activity (e.g., a mutex (mutual exclusion object) allows programs to share the same resource, though the resource can only be used separately; if the sample generates other program threads when executed in the sandbox, the mutex created when the programs start is listed along with the parent process); process activity (e.g., lists processes that showed activity when the sample was executed, in which information listed can include the parent process that was active, the action that the parent process performed, and the process that was modified); registry activity (e.g., lists OS, such as Microsoft Windows, registry settings and options that showed activity when the sample was executed in the sandbox, in which information listed can include the parent process that was active, the registry method used by the parent process (Action), and the parameters column lists the registry key that was set, modified, or deleted); service activity (e.g., lists services that showed activity as a result of the sample being executed in the sandbox environment, in which information for each service activity can include the process that was active, the action the process performed, and the service that was created, modified, or deleted); and user agent string fragments (e.g., lists the user agent header for HTTP requests sent when the sample was executed in the sandbox environment).

In an example implementation, static analysis results can include one or more of the following: suspicious file properties (e.g., lists high-risk content found during a pre-screening analysis of the sample; examples of suspicious file properties can include a file belonging to a known malware family or a file signed with a known malicious certificate, or a file with source code that contains dangerous shell commands); and properties and activities observed for Android application package (APK) files (e.g., defined activity, defined intent filter, defined receiver, defined sensor, defined service, defined URL, requested permission, sensitive API call, suspicious API call, suspicious file, suspicious string, and/or other properties and activities). For example, static analysis results can also include compiler and compilation time of the sample, strings within the sample, icons, linked DLL files, a list of imported API functions, a number of sections/segments, and/or various other properties.

Figure 2:
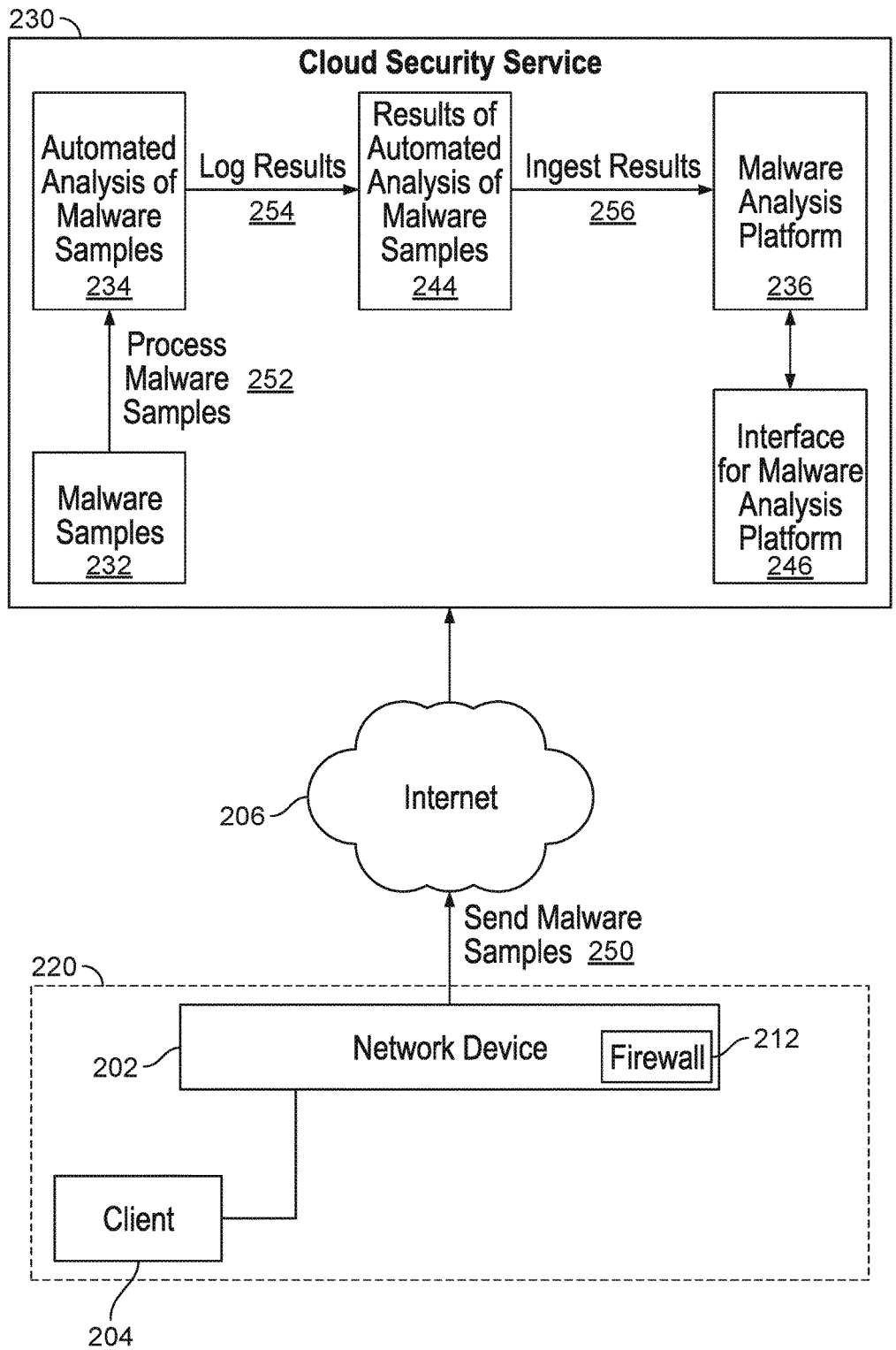
FIG. 2 is another functional diagram of an architecture of a malware analysis platform for threat intelligence made actionable in accordance with some embodiments.
Figure 3:
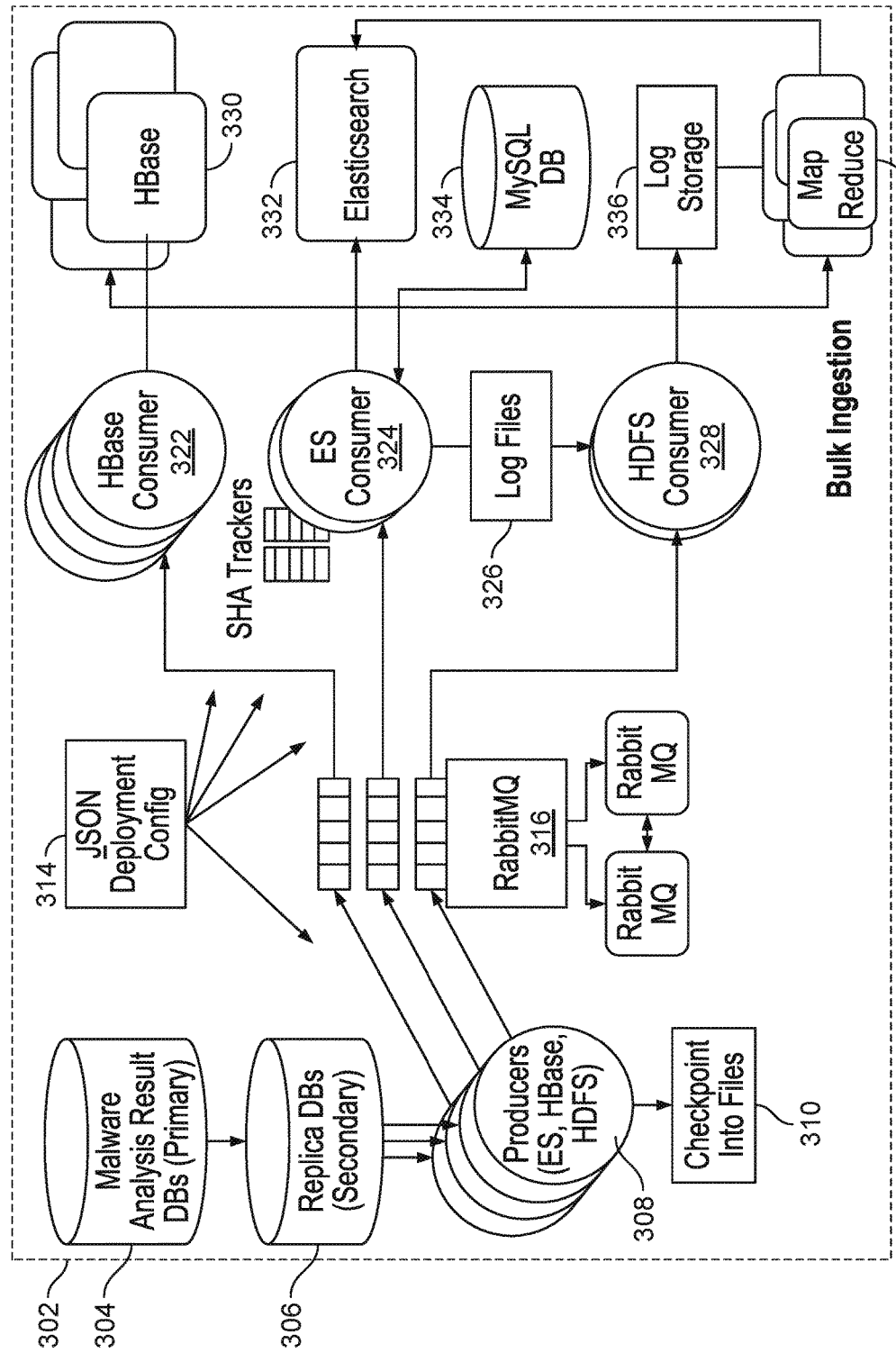
FIG. 3 is a functional diagram of an architecture of a malware analysis platform for threat intelligence made actionable for ingestion and processing of results of automated analysis of malware samples in accordance with some embodiments.

An example architecture of malware analysis platform 136 is shown in FIGS. 2 and 3 as further described below.

FIG. 2 is another functional diagram of an architecture of a malware analysis platform for threat intelligence made actionable in accordance with some embodiments. As shown in FIG. 2, client devices, such as client device 204, are in communication with the Internet 206 via a network device 202 (e.g., a data appliance). In one embodiment, network device 202 includes a firewall 212 as shown (e.g., a firewall component that can be implemented in software executed on a hardware processor of the network device, or implemented in hardware at least in part, and/or a combination thereof; as an example, as a commercially available firewall solution from Palo Alto Networks, Inc. or another security vendor can be utilized), which can be used for security for an enterprise network 220. In one embodiment, network device 202 and firewall 212 perform various security operations to protect enterprise network 220 and/or the client, server, and/or other devices within the perimeter of enterprise network 220 (e.g., including providing malware samples to a cloud security service 230 for further analysis, such as further described below). In one embodiment, network device 202 includes a data appliance (e.g., a security appliance), a gateway (e.g., a security gateway), a server (e.g., a server that executes security software including firewall 212), and/or some other network/security device, which, for example, can be implemented using computing hardware, software, virtualized/software-defined networking (SDN)-based solutions, or various combinations thereof.

As also shown in FIG. 2, cloud security service 230 includes a data store for storing malware samples 232 and a platform for automated analysis of malware samples 234 and a malware analysis platform 236. For example, malware samples can be received from subscribers of cloud security service 230, such as from firewall 212 of network device 202 and/or other devices/components associated with the subscribers of the cloud security service. The malware samples can be, in some cases, files, PCAPs, and/or other data/content that is deemed suspicious by, for example, the firewall and/or the HA. The suspicious malware sample can then be automatically sent to the cloud security service for further automated analysis. For example, automated analysis of the malware samples can include automated dynamic analysis and automated static analysis, such as further described herein (e.g., the automated analysis of malware samples can be provided by a commercially available malware analysis service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized).

In one embodiment, cloud security service 230 receives malware samples from a subscriber(s) of the cloud security service as shown at 250, which can be stored in malware samples data store 232 (e.g., including meta data associated with each of the malware samples, such as session table data that can include source, destination, and protocol data for malware samples sent from a firewall). The malware samples are sent to platform for automated analysis of malware samples 234 for processing as shown at 252. Platform for automated analysis of malware samples 234 logs results of the automated analysis of the malware samples as shown at 254, which can be stored in a data store for results of automated analysis of malware samples 244 (e.g., storing results of automated analysis of malware samples as log files). Results of automated analysis of malware samples 244 are ingested (e.g., periodically and/or on demand to ingest and process the log files of results of automated analysis of malware samples) by malware analysis platform 236 as shown at 256. As also shown, an interface for malware analysis platform 246 provides a user interface (e.g., a graphical user interface (GUI) or another type of user interface (UI)) that facilitates programmatic and/or end user interface access to malware analysis platform 236, such as further described below. For example, the malware analysis platform includes an interface (e.g., a graphical user interface (GUI)) and/or a programmatic interface (e.g., via an application programming interface (API)) that facilitates subscriber/user access to the malware analysis platform for viewing, analyzing, and/or performing actions based on the security data and results provided by the malware analysis platform.

For example, using the disclosed line counting techniques, the interface for the malware analysis platform provides a user interface that can be utilized to show logs of a selected malware sample and highlight the most suspicious lines in the log (e.g., lines with high malware count/low benign count). As another example, using the disclosed line counting techniques, a new signature can be automatically generated using the most suspicious lines in the log (e.g., lines with high malware count/low benign count), and the system can validate/test the new signature and examine the line counts based on that automated testing. These and other examples are facilitated by the disclosed line counting techniques to provide for enhanced threat intelligence using the malware analysis platform. As yet another example, using the disclosed line counting techniques, the interface for the malware analysis platform provides a user interface that can be utilized to select an artifact(s) (e.g., high-risk artifacts, such as suspicious and/or highly-suspicious artifacts as described herein) to be used with a firewall block list that can be exported using interface for malware analysis platform 246 of cloud security service 230 and then imported and implemented for processing network traffic on enterprise network 220 using firewall 212 of network device 202 (e.g., and/or using HA 114 as shown in FIG. 1) or to support a security information and event management (STEM) solution.

An example architecture for ingestion of the results of the automated analysis of the malware samples is shown in FIG. 3 as further described below.

A System Architecture for Ingestion of Results of Automated Analysis of Malware Samples FIG. 3 is a functional diagram of an architecture of a malware analysis platform for threat intelligence made actionable for ingestion and processing of results of automated analysis of malware samples in accordance with some embodiments. As shown in FIG. 3, an ingestion architecture 302 for ingestion and processing of results of automated analysis of malware samples to facilitate threat intelligence is provided. For example, the system architecture described above with respect to FIG. 2 can implement the disclosed live ingestion architecture 302 to ingest (e.g., periodically and/or on demand) and process results of automated analysis of malware samples 244 generated by malware analysis platform 236 as shown at 256 in FIG. 2.

In one embodiment, ingestion architecture 302 is implemented using a pipeline of software programs executing over a distributed set of systems to ingest and process results of automated analysis of malware samples generated by the malware analysis platform to facilitate threat intelligence made actionable. For example, the results of automated analysis of malware samples generated by the malware analysis platform can be ingested to determine data of interest (e.g., relationships of malware samples, trends in malware samples, and/or other data of interest) based on the ingested and processed results of the malware analysis platform (e.g., as similarly described above, the malware analysis platform can include various malware sample (static/dynamic) analysis and/or URL filtering services). The results of the ingested and processed results of automated analysis of malware samples generated by the malware analysis platform can be indexed to facilitate search access for programmatic/user interface access to the malware analysis platform, such as further described below (e.g., published into an elastic search to facilitate search and analytics). The results of the ingested and processed results of automated analysis of malware samples generated by the malware analysis platform can also implement various analytics-based processing and programmatic/user interface access, such as further described below.

Overview of an Ingestion Architecture

In one embodiment, the system architecture as shown in FIG. 3 illustrates an overall view of an ingestion architecture. In one embodiment, ingestion architecture 302 is implemented using various components including a messaging broker (e.g., RabbitMQ, Kafka, ZeroMQ, or another open source or commercially available messaging broker), a relational database (e.g., MySQL or another open source or commercially available database, such as a relational database), a search engine (e.g., ElasticSearch, Lucene, Solr, or another open source or commercially available full-text (free form, unstructured) search engine, where the gleaned data ingestion of results of automated analysis of malware samples can be processed to facilitate user access and presentation), a non-relational database (e.g., Apache HBase, Cassandra, MangoDB, or another open source or commercially available database, such as a non-relational database), and other components as further described below. In one embodiment, the components of ingestion architecture 302 can reside and/or be executed on the same physical machine. In one embodiment, the components of ingestion architecture 302 (e.g., and by design) can be deployed/distributed across a network of distinct physical machines/servers (e.g., CPU and memory bind the number of components running on any one single machine). In an example implementation, the disclosed data ingestion pipeline can be implemented using various open source and/or commercially available components such as described above and coded in various programming languages, such as Python, Java, and/or other programming languages.

Referring to FIG. 3, in this example implementation, a deployment of a distributed, live ingestion system for the malware analysis system involves the following programmed physical machines: a MySQL database server 334, an HBase server cluster 330, and a Rabbit MQ (RMQ) cluster 316 (e.g., three machines, in which Rabbit1 is a primary and executes all the producers and 50 consumers, and Rabbit 2, and 3 are secondaries for high availability (HA) and each executes a set of 50 consumers) (e.g., this example implementation can provide for a highly scalable data ingestion pipeline capable of processing, for example, more than four million samples per day and more than eight million sessions per day performed using an internal data center with server class hardware including, in this example implementation, 30 machines to execute various functions/roles, such as MySQL, RabbitMQ producer and consumers, middleware, and the front-end as described herein; or cloud computing/storage services can be utilized as similarly described above). In this example, Rabbit MQ and SQL databases can be deployed in clusters to reduce a single point of failure and to facilitate a high availability (HA) architecture for the live ingestion system. A JSON-style deployment configuration file 314 is loaded by each live ingestion component, which can provide data of where and how to access the RMQ and ES databases.

In one embodiment, a producer (ES, HBase, HDFS) 308 sources its data from various SQL databases shown as malware analysis result databases (primary) 304 and replica databases (secondary) 306, to glean malware sample, task, and session data. Producer 308 then pushes the data to Rabbit MQ (RMQ) 316 for consumption by other components of the live ingestion system. In this example, the consumers include but are not limited to the following: HBase to facilitate map/reduce (M/R) jobs (e.g., HBase can be utilized to implement a key, value data database, such as for storing session data and malware analysis results data (including line counts determined using the disclosed line counting techniques), such as further described below); ElasticSearch (ES), shown as ElasticSearch 332, to provide a back-end to the UI data source; and Hadoop Distributed File System (HDFS) to provide a log file storage and compatible format for M/R. Each consumer of that data can have a dedicated producer process that pulls this information. In this example implementation, there is one producer associated due to the checkpointing methodology producers use to identify a last point of processing. Each consumer for a component, such as ES consumers, can have multiple instances executing independently from one another (e.g., and are only bound by the performance of the receiving system such as HBase and ES, as well as SQL DBs to achieve other tasks, such as tagging). Although the data is typically the same in most situations (e.g., ES and HBase are examples), in this implementation, a design choice of generating such data from producers separately rather than using a point to multipoint model can ensure that the slowest of the consumers does not starve/delay the other components.

In one embodiment, a backend of the live ingestion system is architected to process and massage the data to reduce a load on the UI and middleware that act as a simpler presentation layer of information. As such, in this example implementation, any changes in how the data is interpreted means that a re-seed of all the data into the corresponding components is performed to ensure correctness (e.g., and utilize M/R, shown as MapReduce 338, to ingest data in bulk for efficient processing of the re-seeded data and/or other bulk data ingestions).

In an example implementation, the data that is collected by producers 308 can be segmented into the following buckets: sample and its tasks, sessions, and multiscanner. The data can be collected in two forms: data can be collected by finish time; and another producer for the same set of data can monitor for update time and can then re-ingest that data. The effort can be repeated for the interested recipients, including the following producers: HBase, HDFS, and ES. This results in nine producers, as follows: HBASE for sample/task by finish and update time; HDFS for sample/task by finish time; and ES, six producers for each data type by finish and update time. In another example implementation, a feed of finished/analyzed samples is received from the automated analysis of malware samples (e.g., the WildFire™ cloud-based malware analysis environment).

Sample and Tasks

In an example implementation, to remove the probability of missing tasks for samples as they were historically generated separately, the effort can be combined into one where the system can first query for samples that are completed from a processing perspective (finish date). The finish date is a reliable indicator that no new tasks will come down the pipeline resulting in missed tasks. If a new task is generated (e.g., which is generally a low probability), the sample's update date can be modified, which can then be consumed by a dedicated sample/task producer that re-processes the sample and all its tasks by update date.

Checkpointing

In an example implementation, each producer can cache its last checkpoint of what it processed by a relevant ID and data into a file stored on the machine on which it is executing, such as shown at 310 in FIG. 3. For example, this approach facilitates executing multiple producers on different machines to start from different checkpoints. In another example implementation, checkpointing can be implemented using MySQL (e.g., this approach facilitates portability across machines by defining in a global configuration file a unique table name for each producer).

Sample Data

In an example implementation, sample fields that can be collected for each malware sample from a malware sample table (e.g., unless otherwise specified) can include one or more of the following: mid, md5, sha1, sha256, platform, type, family, description, create date, update date, source, file name, file type, size, analysis, malware, digital signer, vt_hit, finish date, and generic (e.g., derived from the sample_filetype_desc which is used in collecting sample behavior data, which may not be sent to consumers).

Malware Analysis

In an example implementation, the automated analysis of malware samples can publish a 0, 1, or 2 for each sample indicating that the malware sample is either benign, malware, or grayware respectively. In another example implementation, the automated analysis of malware samples can publish a distinct value for each sample indicating that the malware sample is either benign, malware, grayware, and/or other categorizations based on the malware analysis. For example, when the malware sample is sent, the original malware verdict and the final malware verdict can both be published (e.g., HBase can utilize this knowledge for its analytics, while ES can store the final verdict).

Public/Private State of a Sample

In an example implementation, the automated analysis of malware samples can indicate whether the malware sample is public or private (e.g., some customers may allow their malware sample(s) to be deemed public while others may not and/or such can be configured on a sample-by-sample basis as well as a customer-by-customer basis).

If there is no field or configured value for a given malware sample and result of the analysis of that malware sample from the automated analysis of malware samples to indicate whether the sample should be treated as public or private, then such can be configured on a customer-by-customer basis (e.g., to ensure that one customer's data is not shown to another customer unless the sample is considered public). For example, a sample can be deemed private unless the following criteria is met: the malware sample exists in other public malware data collections (e.g., if the virustotal_hit>=0, it is public); and if the malware sample is not associated with a private source.

Tasks for a Sample

In an example implementation, task fields that can be collected for each task from a task table (e.g., unless otherwise specified) and pushed up along with sample data can include one or more of the following: task ID, file name, URL, md5, submitted time, start time, finish time, status, VM_ID, score, family, summary, report, and VM_platform table (e.g., including a platform ID, description, static, and malware).

Malware Sample Reports Based on Static Analysis

In an example implementation, a report is provided for malware samples that were analyzed based on static analysis techniques by the automated analysis of malware samples. For example, the report can be an XML file (e.g., compressed and hex encoded that indicates the results of the static analysis, such as using a PDF static analyzer, DOC/CDF static analyzer, Java/JAR static analyzer, Microsoft Office Open XML static analyzer, Adobe Flash static analyzer, Android static analyzer, iOS static analyzer, or another static analyzer).

Malware Sample Reports Based on Dynamic Analysis: Behavior Data

In an example implementation, a report is provided for malware samples that were analyzed based on dynamic analysis techniques by the automated analysis of malware samples (e.g., executing/opening the malware samples in an instrumented virtual machine (VM) environment, which can be performed in one or more OS/version environments, such as a Microsoft Windows XP operating system environment, a Microsoft Windows 7x64 SP1 operating system environment, and/or other OS/version environments, and monitoring the behavior for a period of time, such as 30 seconds to five minutes or some other time interval or until an event is detected, such as detection of malware behavior(s)). For example, each task can have interesting behavior identified during a dynamic analysis phase performed by the automated analysis of the malware samples that can be conveyed to the user (e.g., the behaviors can be collected based on a task_id from a behavior table and fetch the following fields to send). Example fields that can be extracted from such a dynamic analysis phase of the malware samples (e.g., from the behavior table) can include one or more of the following: ID, type, description, risk, category, details, and score.

Session Data

In an example implementation, there are two types of producers for session data. A first type of producer for session data is driven by the ES consumer: once it ingests a sample, it stores a hash of the sample (e.g., using SHA or another hash algorithm) in a sample ready table, and the session producer can query that table and publish all sessions for that hash value (e.g., if sessions are processed first, and then the sample is received, then the sessions can be reprocessed to generate alerts). A second type of producer uses dates and session IDs as checkpoints to process sessions as they come along in the automated analysis of malware samples system (e.g., if the sample has already been processed, then the sessions can be processed to generate alerts). The following fields can be collected for each session from the session table including one or more of the following: id, sha256, create time, source IP, source port, destination IP, destination port, file URL, file name, device ID, user name, app, vsys, malware, host name, URI, device host name, session ID, and sample table.

Multiscanner Data

In one embodiment, one or more producers are provided that produce malware analysis data from one or more malware scanners. For example, malware scanner data can include dynamic analysis malware scanner results data and static analysis malware scanner results. As another example, malware scanner data can also include malware analysis results data from one or more third-party sources, such as commercially available or publicly available/open malware analysis data sources (e.g., third-party feeds including closed and/or open-source threat intelligence feeds). Examples of third party, commercially available or publicly available/open malware analysis data sources include Cyber Threat Alliance, Defense Industrial Base Cyber Security Information Assurance (DIB CS/IA), Financial Services Information Sharing and Analysis Center (FS-ISAC), and others.

In one embodiment, one or more producers are provided that produce malware analysis data from the automated analysis of malware samples (e.g., dynamic and/or static analysis results), which can be stored in a database, such as malware analysis result databases (primary) 304 and replica databases (secondary) 306 as shown in FIG. 3. In an example implementation, a dedicated producer exists to process the various fields from the malware analysis result database, such as the following fields in a malware sample analysis table: virustotal_hit (sample_analysis), and multi-scan_hit (sample_analysis). This information can be checkpointed by update_time and sample_analysis table ID to ensure that the latest information is processed.

RabbitMQ Processing from the Producers

In an example implementation, RabbitMQ 316 includes multiple queues for live ingestion, including a queue for each of the producers 308, including: ES, HBase, and HDFS. The queue limits can be defined by the producer configuration and the physical limit of the queues is bound by disk and memory of a given physical machine. For example, rate limiting configuration and data production techniques can also be implemented to reduce/avoid starvation due to a high volume of session messages and rate limiting.

Consumers

In an example implementation, HBase consumer 322 and HDFS consumer 328 can be implemented to ingest data published by their respective producers, including from RabbitMQ 316 and log files 326 as shown, and push it into their corresponding components, HBase 330 and log storage 336, respectively. Additional processing can be performed for ES consumer 324 to consume data from the ES producer. For example, log parsing can be performed to glean interesting data that can be utilized for presentation to a user and further analytics for threat intelligence as further described below, and alerting, tagging, and additional queries that take place on the consumer side for sample and session data due to an ability to parallelize the processing relative to the producer.

In this example implementation, in order to keep up with an incoming rate of data, running 128 ES consumers over several machines for Elastic Search, with up to 32 per machine, can be utilized to perform the disclosed live ingestion techniques when live ingestion is processing older data and needs to catch up quickly, and 96 ES consumers can suffice when it is caught up and is just processing incoming data from the ES producer(s). For HBase, five instances of the HBase consumers can suffice when live ingestion is caught up and is just processing incoming data from the HBase producer(s); otherwise, 16 instances of the HBase consumers can be executed to catch up when it is processing older data from the HBase producer(s).

Elastic Search

In an example implementation, to facilitate tagging session and sample data for alerts, the consumer can interface with a MySQL database 334 to facilitate this functionality. In addition, to remove the bottleneck of one producer with the ability to execute multiple consumers, read queries are relatively cheap and can be parallelized to improve overall ingestion performance. For example, the ES consumer can loop through three sub consumers: sample/task, MultiScanner (MS), and session consumers. Multiple consumers can run on the same machine only bound by CPU and Memory. Each consumer can read messages from RMQ 316 and store them locally. The consumers can process messages in batches (e.g., ten messages at a time or some other number of messages).

Task Data

In an example implementation, a bulk of the ingestion intelligence lies within the task data parsing. The fields produced by the producer can be ingested as is and embedded in a task document. Example fields embedded in ES can include one or more of the following: task ID, platform, malware, behavior, JAPI, HTTP, DNS, connection, process, file, registry, mutex, service, information, miscellaneous, user agent, APK defined activity, APK defined service, APK defined intent filter, APK defined receiver, APK requested permission, APK sensitive API call, APK defined sensor, APK embedded URL, APK suspicious string, APK suspicious API call, APK suspicious file, and summary.

Index the Consumed ES Data

In one embodiment, the consumed ES data is indexed to facilitate a searchable set of ES data. In an example implementation, the consumed ES data can be indexed and searchable after being processed for each task.

Log File Parsing

In one embodiment, the malware sample analysis data can be generated as log files (e.g., the log files can include lines in the file with different meta data and/or results of the automated analysis related to the malware sample, or another data format can be utilized).

In an example implementation, log parsing is performed for each task for a sample. For example, it can be provided the following information: malware sample's SHA; task ID; sample's MD5 (e.g., used for validation); platform that the task ran on (e.g., OS/version of the platform of the sandbox environment, such as Windows XP or Windows 7, to determine how a log file should be parsed); a file type associated with the sample; a list of log files copied over for that sample; and/or a path of the log file location. A task can have various log files for parsing (e.g., using a log parser process that is configured to parse each type of log file, which are raw log files from the automated malware analysis of a sample(s) that can be processed using a log parser to generate processed log files for each type of log file that can be consumed by the malware analysis system using the disclosed techniques), such as one or more of the following types of log files: Java API (JAPI) log, event log, API log, and XML report. For example, the log file parsing can be configured to maintain much of the original information (e.g., when a line, such as a mutex line, registry line, file line, connections line, process line, information line, miscellaneous line, and/or another type of line is broken down into fields, preserve as much of the original information, annotating obscure ones and removing distracting elements such as memory addresses that can vary from sample run to sample run); obfuscate elements that can assist a malware developer to attempt to reverse engineer and defeat the malware analysis system; improve user readability by removing non-essential fields and mapping obscure fields to well-known descriptors; preserve as much of the numbers that occur in a line as possible with the exception of process IDs (PIDs) and memory addresses to improve readability for researchers (e.g., PIDs can be mapped to process names such as using a dictionary mapping for such an operation, and memory addresses can be removed, but if a file or a mutex only consists of numbers as a name, it can be preserved); and/or remove non-ASCII characters that can break live ingestions and the third party tools it uses.

Example excerpts from raw log files are provided below, including example excerpts from the following types of log files: a raw event log, a raw API log, and a raw XML, report. As described above and further described herein, the log file parsing operations can be performed to process each of these raw log files to generate processed log files that can be consumed by the malware analysis platform using the disclosed techniques.

Below is an example excerpt from a raw log file for monitored API activities of a sample during the automated analysis of the sample, which is an example excerpt of a raw API log.

```
info,0x00011083,md5:F0A8D5B10B0B5440CBC970FA1B106B35
info,0x00011084,version, Feb 06, 2013
info,0x00011086,mac_address,00:25:64:D5:85:4D
info,0x0001108c,ip_address,192.168.180.87
tree,0x000110b0,0,[System Process],0
tree,0x000110b1,4,System,0
tree,0x000110b2,320,smss.exe,4
tree,0x000110b3,432,csrss.exe,320
tree,0x000110b4,456,winlogon.exe,320
tree,0x000110b5,556,services.exe,456
tree,0x000110b6,568,lsass.exe,456
tree,0x000110b6,736,svchost.exe,556
tree,0x000110b7,800,svchost.exe,556
tree,0x000110b8,908,svchost.exe,556
tree,0x000110b9,996,svchost.exe,556
tree,0x000110ba,1020,svchost.exe,556
tree,0x000110bb,1508,explorer.exe,1480
tree,0x000110bc,1608,reader_sl.exe,1508
tree,0x000110bd,1624,cmd.exe,1508
tree,0x000110be,1952,rundll32.exe,1508
tree,0x000110bf,184,wmiprvse.exe,736
tree,0x000110c0,1104,cmd.exe,1624
tree,0x000110c0,1324,explorer.exe,1624
    process,0x00011707,1324,hash,C:\program                          files\internet
explorer\iexplore.exe,55794B97A7FAABD2910873C85274F409,
814A37D89A79AA3975308E723BC1A3A67360323B7E3584DE00896FE7C59BBB8E
    process,0x00011715,1324,CreateProcessInternalW,1368,C:\Program        Files\Internet
Explorer\iexplore.exe,"C:\Program Files\Internet Explorer\iexplore.exe"  -nohome
    tree,0x0001171c,1324,C:\Program Files\Internet Explorer\iexplore.exe,1368
    api,0x0001196e,1368,GetModuleHandle,iexplore.exe
    api,0x0001197b,1368,LoadLibraryExW,SHELL32.dll=0x7c9c0000,NULL,0
    registry,0x0001197d,1368,RegCreateKeyEx,HKEY_CURRENT_USER,Software\Microsoft\
Windows\CurrentVersion\Explorer\User Shell Folders
    registry,0x0001197e,1368,RegCreateKeyEx,HKEY_CURRENT_USER,Software\Microsoft\
Windows\CurrentVersion\Explorer\Shell Folders
    registry,0x00011980,1368,RegSetValueEx,\REGISTRY\USER\S-1-5-21-2052111302-
1214440339-682003330-500\Software\Microsoft\Windows\CurrentVersion\Explorer\Shell
Folders,Desktop,C:\Documents and Settings\Administrator\Desktop
    api,0x00011981,1368,IsDebuggerPresent
    api,0x00011983,1368,LoadLibraryExW,SHELL32.DLL=0x7c9c0000,NULL,0
    api,0x00011985,1368,LoadLibraryExW,ole32.dll=0x774e0000,NULL,0
    api,0x00011989,1368,GetModuleHandle,iexplore.exe
    process,0x0001198c,1368,OpenProcess,0x00000094,0x02000000,1508
    api,0x0001198e,1368,GetModuleHandle,shell32.dll
    api,0x0001199a,1368,LoadLibraryExW,BROWSEUI.dll=0x75f80000,NULL,0
    registry,0x0001199b,1368,RegCreateKeyEx,HKEY_CURRENT_USER,Software\Microsoft\
Windows\CurrentVersion\Explorer\User Shell Folders
    registry,0x0001199d,1368,RegCreateKeyEx,HKEY_CURRENT_USER,Software\Microsoft\
Windows\CurrentVersion\Explorer\Shell Folders
    registry,0x0001199e,1368,RegSetValueEx,\REGISTRY\USER\S-1-5-21-2052111302-
1214440339-682003330-500\Software\Microsoft\Windows\CurrentVersion\Explorer\Shell
Folders,Favorites,C:\Documents and Settings\Administrator\Favorites
...
```

Below is an example excerpt from a raw log file for monitored events of a sample during the automated analysis of the sample, which is an example excerpt of a raw event log.

```
"registry","0x000110ab","1508","C:\WINDOWS\explorer.exe","SetValueKey","\REGISTRY\USER\S-1-5-21-2052111302-1214440339-682003330-500\SessionInformation\ProgramCount","Value:1","Type:4"
"file","0x0001114c","908","C:\WINDOWS\system32\svchost. exe","Write","C:\WINDOWS\Tasks\pan_test.job"
"registry","0x000116d1","1324","C:\Documents and Settings\Administrator\explorer.exe","SetValueKey","\REGISTRY\USER\S-1-5-21-2052111302-1214440339-682003330-500\Software\Microsoft\Windows\CurrentVersion\Explorer\Shell Folders\Personal","Value:C:\Documents and Settings\Administrator\My Documents","Type:1"
"registry","0x000116df","1324","C:\Documents and Settings\Administrator\explorer.exe","SetValueKey","\REGISTRY\USER\S-1-5-21-2052111302-1214440339-682003330-500\Software\Microsoft\Windows\CurrentVersion\Explorer\MountPoints2\{5424727b-91a4-11e2-9388-806d6172696f}\BaseClass","Value:Drive","Type:1"
"registry","0x000116e0","1324","C:\Documents and Settings\Administrator\explorer.exe","SetValueKey","\REGISTRY\USER\S-1-5-21-2052111302-1214440339-682003330-500\Software\Microsoft\Windows\CurrentVersion\Explorer\MountPoints2\{4bf5404a-da64-11e4-81dd-806d6172696f}\BaseClass","Value:Drive","Type:1"
"registry","0x000116e1","1324","C:\Documents and Settings\Administator\explorer.exe","SetValueKey","\REGISTRY\USER\S-1-5-21-2052111302-1214440339-682003330-500\Software\Microsoft\Windows\CurrentVersion\Explorer\MountPoints2\{54247278-91a4-11e2-9388-806d6172696f}\BaseClass","Value:Drive","Type:1"
"registry","0x000116e5","1324","C:\Documents and Settings\Administrator\explorer.exe","SetValueKey","\REGISTRY\MACHINE\SOFTWARE\Microsoft\Windows\CurrentVersion\Explorer\Shell Folders\Common Documents","Value:C:\Documents and Settings\All Users\Documents","Type:1"
...
```

Below is an example of excerpts of an XML, report generated as an output from the automated analysis of a sample.

```
<?xml version="1.0"?>
<report><version>3.0</version>
<platform>2</platform>
<software>Windows XP, Adobe Reader 9.4.0, Flash 10, Office 2007</software>
<sha256>0000003c2830d7850d4d75d30e2653857bac4fc4a4443d53152b6f9cfbe2992d</sha256>
<md5>a95b96adf9734ce6c2831304c94e3ff1</md5>
<size>348053</size>
<malware>no</malware>
<summary>
        <entry score="0.0" id="2" details="The Windows system folder contains
        configuration files and executables that control the underlying functions of the
        system. Malware often modifies the contents of this folder to manipulate the system,
        establish persistence, and avoid detection.">Created or modified a file in the Windows
        system folder</entry>
        <entry score="0.0" id="3" details="Legitimate software creates or modifies files to
        preserve data across system restarts. Malware may create or modify files to deliver
        malicious payloads or maintain persistence on a system.">Created or modified a
        file</entry>
        <entry score="0.0" id="13" details="The Windows Registry houses system
        configuration settings and options, including information about installed
        applications, services, and drivers. Malware often modifies registry data to establish
        persistence on the system and avoid detection.">Modified the Windows
        Registry</entry>
        <entry score="0.0" id="2034" details="When opening a process, the Windows API
        returns a handle or reference to the target process. When duplicating the handle,
        elevated permissions can be requested and a malicious sample may do this to
        obfuscate its malicious behavior.">Opened another process permission to duplicate
        handle</entry>
        <entry score="0.0" id="2031" details="By opening another process with full access a
        malicious sample has full control over it and can perform malicious actions such as
        reading its memory, injecting malicious code, or terminating it.">Opened another
        process with full access</entry>
</summary>
<evidence>
        <file/>
        <registry/>
        <process/>
        <mutex/>
</evidence>
```

```
-continued
<timeline>
<entry seq="1">Created Process C:\Program Files\Internet Explorer\iexplore.exe</entry>
<entry seq="2">Set key \REGISTRY\USER\S-1-5-21-2052111302-1214440339-682003330-
500\Software\Microsoft\Windows\CurrentVersion\Explorer\Shell Folders\Desktop to value
C:\Documents and Settings\Administrator\Desktop</entry>
<entry seq="3">Set key \REGISTRY\USER\S-1-5-21-2052111302-1214440339-682003330-
500\Software\Microsoft\Windows\CurrentVersion\Explorer\Shell Folders\Favorites to value
C:\Documents and Settings\Administrator\Favorites</entry>
<entry seq="4">Set key \REGISTRY\USER\S-1-5-21-2052111302-1214440339-682003330-
500\Software\Microsoft\Windows\ShellNoRoam\BagMRU\NodeSlots to value NULL</entry>
<entry seq="5">Created mutex Shell.CMruPidlList</entry>
...
</timeline>
<network>
        <UDP port="123" ip="23.99.222.162" country="US"/>
        <dns type="NS" response="a7-131.akadns.net" query="akadns.net"/>
        <dns type="A" response="23.99.222.162" query="time.windows.com"/>
        <dns type="NS" response="a3-129.akadns.net" query="akadns.net"/>
...
</network>
<process_tree>
        <process text="C:\Program Files\Internet Explorer\iexplore.exe" pid="1368"
        name="iexplore.exe"/>
</process_tree>
<process_list>
        <process pid="1368" name="iexplore.exe" command="C:\Program Files\Internet
        Explorer\iexplore.exe"><process_activity/>
        <registry>
        <Create subkey="Software\Microsoft\Windows\CurrentVersion\Explorer\User Shell
        Folders" key="HKEY_CURRENT_USER"/>
        <Create subkey="Software\Microsoft\Windows\CurrentVersion\Explorer\Shell Folders"
        key="HKEY_CURRENT_USER"/>
        ...
        <Set subkey="Desktop" key="\REGISTRY\USER\S-1-5-21-2052111302-1214440339-
        682003330-500\Software\Microsoft\Windows\CurrentVersion\Explorer\Shell Folders"
        data="C:\Documents and Settings\Administrator\Desktop"/>
        <Set subkey="Favorites" key="\REGISTRY\USER\S-1-5-21-2052111302-1214440339-
        682003330-500\Software\Microsoft\Windows\CurrentVersion\Explorer\Shell Folders"
        data="C:\Documents and Settings\Administrator\Favorites"/>
</registry>
<file>
<Create type="N/A" name="C:\Documents and Settings\Administrator\Local
Settings\Temp\REG7.tmp" size="N/A" sha256="N/A" sha1="N/A" md5="N/A"/>
<Create type="N/A" name="C:\Documents and Settings\Administrator\Local
Settings\Temp\REG8.tmp" size="N/A" sha256="N/A" sha1="N/A" md5="N/A"/>
<Create type="N/A" name="\\?\C:\Documents and Settings\Administrator\Application
Data\Macromedia\Flash Player\macromedia.com\support\flashplayer\sys\settings.sxx"
size="N/A" sha256="N/A" sha1="N/A" md5="N/A"/>
<Create type="unknown" name="C:\Documents and Settings\Administrator\Local
Settings\History\History.IE5\MSHist012016021820160219\index.dat" size="32768"
sha256="b2f2400a9250b715ffbcb6c349a166f8b39fd0ada1b27966cfcb4bfe752c2c83"
sha1="ffeb18ae08240996c0dae419a7890d723f3221e0"
md5="299fb4ed010194c5c1b0323c300887d6"/>
...
<Delete type="unknown" name="\\?\C:\Documents and Settings\Administrator\Application
Data\Macromedia\Flash Player\macromedia.com\support\flashplayer\sys\settings.sol"
size="46"
sha256="90CB9360E98292B3670D4F43B6D95C3638C22639ADD54903C099C446781BC69F"
                                sha1="1882a610e32eea87b5d36df1b37f9b092c24eed2"
md5="474B98DCC92FF3820AC89C4960288390"/>
...
</file>
<service/>
<mutex>
<CreateMutex name="Shell.CMruPidlList"/>
<CreateMutex name="c:!documents and settings!administrator!local settings!temporary
internet files!content.ie5!"/>
...
</mutex>
<java_api/>
</process>
</process_list>
</report>
```

Tag Processing

In an example implementation, elastic search percolation can be utilized to determine if the sample document that is being added matches any configured queries (e.g., tags, such as further described below) in the system. If it is, a list of tags is returned which are parsed into tag categories (e.g., support_id (C#), tag_definition_id (T#), and tag_definitions_search_id (S#)). The tag list can then be pushed into MySQL DB 334 in a sample tag table based on the sample's SHA. In addition, if the sample is public (is_public), an alert can be triggered (e.g., by calling a stored procedure AlertOnPublicSample). Samples that are newly tagged or whose tags have been changed since the last time they were added have their SHA stored in a sample ready table in MySQL DB 334. The sample_ready table can be used by the session from the sample producer to produce all the sessions for that SHA.

For example, tagging data can also be added to ES for efficient queries. In an example implementation, to improve performance, the tag data can be embedded as a standalone child document keyed by the sample's SHA rather than as part of the sample document itself. This approach facilitates efficient updating of the tags on a sample in ES without impacting the larger document itself.

Session Data

In an example implementation, a session document is implemented as a child document of the sample document. The fields produced by the session producer can be ingested as is and embedded in the task document. Example session fields can include one or more of the following: app, device.acctname, device.country, device.countrycode, device.industry, device.ip, device.lob, device.model, device.serial, device.support_id, device.swver, device.hostname, src-.country, src.countrycode, src.ip, src.port, src.isprivateip, dst.country, dst.countrycode, dst.ip, dst.port, dst.isprivateip, emailrecipient, emailsender, emailsubject, emailsbjcharset, filename, sha256, tstamp, user_id, vsys, session_id, file_url, and isuploaded.

SHA Trackers

Documents that are children of others can upsert their parent in case they do not exist. This can add an overhead impacting overall performance. In an example case, the session document can be affected by this potential scenario. In order to avoid unnecessarily upserting the parent document which may already exist while also not incurring the overhead of querying ES, in an example implementation, each ES consumer can maintain a SHA tracker table of seen SHAs that are populated by sample/task and session consumers as shown in FIG. 3. If a sample's SHA is already in the SHA tracker table, then upserting the parent sample document can be skipped as an update, thus, improving performance of the overall ingestion process and system. For example, a SHA tracker class can be implemented to maintain two tables (e.g., each of a million SHAs), each switching between the two when one is 100% of capacity. At a threshold of capacity (e.g., 75% of capacity or some other threshold value), the secondary table can be populated so as not to maintain a list of the most recent SHAs. The overlap minimizes the upserting of the parent document for SHAs that have already been seen.

Generating an Enhanced View of Malware Analysis Results Using Line Counts

As similarly described above, the significant amount and complex information that is generated by the automated malware analysis presents a technical challenge to identify and/or determine the malicious activity a malware is performing and/or to associate patterns or relationships between malware samples and their features and/or behaviors. Accordingly, techniques for performing line counting are disclosed for generating an enhanced view of malware analysis results using line counts as further described herein.

In one embodiment, the malware analysis platform generates an enhanced view of malware analysis results using line counts of distinct lines in log files that are results of the automated malware analysis. For example, the malware analysis platform can perform the above-described ingestion and transformation to process a set of log files including (e.g., selected/important) malware analysis results activity (e.g., such as static malware analysis results and/or dynamic malware analysis results, which can include mutex usages, network activities, registry changes, API calls, and/or various other selected/important malware analysis results activity).

For example, the disclosed line counting techniques can be performed to provide a statistical view of the malware analysis results data (e.g., across different enterprise networks of subscribers/customers to the malware analysis platform service, categories of customers/industries, etc.), such as including one or more of the following: (1) common actions/attributes that have been observed at least a threshold number of times in both benign and malware samples; (2) (malicious/suspicious) actions/attributes (e.g., suspicious artifacts) that have been observed at least a threshold number of times in malware samples and only observed a relatively lower threshold number of times in benign samples; and (3) actions/attributes (e.g., highly-suspicious artifacts) that have been observed at least a threshold number of times in benign samples and only observed a relatively lower threshold number of times in malware samples.

In one embodiment, a system/process/computer program product for a malware analysis platform for threat intelligence made actionable includes generating a human readable format of malware analysis result log files (e.g., replacing numeric identifiers and removing not-interesting parameters, such as described herein); determining a first occurrence of each distinct line in each log file (e.g., and removing duplicate lines within the log file); and counting how many times each distinct line is observed in malware samples as compared with benign samples.

In one embodiment, the disclosed line counting techniques are similarly applied to generate sub-line counts, such as further described herein. For example, a subset of each line can be counted, such as to implement sub-line/attribute/parameter counting (e.g., based on a registry name, mutex, file name, and/or other attributes/parameters, rather than the entire/whole line).

In one embodiment, the disclosed line counting techniques are similarly applied to generate the line/sub-line counts for a specified date range and/or a specified set of samples, such as further described herein.

For example, the disclosed line counting techniques can be performed to identify the suspicious and/or highly-suspicious lines/sub-lines in a log file for a given malware sample (e.g., by determining the lines/sub-lines in the log file that are associated with a high malware count and/or a low benign count, such as further described herein). In this example, the suspicious and/or highly-suspicious lines/sub-lines can then also be utilized to automatically generate a new signature for detecting malware for that malware sample. In this example, the disclosed line counting techniques can also be performed as a validation/proofing system to test and validate the new signature and examine the line count results.

Figure 4:
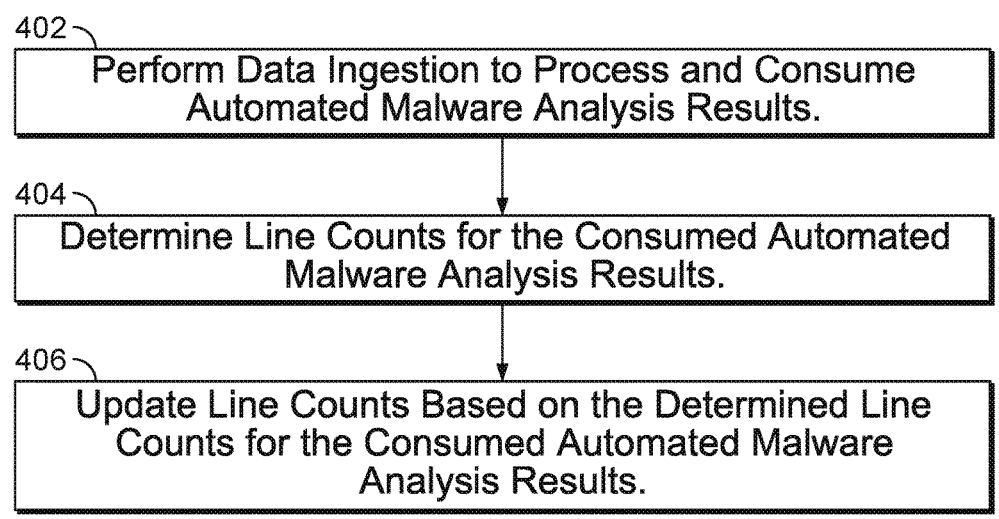
FIG. 4 is a flow diagram for performing a data ingestion process for the malware analysis platform for threat intelligence to update line counts made actionable in accordance with some embodiments.

Performing Data Ingestion of Malware Analysis Results to Generate and/or Update Line Counts Associated with Analyzed Malware Samples FIG. 4 is a flow diagram for performing a data ingestion process for the malware analysis platform for threat intelligence to update line counts made actionable in accordance with some embodiments. In various embodiments, the process shown in FIG. 4 is performed by the architecture and systems as similarly described above with respect to FIGS. 1-3.

At 402, data ingestion to process and consume (e.g., transform) automated malware analysis results is performed. In one embodiment, the data ingestion process is performed using techniques similarly described above with respect to FIG. 3. For example, the data ingestion process can be configured to execute once per day or some other periodic setting, and/or on demand.

At 404, line counts for the consumed automated malware analysis results are determined. In one embodiment, lines are generated based on a dynamic malware analysis (e.g., dynamic analyzer(s)) and/or a static malware analysis (e.g., static analysis artifacts), performed by the automated malware analysis system, such as similarly described above. For example, the performance of the data ingestion process can process any new and/or updated malware sample analysis results from the automated malware analysis system to determine verdicts and/or verdict changes for every line associated with a given sample (e.g., a line can include an observation that was identified during the static or dynamic malware analysis, such as a call to a given API, a request for a given URL, a call to a given library, and/or various other information/observations, such as further described herein) to determine if the sample is malware, benign, or grayware (e.g., adware or another type of grayware).

At 406, line counts are updated based on the consumed automated malware analysis results. In an example implementation, the processing of any new and/or updated malware sample analysis results from the automated malware analysis system can be implemented by performing a MapReduce (M/R) job(s) to update a table of verdict changes/updates in a Key Value (KV) database (e.g., an incremental table for updated line counts can be stored in HBase 330 to keep track of the key, such as a SHA value of the whole line for compressed data storage for efficiency, old verdict, and new verdict to facilitate incremental/update data based on malware sample processing since a last time the M/R job was executed). In this example, a M/R job can then be performed to update the historic counts in the KV database (e.g., a historic table for line counts in HBase 330) based on the new/incremental data in the incremental table of verdict changes/updates. As a result, the updated line counts are then stored in the updated historic table for line counts in the KV database based on the new line counts computed based on incremental data values from the incremental table to the historic table data for each line to update their respective line counts (e.g., the line counts can increase or decrease based on verdicts/verdict changes). In one embodiment, the disclosed process can include detecting a newly executed malware analysis for a given malware sample and replacing one or more lines associated with the results for that sample in the KV database (e.g., remove existing lines and/or add new lines).

Figure 5:
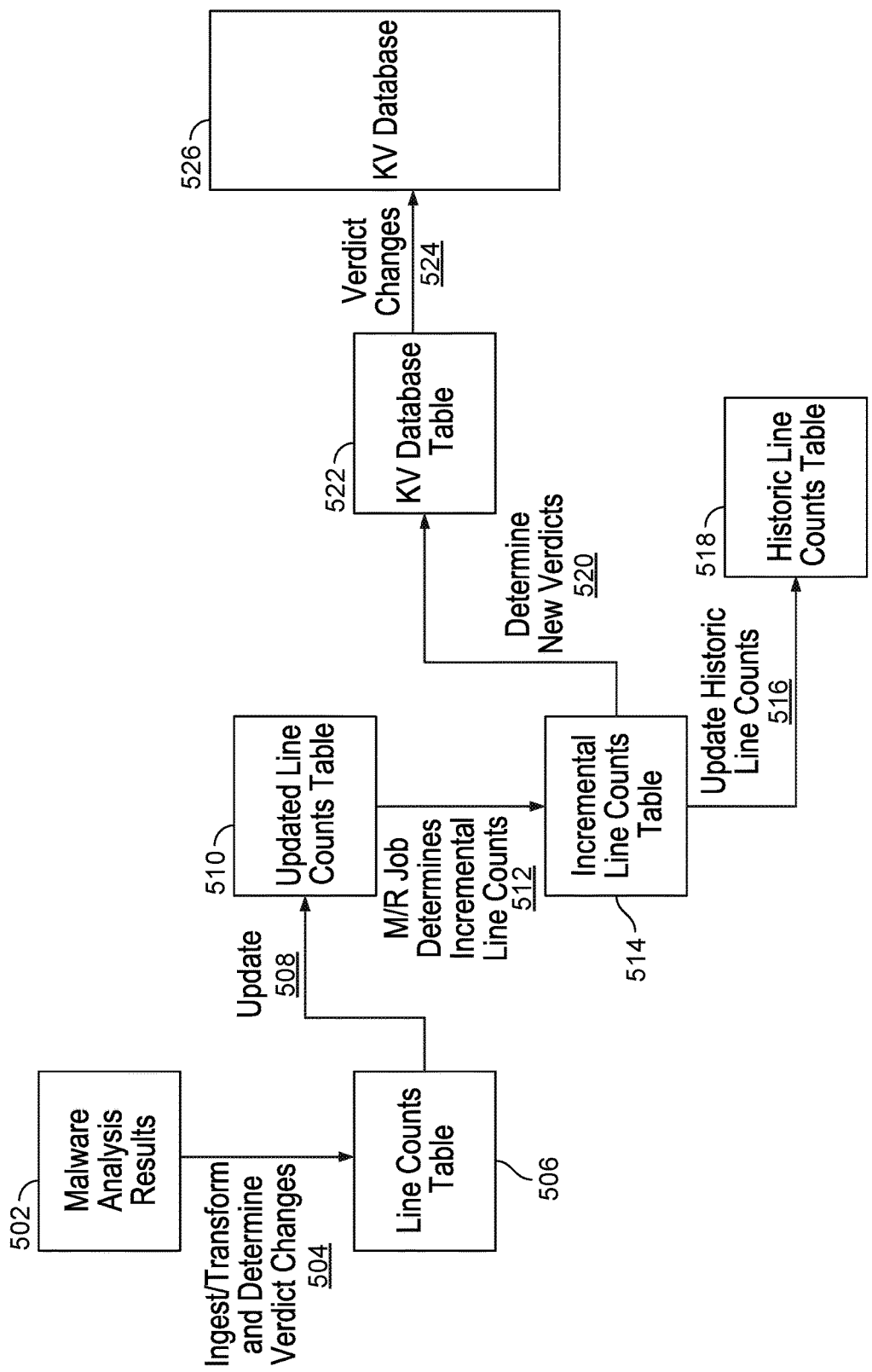
FIG. 5 is a functional diagram for ingestion and processing of results of automated analysis of malware samples to update line counts in accordance with some embodiments.

FIG. 5 is a functional diagram for ingestion and processing of results of automated analysis of malware samples to update line counts in accordance with some embodiments. In various embodiments, the functional components and process shown in FIG. 5 can be implemented using the architecture and systems as similarly described above with respect to FIGS. 1-3.

Referring to FIG. 5, malware analysis results 502 (e.g., log files generated by the automated malware analysis system) are ingested and transformed to determine verdict changes at 504. In one embodiment, the data ingestion and transformation process is performed using techniques similarly described above with respect to FIG. 3. For example, the data ingestion process can be configured to execute once per day or some other periodic setting, and/or on demand.

Line count results are stored in a line counts table 506. As similarly described above, log files of malware analysis results can be de-duplicated to identify distinct lines and then parsed to determine line counts for the consumed automated malware analysis results. In one embodiment, lines are generated based on a dynamic malware analysis (e.g., dynamic analyzer(s)) and/or a static malware analysis (e.g., static analysis artifacts, which can be processed using a M/R job to update the KV database), performed by the automated malware analysis system, such as similarly described above. For example, the performance of the data ingestion process can process any new and/or updated malware sample analysis results from the automated malware analysis system to determine verdicts and/or verdict changes for every line associated with a given sample to determine if the sample is malware, benign, or grayware (e.g., adware or another type of grayware).

At 508, line counts are updated in an updated line counts table 510. At 512, the processing of any new and/or updated malware sample analysis results from the automated malware analysis system can be implemented by performing a MapReduce (M/R) job(s) to update a table of verdict changes/updates in a Key Value (KV) database 526 (e.g., which can be implemented using HBase 330 as shown in FIG. 3) using an incremental line counts table 514 for updated line counts. In an example implementation, the incremental line counts table includes key values, such as a SHA value of the whole line (e.g., for compressed data storage for efficiency) and the incremental line count.

At 516, a historic line counts table 518 is updated based on the incremental line counts table for any lines with incremental value changes. In an example implementation, the historic line counts table can be used for maintaining historic line counts (e.g., based on a last time the M/R job was executed) and can include key values, such as a SHA value of the whole line (e.g., for compressed data storage for efficiency) and the historic line count. In this example, the above-described M/R job can be performed to update the historic line counts in the KV database (e.g., using the incremental line counts table and the historic line counts table) based on the new/incremental data in the incremental table of verdict changes/updates. As a result, the updated line counts are then stored in the updated historic table for line counts in the KV database based on the new line counts computed based on incremental data values from the incremental table to the historic table data for each line to update their respective line counts (e.g., the line counts can increase or decrease based on verdicts/verdict changes). In one embodiment, the disclosed process can include detecting a newly executed malware analysis for a given malware sample and replacing one or more lines associated with the results for that sample in the KV database (e.g., remove existing lines and/or add new lines).

At 520, new verdicts are determined to update a KV database table 522 for storing verdict changes 524 in KV database 526. In an example implementation, the KV database table includes key values, such as a SHA value of the whole line (e.g., for compressed data storage for efficiency), an old verdict value (e.g., a line count value based on a last time the M/R job was executed), and a new verdict value (e.g., a new line count value based on the verdict changes (if any)) to facilitate incremental/update data based on malware sample processing since a last time the M/R job was executed.

As will now be apparent, the above-described techniques and process can similarly be performed for ingestion and processing of results of automated analysis of malware samples to update sub-line counts in accordance with some embodiments as further described below.

Performing Sub-Line (Attribute/Parameter) Counts Associated with Analyzed Malware Samples In one embodiment, the above-described line counting techniques can similarly be applied to a subset of a line. For example, the disclosed line counting techniques can similarly be applied to a subset of a whole line, such as for a given attribute and/or parameter in the line to facilitate attribute and/or parameter counting (e.g., counts can be determined and maintained/updated for calls to a specific URL, API, library, etc. based on the ingestion/transforming and processing of the automated malware analysis results). In this example, the above-described techniques and process for line counting can be similarly applied to sub-line/artifact counting, in which the input is different (e.g., input is a selected sub-line/artifact, such as for DNS data, the sub-line/artifact can be an FQDN, for file data, the sub-line/artifact can be a file name, and so forth). As such, the above-described line counting techniques can be applied to both whole lines as well as to subsets of whole lines as similarly described above.

Performing Line Counts Associated with Analyzed Malware Samples Per Customer or Other Categorizations of Customers In one embodiment, the above-described line counting techniques can similarly be processed by customer or other categorizations of customers (e.g., subscribers of the cloud security service that submit malware samples for automated malware analysis and also subscribe to/utilize the malware analysis platform). For example, line/sub-line counts can also be computed based on customer identifier (e.g., a unique customer ID/serial number(s) that can be associated with samples) or other categorizations of customers (e.g., a categorization by industry, such as government, defense contractors, banks, high tech, retail, etc.). In an example implementation, performing line counts associated with analyzed malware samples per customer can be implemented using the above-described ingestion process as part of the in-take/consumer process and using a set of line/sub-line counting tables per customer, per industry, and/or other categorization(s) of customers (e.g., in which customers can be preclassified into a given category such that their malware samples can be associated with the given category, which can then be extracted and utilized during the ingestion process to implement the above-described line/sub-line counting techniques to be processed by customers or other categorizations of customers).

In one embodiment, a tag (e.g., based on the version of analyzer(s) used for the automated malware analysis for the sample results being processed) is associated with processed malware analysis results for a given line based on the analysis of a given malware sample. For example, a search based on the tag can be performed and/or lines/counts based on the tag can be subsequently removed if that analyzer/version is deemed to be no longer reliable/accurate and/or is replaced with a new version/analyzer.

Interface for a Malware Analysis Platform for Threat Intelligence Made Actionable In one embodiment, an interface is provided for users to interact with the malware analysis platform for threat intelligence. For example, a portal/GUI interface can be provided for users to interact with the malware analysis platform for threat intelligence, such as further described below. As another example, a programmatic/API interface can be provided for users to interact with the malware analysis platform for threat intelligence, such as further described below.

Samples

In one embodiment, for both the automated malware analysis system and the malware analysis platform for threat intelligence made actionable, a sample refers to a file (e.g., a PDF or PE file) or a link included in an email. As similarly described herein, a firewall can send samples (e.g., unknown samples) to the automated malware analysis system for analysis. Different artifacts can then be determined to be associated with the sample as it is executed and observed in the sandbox environment performed by the automated malware analysis system as similarly described above. As further described herein, the malware analysis platform for threat intelligence made actionable allows a user to search for other samples (e.g., submitted by the same customer/subscriber or other customers/subscribers) based on the sample (e.g., based on a hash value of the sample or artifacts associated with the sample based on the processed results of the automated malware analysis for that sample). For example, when a user performs a search in the malware analysis platform for threat intelligence, the search conditions are compared against all historical and new samples as will be further described below.

Artifacts

In one embodiment, an artifact is an item, property, activity, or behavior shown to be associated with a sample through both the automated malware analysis of the sample and through the malware analysis platform statistics. For example, types of artifacts can include file attributes, IP addresses, domains, URLs, applications, processes, hashes, and/or email addresses. In the disclosed malware analysis platform for threat intelligence, artifacts are highlighted both on the dashboard and within search results (e.g., search results spotlight significant artifacts that are identified according to risk; and the dashboard and search editor both can allow a user to add an artifact directly to an ongoing search or to an export list, such as further described below).

Tags

In one embodiment, a tag can be defined based on a collection of search criteria that together indicate a known or possible threat. Both historical and new samples that match to the conditions defined for a tag are associated with that tag. A user can perform searches and create alerts based on tags, such as will be further described below.

In one embodiment, a tag class can be defined to associate a tag with a known actor, targeted campaign, malware family, malicious behavior, or an exploit. For example, using the interface for the malware analysis platform for threat intelligence made actionable as further described below, users can search for tags based on the tag class and/or can also search for tags that do not have a specified tag class.

Public Tags and Samples

In one embodiment, public tags and samples in the malware analysis platform are tags and samples that are visible to all users of the malware analysis platform. For tags created by a given user, the user can set the status to be public, so that the tag is visible to users of the malware analysis platform (e.g., and the user can also revert the tag to be private).

Private Tags and Samples

In one embodiment, private tags and samples in the malware analysis platform are tags and samples that are visible only to users associated with the subscriber (e.g., with the same support account to the cloud security service and service for the malware analysis platform). Private tags and samples can be made public (e.g., with the option to revert the tag or sample back to a private status).

Suspicious Artifacts

In one embodiment, suspicious artifacts are artifacts that are determined to have been widely detected across large numbers of samples and are most frequently detected with malware. Though the artifact is often also detected with grayware and benign samples, it is relatively less than the frequency with which it is found with malware. In an example implementation, suspicious artifacts can be determined using line counting techniques based on a line count calculation that the artifact (e.g., line or sub-line) is associated with malware samples at least a threshold value more times than it is associated with benign samples (e.g., a threshold value of three times, such as malware line counts (m#)>3×benign line counts (b#), or some other threshold value or calculation can be applied). Techniques for determining whether artifacts are suspicious artifacts are further described below.

Highly Suspicious Artifacts

In one embodiment, highly suspicious artifacts are artifacts that are determined to have been detected in very few samples (e.g., a lack of distribution of these types of artifacts could indicate an attack crafted to target a specific organization) and are most frequently detected with malware. In some cases, these artifacts have been exclusively seen with malware, and not observed (or rarely observed) with grayware or benign samples. In an example implementation, highly suspicious artifacts can also be determined using line counting techniques based on a line count calculation that the artifact (e.g., line or sub-line) is associated with malware samples at least a threshold value more times than it is associated with benign samples and is found in a threshold number of malware samples (e.g., a threshold value of three times, such as m#>3×b#, and the artifact (e.g., line or sub-line) is associated with fewer than a threshold number of malware samples (e.g., m#<500 samples); or some other threshold values or calculations can be applied). Techniques for determining whether artifacts are highly suspicious artifacts are further described below.

Actor

In one embodiment, an actor is an individual or group that instigates malicious activity. In an example implementation of the malware analysis platform, a user can perform a search for malware that is indicative of a threat actor (e.g., using the interface to select search and searching on the condition Tag Class>is>Actor). A user can also create a tag to indicate that samples matched to that tag are related to an actor.

Campaign

In one embodiment, a campaign is a targeted attack which might include several incidents or sets of activities. In an example implementation of the malware analysis platform, a user can perform a search for malware that has been classified as belonging to a campaign (e.g., using the interface to select search and searching on the condition Tag Class>is>Campaign). A user can also create a tag to indicate that samples matched to that tag are part of a campaign.

Family

In one embodiment, malware is grouped into a malware family. Malware might be considered related based on shared properties or a common function. In an example implementation of the malware analysis platform, a user can perform a search for malware that has been identified as belonging to a malware family (e.g., using the interface to select search and searching on the condition Tag Class>is>Malware Family). A user can also create a tag to indicate that samples matched to that tag are part of a malware family.

Figure 6:
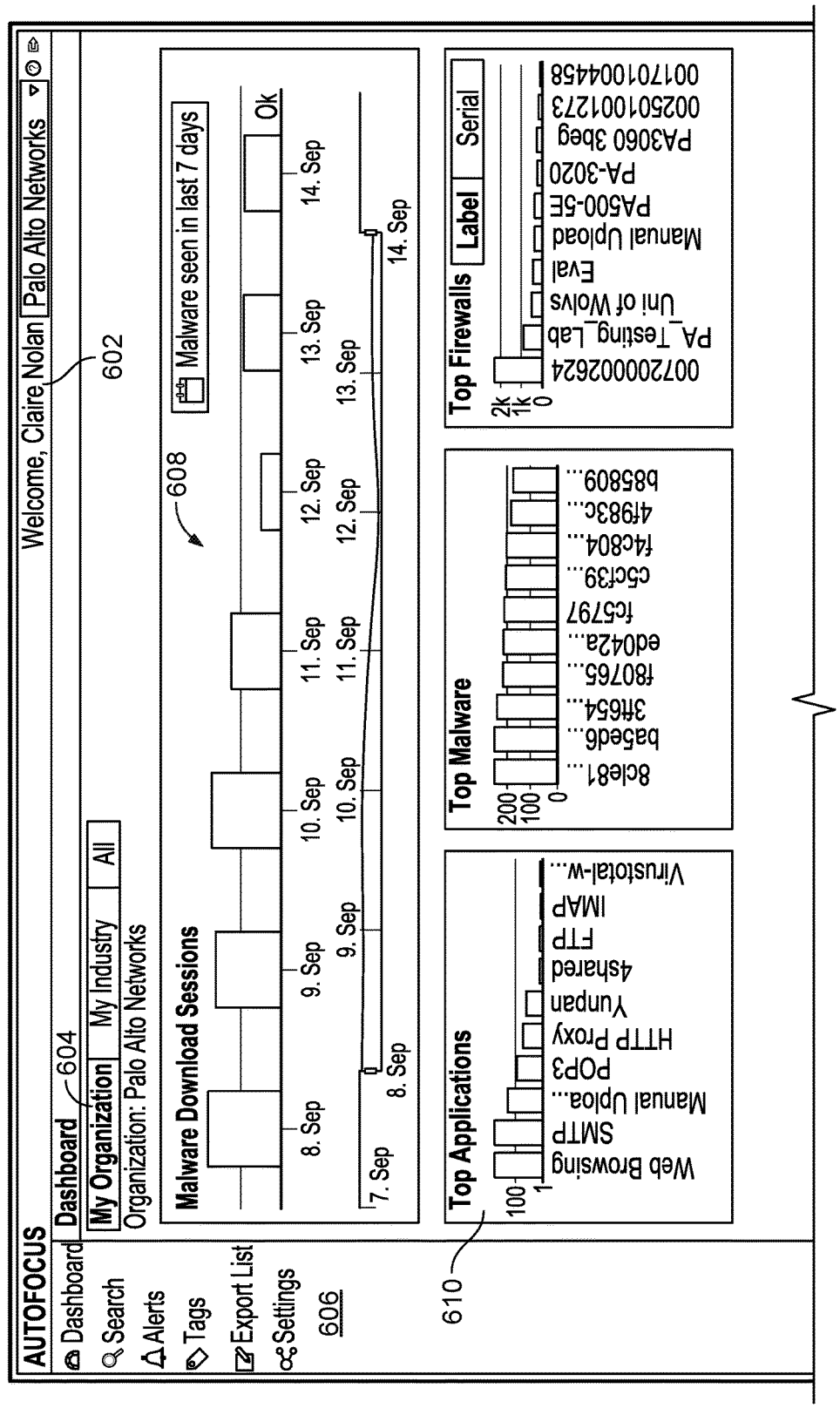
FIG. 6 is a screen shot of a dashboard of an interface for the malware analysis platform for threat intelligence made actionable in accordance with some embodiments.
Figure 6:
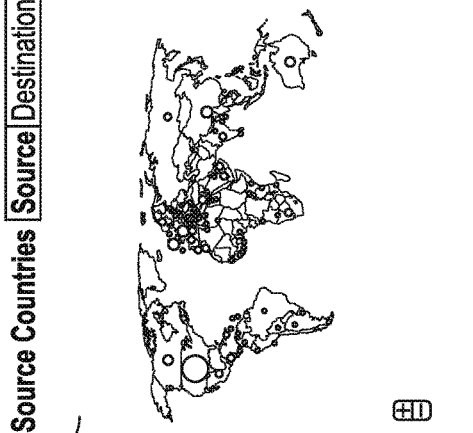

Dashboard for a Malware Analysis Platform for Threat Intelligence Made Actionable FIG. 6 is a screen shot of a dashboard of an interface for the malware analysis platform for threat intelligence made actionable in accordance with some embodiments. In one embodiment, a portal interface for the malware analysis platform for threat intelligence made actionable includes a dashboard as shown in FIG. 6. For example, the dashboard can present a visual landscape of network, industry, and global threat artifacts. A threat artifact can be a sample hash (e.g., identifying a link included in an email or a file, such as a Portable Document Format (PDF) or Portable Executable (PE)), a statistic, a file property, or behavior that shows a correlation with malware.

In one embodiment, a user can set a context of the dashboard to display activity and artifacts for their organization only, or to instead view data at an industry or global level. A user can also expand or narrow the time range of the data displayed to view threat activity for a broad or limited time frame, respectively. In this example, the dashboard widgets can be implemented to be interactive, such that the user can hover a cursor over an artifact to view artifact details or click an artifact to add it to a search.

In one embodiment, the dashboard is configured to visually weight a subscriber's network data alongside industry and global data, in order to provide both a context for their network activity and a window into threats targeting similar organizations. In one embodiment, the dashboard is configured to facilitate a focus on pervasive threat activity and add top artifacts directly to the search editor. These and other aspects and features of the dashboard will be further described below.

Referring to FIG. 6, in one embodiment, the dashboard provides access to multiple accounts for the malware analysis platform for threat intelligence. As shown at 602, users (e.g., threat researchers or other users) can have access to multiple support accounts and can select a single support account to view data from the devices associated with that account.

In one embodiment, a user can select a dashboard tab, as shown at 604, to set the context for the data displayed: My Organization, My Industry, or All. In this example, threat data and activity is displayed on the dashboard widgets updates to reflect the context selected. The widgets are interactive and can be used to drill down and investigate malware or event details. Users can also hover over artifacts displayed on the dashboard to reveal additional details, or click on an artifact to add the artifact to the search editor. The dashboard displays data for a period of time (e.g., a default period of time can be the last seven days or another period of time). Also, the data displayed on the dashboard can be filtered by context (e.g., move between the tabs to set the dashboard context, displaying the varying threat landscapes for network, industry, or globally) and/or filtered by date (e.g., set the dashboard to display data for the last 7, 30, 90, 180 days, all time, or another time period).

In one embodiment, a user can utilize a navigation pane, as shown at 606, to navigate between features (e.g., including search, alerts, tags, and export list features that can be accessed by selecting the respective features in the navigation pane as shown) that allow the user to search global and historical threat data and to manage malware tags and alerts (e.g., techniques for smart tagging and alerting of analyzed malware sample results using the disclosed malware analysis platform for threat intelligence made actionable is further described below). In this example, a search editor is provided that allows users to perform free form searches using Boolean logic. For example, a user can set up a search based on threat artifacts gathered from their enterprise network environment, or from viewing industry or global data on the dashboard (e.g., to drill down on search results to find, for example, high-risk artifacts, including the number of times that artifacts, such as an IP address, have been detected with malware, benign, and grayware samples). As another example, a user can set up alerts based on tags, such as using public tags and/or private tags to generate alerts when matched to public and/or private samples (e.g., depending on alert settings, including prioritized alert notifications for certain types of tags, such as further described below). In an example implementation, a tag is a set of conditions compared against historical and new samples analyzed using the malware analysis platform for threat intelligence. In this example, users can also publish tags in the malware analysis platform for threat intelligence made actionable to identify and help users detect known threats (e.g., select tags in the navigation pane to view private tags and public tags shared by other users). As yet another example, a user can select the export list feature in the navigation pane to export artifacts, such as IP addresses, URLs, and domains to an export data format (e.g., a CSV file or another file format). In this example, users can use the exported artifacts (e.g., CSV file) to import the data to security information and event management (STEM) tools or to support a firewall block list (e.g., a Palo Alto Networks firewall Dynamic Block List or a firewall block list supported by another commercially available firewall solution). As also shown in this example, the settings feature can be selected to configure various portal settings (e.g., preferred hash type used by default as the sample or session identifier for search results: SHA-1, SHA-256, MD-5, or another hash algorithm; share public tags anonymously; API key for API access to the malware analysis platform, and/or other settings).

In one embodiment, the dashboard displays a malware download sessions histogram (e.g., a graph or chart) as shown at 608. In this example, the malware download sessions histogram displays the malware sessions for samples detected for the first time in the selected time range. Sessions with known malware (e.g., malware that was first seen before the selected time range) are not reflected in this example. A user can adjust the histogram sliders to narrow or broaden the date range. Dashboard widgets are also filtered according to the time range that is selected.

In one embodiment, the dashboard includes dashboard widgets as shown at 610. In this example, the dashboard widgets highlight the top ten artifacts depending on the context (e.g., organization, industry, or all) and time range selected, including the following: Top Applications (e.g., displays the ten most used applications); Top Malware (e.g., displays the ten malware samples with the most hits); Top Firewalls (e.g., displays ten firewalls with the most sessions where malware samples were detected; a user can select the Organization tab on the dashboard to display the Top Firewalls in their network); and Target Industries (e.g., displays the ten industries with the highest counts of malware detected; a user can select the All tab on the dashboard to display target industries on a global scale). In an example implementation, a user can also click a single bar in any widget to drill down on dashboard widgets. The artifact can be added to the search editor as a search condition, which allows the user to then search on the artifact and/or to tag it (e.g., generate a tag based on the artifact and/or conditions associated with the artifact).

In one embodiment, the dashboard includes a map of source/destination geographies (e.g., countries) as shown at 612. In this example, the dashboard allows a user to view malware hot spots geographically. The user can select Source to display countries with high rates of malware sessions originating from those countries, or select Destination to display countries with high rates of targeted attacks. Larger bubbles can be displayed on the map to indicate higher rates of activity as shown in this example. A user can also zoom in to more closely examine the number of malware sessions by source or destination country.

In one embodiment, the dashboard includes a Top Tags chart as shown at 614. In this example, a user can view the tags (e.g., smart tags) matched to the highest number of samples (e.g., including a user/subscriber's private tags, platform service provider alerting tags that are configured/defined by threat intelligence experts associated with the platform service provider—Palo Alto Networks in this example (shown as Unit 42 tags in this example), and public tags, which can be shown as distinguished based on the type of the tags—private, Unit 42, and/or public). As shown, the Top Tags list is sorted according to the number of samples matched to the tag in the date range selected on the malware sessions histogram (e.g., as shown at the top of the dashboard). For each tag, the list also displays the total number of samples that have been matched to the tag and the date and time that the most recent matching sample was detected. In an example implementation, a Top Tags Widget is provided such that a user can choose Tag Types to display the Top 20 private tags, Unit 42 alerting tags, Unit 42 informational tags, and/or public tags, and the user can select a tag to view tag details, including a description of the condition or set of conditions that the tag identifies, or to add the tag to a search.

In one embodiment, the dashboard includes an Alerts Log as shown at 616. In this example, a user can view the latest set of alerts (e.g., the most recent 20 alerts or some other number of recent alerts) on malware matching enabled public, private, or Unit 42 tags. In an example implementation, prioritized alerts can be configured to be automatically pushed to subscribers/users (e.g., delivered through email or over HTTP to selected network/security admins for the subscribing customer).

In one embodiment, the dashboard includes a list of Recent Unit 42 Research as shown at 618. In this example, a user can browse quick links to the latest research, news, and resources from Unit 42, the threat intelligence experts associated with the platform service provider—Palo Alto Networks in this example.

Search on the Malware Analysis Platform for Threat Intelligence Made Actionable

In one embodiment, the interface for the malware analysis platform for threat intelligence made actionable includes a search feature (e.g., as similarly described above with respect to FIG. 6). In an example implementation, the search feature can facilitate searching of threat data generated, maintained, and indexed by the malware analysis platform for threat intelligence made actionable using various techniques described herein. For instance, the search feature can facilitate searches of sample analysis results (e.g., including artifacts) and drill down into the search results as further described below.

Figure 7A:
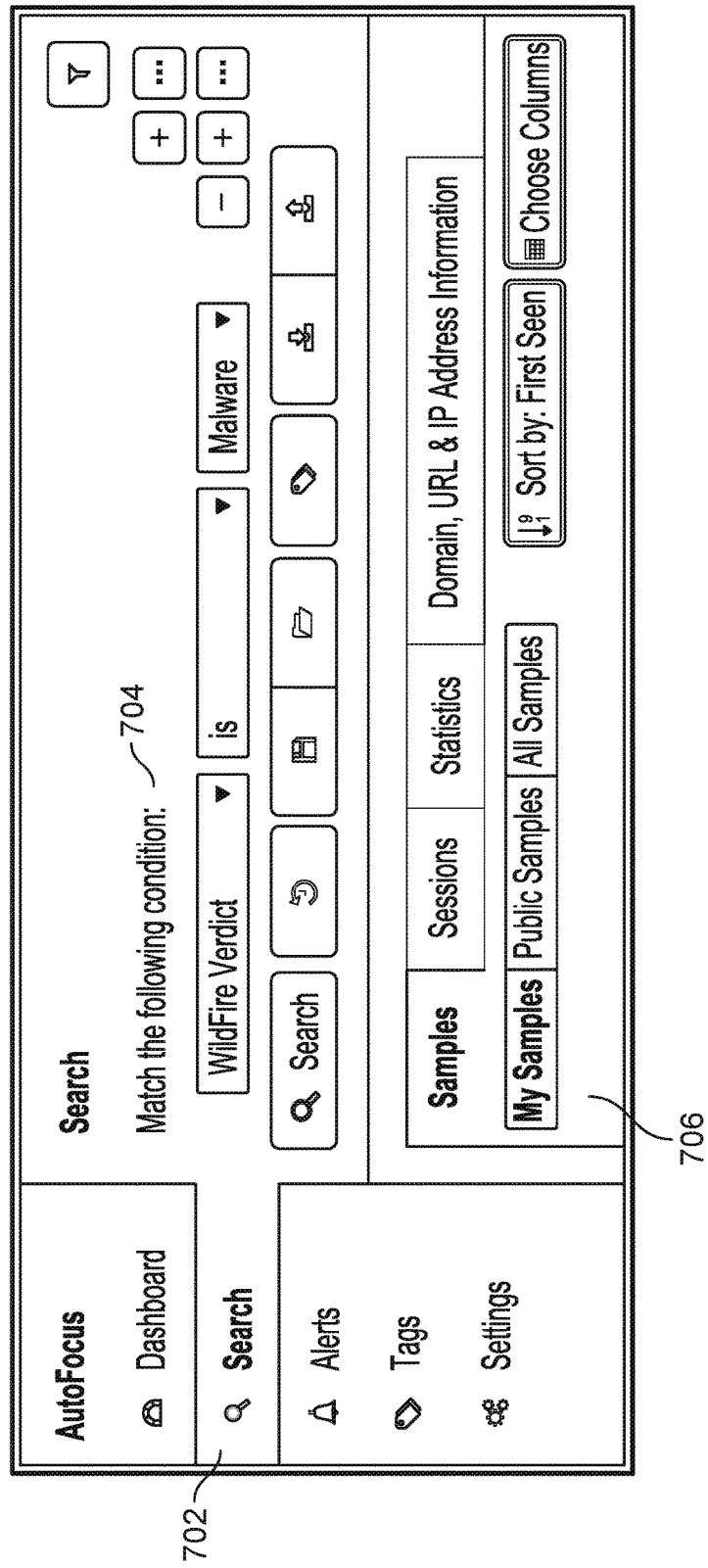

FIGS. 7A-7B are screen shots of a search editor of an interface for the malware analysis platform for threat intelligence made actionable in accordance with some embodiments. In one embodiment, a portal interface for the malware analysis platform for threat intelligence made actionable includes a search editor as shown in FIGS. 7A-7B.

In one embodiment, the platform includes a search editor to perform complex searches, with conditions that allow users to narrow or broaden the scope of a search. In this example, users can toggle their view of search results to find: the samples matched to the selected search conditions (e.g., using a Samples tab); the sessions during which the samples were detected (e.g., using a Sessions tab); the top artifacts associated with the returned samples (e.g., using a Statistics tab); and/or the passive DNS history and categorization of the results (e.g., using a Domain, URL & IP Address Information tab). After performing a search, users can drill down in sample results to find artifacts seen with that sample. For each artifact associated with a sample, the platform lists the number of times the artifact has been detected with benign (#B), grayware (#G), and malware (#M) samples. Artifacts that are seen disproportionately with malware are indicated to be Suspicious or Highly Suspicious, such as using various techniques described herein for determining whether the samples are suspicious or highly suspicious.

Referring to FIG. 7A, a search function on the malware analysis platform for threat intelligence made actionable is selected by clicking on the Search function in a navigation pane as shown at 702. For example, users can then add criteria in the search editor to begin a new search, use a saved search, and/or import a new search. As similarly described above, users can also click on an artifact highlighted on the dashboard, and then the search editor displays with the artifact listed as a search condition.

As shown at 704, users can add one or more search conditions using the search editor that can be processed for generating search results based on the one or more search conditions. For example, to create a search condition, a user can add the category for which the user wants to search and define the scope and value of the category. First, the user can select a category from the drop-down menu to perform a search of global threat data based on that category, such as the category shown as "verdict" in this example (e.g., categories can include hash value (MD5, SHA-256, etc.), verdict, and/or other categories). Second, the user can select an operator for the search condition, such as the operator shown as "is" in this example (e.g., operators can include is, is not, is in the list, is not in the list, has no value, has any value, and/or other operators). The operator determines the scope of search results; the user can use the operator to limit or expand potential results, or to return exact match results. The operators available can vary depending on the search category selected. Third, the user can enter or select a value to define the search condition. Depending on the category and operator selected, predefined values may be available to choose from, or users may be requested to enter a unique value to perform the search. As shown at 706, the user can select whether the search is performed with respect to all samples, public samples, or the samples associated with the user's account/entity (e.g., shown as My Samples in this example).

Referring to FIG. 7B, the search editor can also include a child query to facilitate a search including a condition or a set of conditions nested with and used to qualify a parent query. In this example implementation, a child query, as shown at 712, is evaluated only against the parent query, as shown at 710, to which it is added. A user can add a child query to return more granular search results, where the results match to the parent query only when the child query is also true. The example search illustrated in FIG. 7B shows a child query added to the Email Subject condition. Search results will be returned for samples where the following is true: (1) the sample was first seen before Mar. 13, 2015; and (2) the email subject for the sample file contained the word test and received a WildFire verdict of either malware or grayware. In this example, users can also Move Up or Move Down search conditions to move conditions to or from a child query. Depending on the placement of a condition, users can move it up or down to include it in a child query. Users can also move a condition up or down to remove it from a child query so that it is no longer a nested condition—in this case, the condition is evaluated with all (or any) other search conditions, and is not evaluated against only the parent query.

In one embodiment, searches can be saved. For example, users can save searches that the users may be performing on a regular basis, or in order to quickly recreate useful search settings.

Figure 8:
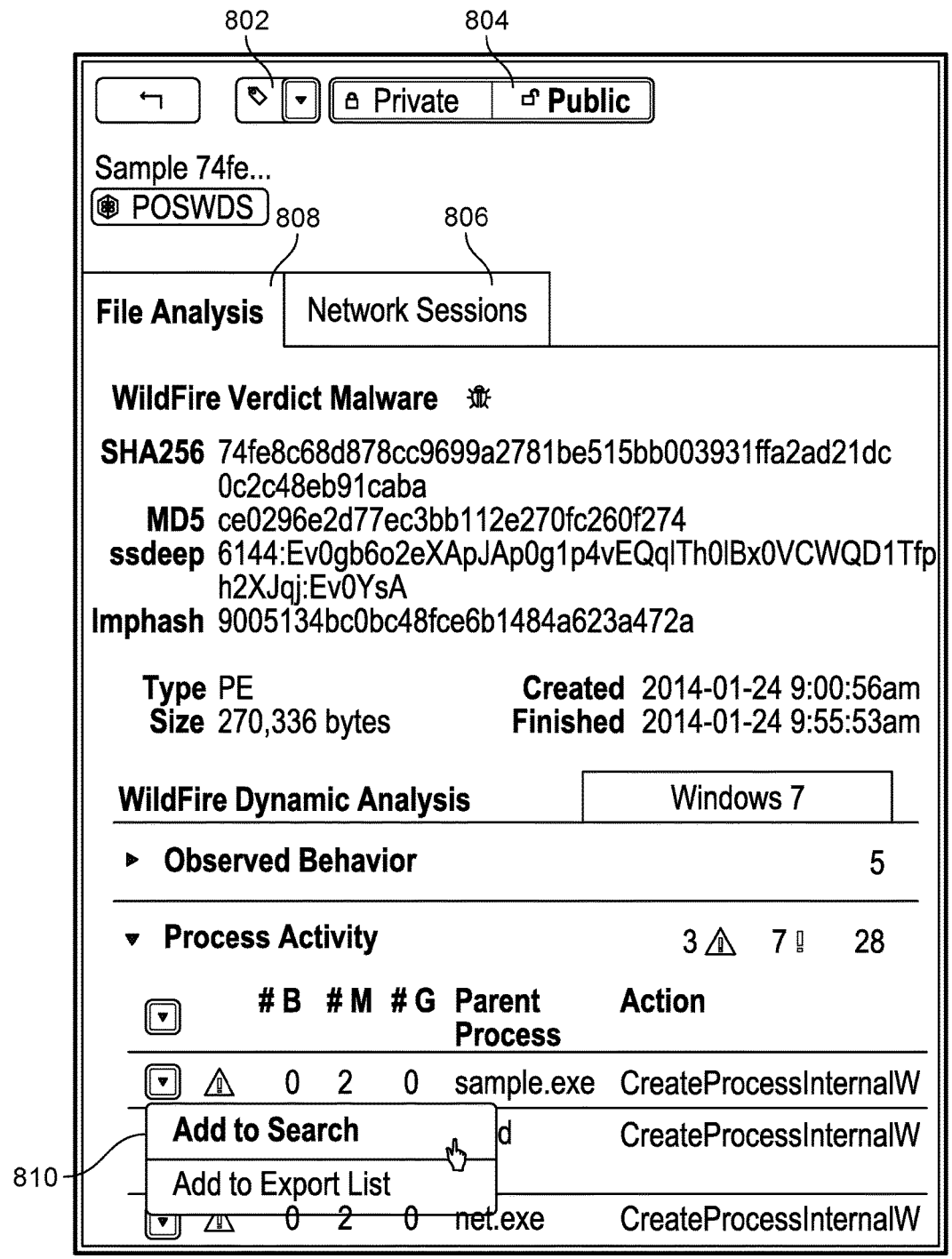
FIG. 8 is a screen shot of a samples search view of a search editor of an interface for the malware analysis platform for threat intelligence made actionable in accordance with some embodiments.

FIG. 8 is a screen shot of a samples search view of a search editor of an interface for the malware analysis platform for threat intelligence made actionable in accordance with some embodiments. In one embodiment, a tag can be created based on search conditions. As shown at 802, a sample can be tagged to tag the sample as a threat indicator. For example, a Tag Results icon can be selected to generate a tag based on search conditions of a given set of search criteria entered or saved using the search editor. In some cases, tags can be used to define a set of conditions that indicate an important network event or a possible or known threat. For instance, this feature can be utilized by users to tag a search so that any existing or future samples that match to the search are efficiently and accurately tagged and can be automatically identified and tracked using the malware analysis platform for threat intelligence. The tag can be saved with a name and a description.

As shown at 804, a sample can be shared as a public sample to share the sample with other security experts. In this example, a user can also revert a public tag created by the user's organization to private.

As shown at 806, a Network Sessions tab lists the sessions during which the sample was detected. The sessions displayed are all sessions submitted from firewalls to the malware analysis system as similarly described above. A user can select a single session for session details (e.g., users can also navigate back to the File Analysis tab for the sample, or click on, for example, a Related Sessions tab—related sessions are sessions where samples with the same hash value, such as the same SHA-256 hash value, were detected).

As shown at 808, a File Analysis tab lists properties, behaviors, and activities observed for the sample during the automated analysis performed by the malware analysis system, as similarly described above. For each activity artifact, the total number of times the artifact has been found with benign (#B), grayware (#G), and (#M) malware samples is listed. High risk artifacts are highlighted as Suspicious or Highly Suspicious, and users can add these artifacts directly to an existing search or add them to an export list as shown at 810, as similarly described herein.

In one embodiment, the search editor supports exporting a search. For example, a search can be exported in order to share the search between support accounts or with another security expert.

In one embodiment, the search editor supports importing a search. For example, a search can be imported in order to import a search shared by another security expert.

As an example, the search editor can be utilized to perform a search using the malware analysis platform for threat intelligence made actionable to view samples matched to the selected search conditions (e.g., and can also be configured to search a specified scope of samples, such as Private/Subscriber Samples, Public Samples, and/or to All Samples as similarly described herein). The Samples, Sessions, Statistics, and Domain, URL & IP Address Information tabs can then be selected to drill down in the search results different contexts, and allow you to drill down in to the results to find correlation among artifacts, to narrow the search by adding artifacts to the search, and to add high-risk artifacts to the Export Artifacts feature, as similarly described herein. Users can then assess the artifacts identified in the search results. Users can also export the artifacts identified in the search results, as similarly described herein.

FIG. 9 is a screen shot of a sessions search view of a search editor of an interface for the malware analysis platform for threat intelligence made actionable in accordance with some embodiments. In one embodiment, the search editor includes a Sessions tab. For example, the Sessions tab can display all sessions for all samples matched to the search conditions. A user can select a single session to drill down for session details as shown in FIG. 9.

As shown at 902, session details include a Session Summary, from which users can add artifacts to a search using the search editor as similarly described above.

As shown at 904, a File Analysis tab displays details for the sample that was detected during the session.

As shown at 906, Sessions details also include a list of Related Sessions, which are sessions where the same sample was detected.

Figure 10:
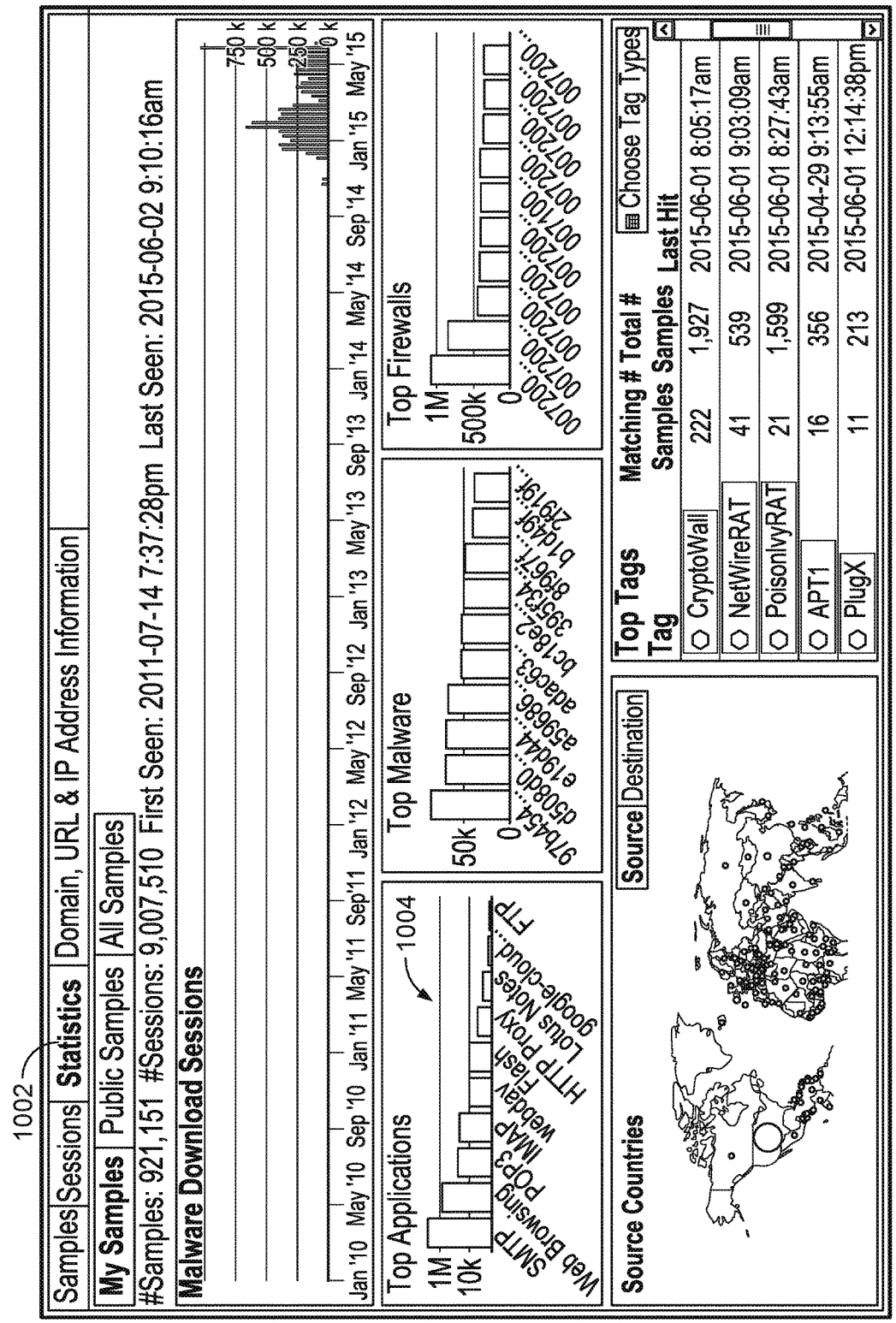
FIG. 10 is a screen shot of a statistics search view of a search editor of an interface for the malware analysis platform for threat intelligence made actionable in accordance with some embodiments.

FIG. 10 is a screen shot of a statistics search view of a search editor of an interface for the malware analysis platform for threat intelligence made actionable in accordance with some embodiments. In one embodiment, the search editor includes a Statistics tab. For example, the Statistics tab can display all statistics for all samples matched to the search conditions. A user can examine the statistics for all samples matched to the search conditions as shown in FIG. 10.

As shown at 1002, users can view statistics on artifacts associated with My Samples, Public Samples, or All Samples.

As shown at 1004, users can click the Top Applications, Top Malware, Top Firewalls, or Target Industries widgets to add artifacts to their search; the Statistics tab widgets are filtered based on the added search condition. For example, users can click a web-browsing bar on the Top Applications widget. Web-browsing is added as a search condition and the widgets, including the Source Countries malware map, are then updated to reflect the new web-browsing filter.

Figure 11A:
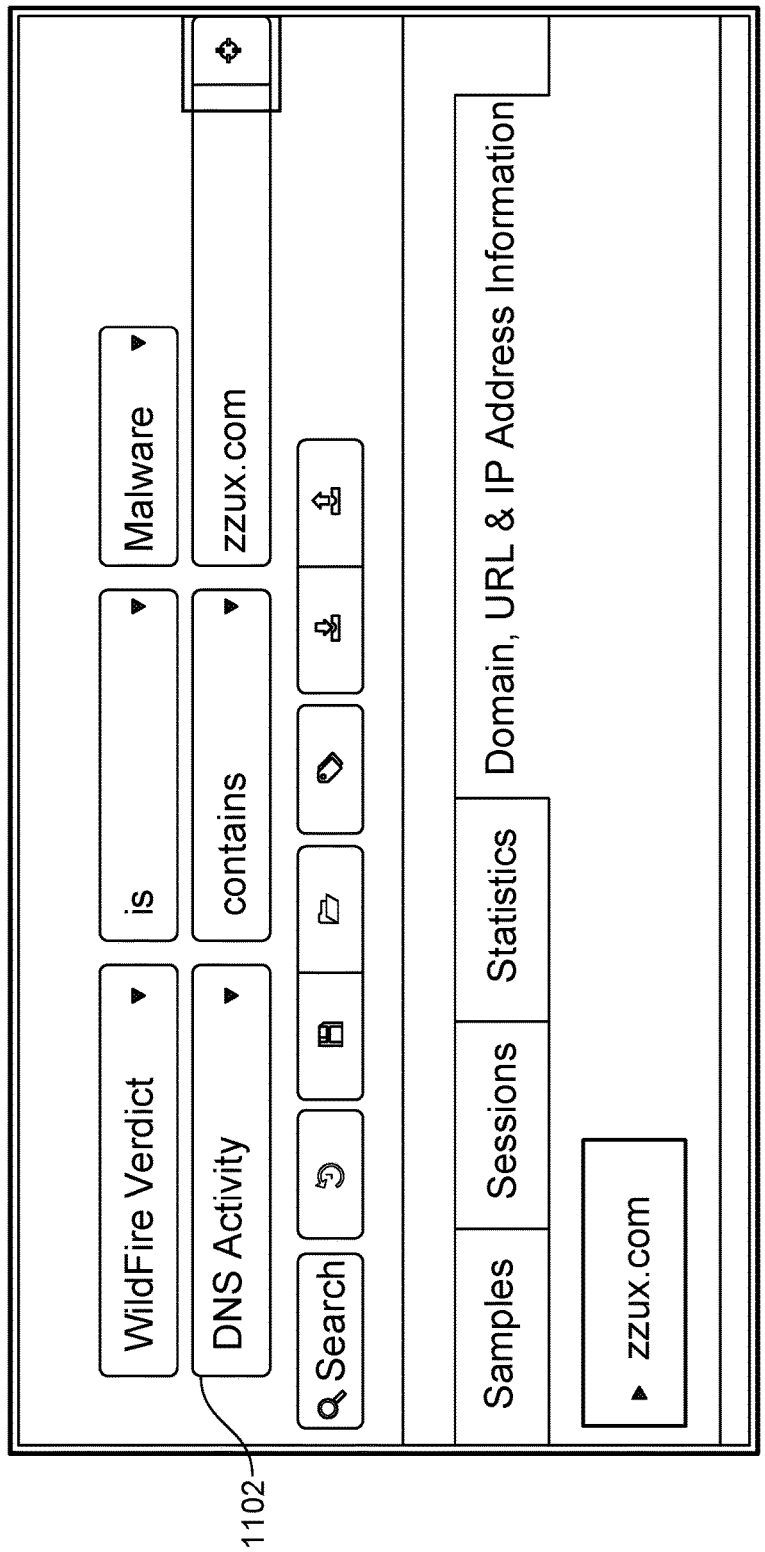

FIGS. 11A-11B are screen shots of a domain, URL, and IP address information search view of a search editor of an interface for the malware analysis platform for threat intelligence made actionable in accordance with some embodiments. In one embodiment, the search editor includes a Statistics tab. In one embodiment, the search editor can be configured to view the domain, URL, and IP address information found with the samples matched to the search conditions.

Referring to FIG. 11A, users can select the Domain, URL & IP Address Information tab to view passive DNS history and an existing categorization of the search results. As shown at 1102, users can set up a search (e.g., click/select a Target icon or the Domain, URL & IP Address Information tab) that includes at least one of the following conditions: URL, IP Address, or DNS Activity, such as by adding a search condition that DNS Activity contains zzux.com as shown in FIG. 11A.

Referring to FIG. 11B, users can review a categorization and passive DNS history information found for samples matched to the search criteria. As shown at 1110, PAN-DB is the Palo Alto Networks URL and IP database or another commercially available URL and IP classification/categorization that is commercially or publicly available can be utilized. Users can then review the web sites associated with URLs and the associated category(ies).

As shown at 1112, users can review domain to IP address mappings found for samples that match their search condition(s).

Search Based on Observed Behavior

In one embodiment, the interface for the malware analysis platform for threat intelligence made actionable includes a search feature (e.g., as similarly described above with respect to FIG. 6) that allows for searches based on observed behavior. For example, users can utilize the search feature to find samples based on behaviors seen when the sample was executed in the sandbox environment.

In an example implementation, users can search for samples that created and modified files, started processes, spawned new processes, modified the registry, and/or installed browser help objects (BHOs). The user can utilize the interface to select to initiate a search using the platform, select the search category of observed behavior, and then browse a list of possible behaviors to select one or more behaviors to search for samples for which that behavior was seen when executed in the sandbox environment.

Share Links to Saved Searches

In one embodiment, the interface for the malware analysis platform for threat intelligence made actionable includes a search feature (e.g., as similarly described above with respect to FIG. 6) that allows shared links to saved searches. For example, users can select the search feature to open their saved searches, click a link icon to generate a shared link, and then copy the link to share it with other users (e.g., other users of the malware analysis platform for threat intelligence).

Smart Tagging and Alerting Based on Artifacts Using the Malware Analysis Platform for Threat Intelligence Made Actionable As similarly discussed above, network/security administrators (admins) are typically inundated with a significant number of, and often too many, alerts and messages from the security devices and security services for their enterprise network(s). Moreover, such security devices and security services typically fail to provide relevant context and prioritization for such alerts and messages to be effective and/or efficient to facilitate performing responsive action(s).

Thus, improved techniques for filtering and identifying relevant threat intelligence information are needed.

Accordingly, in one embodiment, tagging and alerting based on artifacts is provided using the malware analysis platform for threat intelligence.

For example, the above-described malware analysis platform can extract various static and behavioral artifacts, which can then be selected as artifacts to define tags based on a set of one or more attributes/behaviors (and/or conditions based on one or more attributes/behaviors) identified by the malware analysis platform during analysis of samples, as further described below. In this example, these tags when created apply to the existing set of samples and are smart such that if any new sample is received by the malware analysis platform for threat intelligence made actionable that exhibits the same set of one or more attributes/behaviors, then the new sample is automatically tagged and a notification can be communicated to the users that configures an alert based on the tag. Further, this tagging and alerting capability allows network/security admins to define specific artifacts that they are interested in monitoring, such as domains, IP addresses, URLs, mutexes, and/or other attributes, so that when any event occurs in their network that targets (e.g., matches) such artifacts, they can then be notified to allow them to effectively and efficiently perform appropriate actions to mitigate the security threat.

In one embodiment, tags are applied as part of the intake processing for newly processed samples/sessions by the malware analysis platform for threat intelligence made actionable as similarly described above. In one embodiment, a newly defined tag can be applied to (e.g., associated with) existing processed samples in a so-called lazy fashion as described herein.

For example, a network/security admin user for ACME Corporation can define a new tag and specify an alert based on the new tag using the disclosed techniques. The user can then receive an alert if a sample from their enterprise network matches the tag. In this example, the new tag can be a new tag that the user configured using the malware analysis platform for threat intelligence, or the tag can be an existing tag previously configured by the security vendor of the malware analysis platform for threat intelligence made actionable or by another user of the malware analysis platform for threat intelligence.

In one embodiment, clustering techniques described below can be applied to automatically generate tags (e.g., malware families can be associated with a smart tag). For example, a tag can be automatically generated using the disclosed attribute and/or clustering based analysis techniques as further described below.

In one embodiment, a tag can be a high priority tag. For example, if a malware sample is detected/received that matches a tag that is a high priority tag (e.g., a tag that is associated with a serious threat can be identified as a high profile tag, such as by the security vendor for the malware analysis platform for threat intelligence), then an alert can be sent to a network/security admin for ACME Corporation that their network is being targeted based on an alert that a malware sample matching the high profile tag was identified as having penetrated their network.

In one embodiment, a tag can be based on a set of one or more attributes. In one embodiment, an attribute can be based on a line and/or a sub-line (e.g., a subset of content extracted from a line) of the malware analysis results output from the malware analysis platform for a sample, such as similarly described above. For example, a tag can be based on a set of attributes (e.g., lines 1, 3, 7, and/or other lines or sub-lines). As another example, the tags can be generated based on the below described automated/semi-supervised techniques for automatically generating tags for the malware analysis platform for threat intelligence.

These and other aspects associated with smart tagging and alerting based on artifacts provided using the malware analysis platform for threat intelligence made actionable will now be further described below.

Alerts on the Malware Analysis Platform for Threat Intelligence Made Actionable

In one embodiment, the interface for the malware analysis platform for threat intelligence made actionable includes an alerts feature (e.g., as similarly described above with respect to FIG. 6). For example, prioritized alerts allow users to quickly distinguish targeted, advanced attacks from commodity malware so that users can effectively and efficiently triage their network resources accordingly. As similarly described herein, users can configure the malware analysis platform for threat intelligence made actionable to set up alerts based on tag types (e.g., Unit 42 Alerting tags, public tags, or private tags).

In one embodiment, alerts can be configured to be communicated to users over HTTP and/or email alerts (e.g., or other notification mechanisms) to receive such alerts as email notifications or to include alerts in a web portal or a feed. In one embodiment, an Alerts Log on the dashboard displays alerts depending on the dashboard context, and users can also view the complete set of alerts by selecting Alerts on the navigation pane.

FIG. 12 is a screen shot of an alerts screen of an interface for the malware analysis platform for threat intelligence made actionable in accordance with some embodiments. In one embodiment, alerts can be configured based on various notification criteria and/or tag type (e.g., tags/smart tags are also further described below). For example, to set up alerts, users can define the type of alert they want to receive (e.g., the alert frequency and the notification destination), and then enable the alert based on tag type, such as further described below.

Referring to FIG. 12, a user can define alerts (e.g., HTTP and email alerts) by selecting Alerts on the navigation pane and then selecting Settings. Users can then define alert actions, as shown at 1204, that users can then select from to enable alerts based on tag types, as shown at 1202. In this example, defining alert actions includes setting up the alert as an HTTP or email alert and choosing to receive daily notifications or notifications every five minutes. Users would only receive notifications for samples matching to the alert criteria (e.g., the tag) in the digest period that was selected; if no matching samples are detected during the digest period, no notification is sent. Also, in this example, there is a default alert action, shown as None, that cannot be edited or deleted. This action can be useful if users do not want to receive notifications for certain tags, or if users want to create an exception to notifications.

For example, users can enable HTTP and email alerts based on Tag Types. Users can choose for all samples matched to the tag type to generate an alert, or narrow the alert criteria so that only private or public samples generate alerts. Additionally, the alerts feature can include an option to create an alert exception that allows users the flexibility to specify either prioritized alerts based on a specific tag, or to exclude a specific tag from triggering an alert. Also, users can set the scope of the alert (e.g., for each tag type, users can select My Samples to be alerted only when a firewall associated with the user's support account is matched to the tag; users can select Public Samples to be alerted only when public samples are matched to the tag; and users can select both My Samples and Public Samples to be alerted when any sample is matched to the tag).

Figures 13A, 13B:
FIGS. 13A-C are screen shots of an alerts log screen of an interface for the malware analysis platform for threat intelligence made actionable in accordance with some embodiments.
Figure 13C:
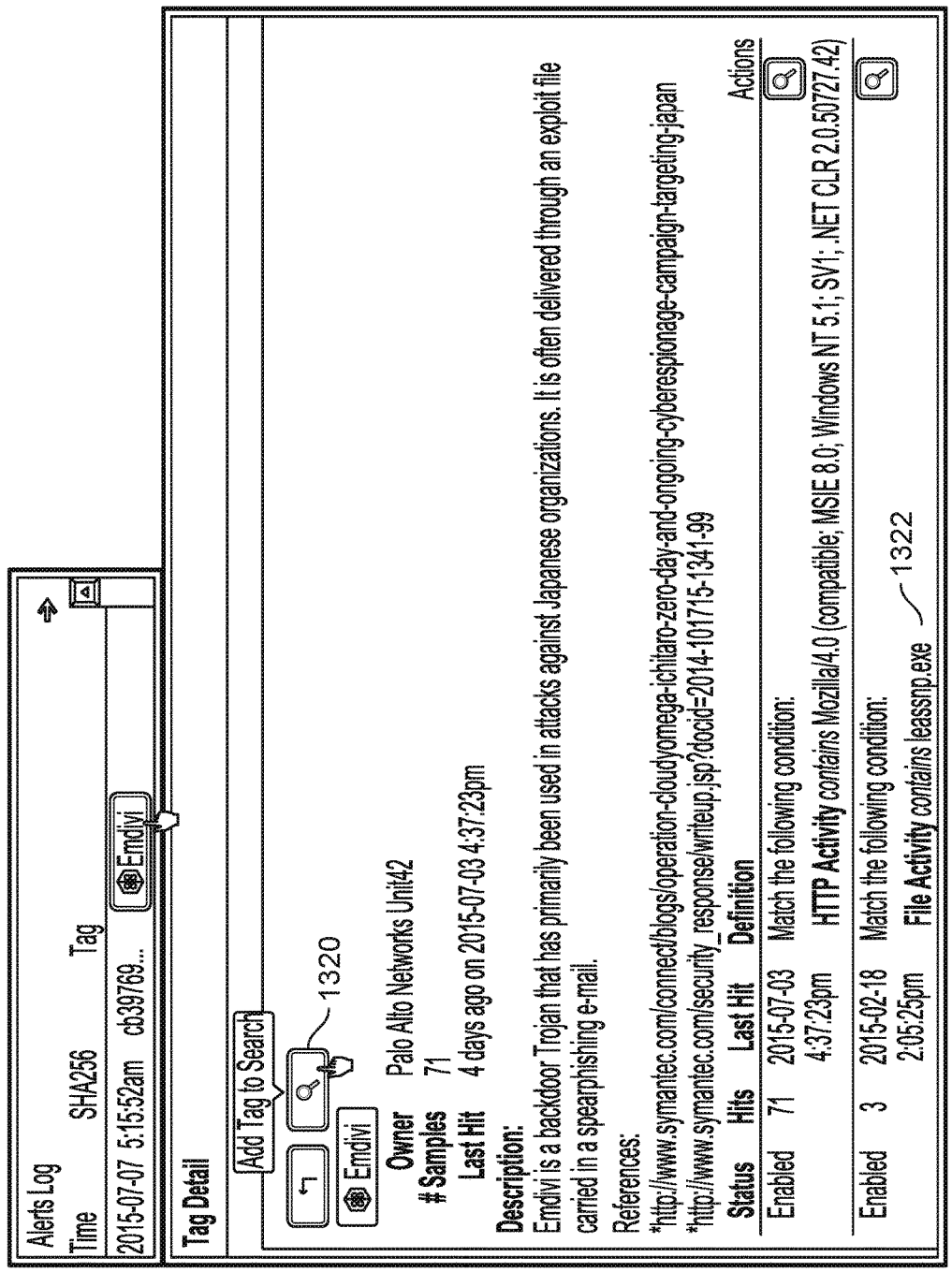

FIGS. 13A-C are screen shots of an alerts log screen of an interface for the malware analysis platform for threat intelligence made actionable in accordance with some embodiments. In one embodiment, the dashboard provides an Alerts Log screen. As shown, the Alerts Log on the dashboard lists alerts triggered within the selected dashboard date range, beginning with the most recent alerts. Also, the Alerts Log can display a complete set of alert logs (e.g., users can select Alerts on the navigation pane to view a complete set of alert logs).

Referring to FIG. 13A, users can drill down on alerts displayed on the Alerts Log screen. As shown at 1302, users can click on the SHA256 hash link for a sample entry to add the sample to a search. As shown at 1304, users can select to sort the alerts based on time, tag type, SHA256 hash value, and/or tag.

Referring to FIG. 13B, users can hover over the tag on which the alert is based to view tag details, including the latest time and the total number of times that traffic was matched to the tag, as shown at 1310.

In one embodiment, to search on the latest sample to trigger an alert, users can select the sample on the Alerts Log widget.

Referring to FIG. 13C, to review and/or search on the conditions that triggered an alert, users can select a tag on the Alerts Log widget to view tag details. In this example, tag details can include a description of the tag and a list of the conditions defined for the tag. From the tag details, users can open a search based on the tag or a single condition defined for the tag. As shown at 1320, users can add the tag to the search editor, to search for all historical and global samples matched to the tag. As shown at 1322, users can add a single condition defined for the tag to the search editor, to search for all historical and global samples matched to that single condition.

Smart Tagging and Alerting of Analyzed Malware Sample Results Using the Malware Analysis Platform for Threat Intelligence As similarly discussed above, the significant amount and complex information that is generated by various security systems and services presents a technical challenge to network/security admins. For example, network/security admins are typically inundated with a significant and often overwhelming number of alerts and messages from the security devices and services. Moreover, such alerts and messages from the security devices and services typically lack prioritization and relevant context to facilitate efficient processing and to facilitate performing appropriate actions based on certain alerts and messages.

Accordingly, techniques for smart tagging and alerting of analyzed malware sample results using the malware analysis platform for threat intelligence are disclosed. In one embodiment, the malware analysis platform for threat intelligence made actionable includes a capability to extract and uniquely name an artifact(s) (e.g., sets of behaviors or other attributes) associated with malware (e.g., or grayware), which are referred to herein as tags (e.g., smart tags), such as further described below. For example, these tags when created can apply to existing sets of samples and can be viewed as smart in the way that if any new sample is analyzed and the malware analysis results are processed by the platform, and the platform determines that the new sample exhibits the same artifact(s), then the new sample is automatically tagged and an alert can be triggered (e.g., based on a configuration of alert parameters associated with the tag, such as further described below).

In one embodiment, the interface for the malware analysis platform for threat intelligence made actionable includes a tagging feature as similarly described above. For example, the interface for the malware analysis platform for threat intelligence made actionable allows users to tag a set of conditions. As similarly discussed above, users can then search and alert based on the defined tag. In an example implementation, historical and future samples can be automatically matched by the platform to the conditions defined for a tag (e.g., conditions based on one or more artifacts). Historical samples matched to the tag can also be searched to provide context and insight into surrounding events. In addition, new samples matched to the tag can be processed by the platform to automatically generate an alert (e.g., a prioritized alert) to allow users to perform appropriate and timely action(s) to remediate the security threat.

As an example, a new tag can be created by tagging a sample (e.g., the hash for the sample can be tagged, such as similarly described herein). As another example, a set of search conditions can be tagged. In an example implementation, when a tag is created, the past and incoming samples matched to the search conditions are tagged by the malware analysis platform for threat intelligence made actionable using the disclosed techniques; and sample details display the tags to which the sample is matched. Also, users can then perform a search using the search editor and/or receive alerts based on the new tag.

As an example, assume that a bank, ACME Bank, is a customer of the malware analysis platform for threat intelligence made actionable. ACME Bank can utilize the platform to configure tags and alerts to facilitate their network/security admins based on specific artifacts that are of interest to the network/security admins for ACME Bank. Examples of artifacts that can be defined to configure such tags and alerts based on the tags can include domain names, IP addresses, URLs, and/or various other artifacts as similarly described herein. In this example, assume that a new sample was detected on the ACME Bank enterprise network and was sent for cloud security malware analysis using the automated malware analysis and the sample analysis result (e.g., log file) was then processed by the malware analysis platform for threat intelligence as similarly described above. If the malware analysis platform for threat intelligence determines that the sample is associated with (e.g., targets) any of these artifacts based on the processing of the sample analysis result (e.g., log file), then the sample is automatically tagged by the platform, and an alert can be generated (e.g., the network/security admins for ACME Bank can be notified based on a prioritized alert notification that includes relevant contextual information based on the tag that is defined based on the one or more artifacts, which facilitates remedial/corrective actions to be timely performed using the platform and/or other security devices/services, such as further described herein).

In one embodiment, a dashboard for the platform is provided that displays threat intelligence information based on the tags, such as similarly described above with respect to FIG. 6 (e.g., My Tags, Unit 42 Tags, and/or Public Tags as similarly described above). For example, the dashboard for the malware analysis platform for threat intelligence made actionable can allow users to find the tags with the most sample hits during a set time range (e.g., top tags (My Tags, Unit 42 Tags, and/or Public Tags) detected during a date range). As another example, the dashboard for the platform allows users to view the tags with the highest total number of matching samples (e.g., top tags (My Tags, Unit 42 Tags, and/or Public Tags) found with search results). Various other dashboards/displays and/or search results can similarly be generated based on tags and/or alerts using the platform.

FIG. 14 is a screen shot of a tag detail screen of an interface for the malware analysis platform for threat intelligence made actionable in accordance with some embodiments. In one embodiment, the interface for the malware analysis platform for threat intelligence made actionable allows users to select (e.g., click on) a tag to view detailed information associated with the tag displayed on a tag detail screen as shown in FIG. 14. For example, users can select any tag to reveal details about that tag, including the set of conditions that is matched to traffic, the last time that set of conditions was detected, and the total number of samples matched to the tag.

As shown at 1402, to open a search based on the tag, users can select the Search icon. As shown at 1404, users can edit private tag details. In this example, for private tags, users can edit tag details, including the scope of the tag to be private, public, or anonymously public. As shown at 1406, users can select a delete/trash icon to permanently delete a previously generated tag (e.g., based on user access controls, such as for tags that were previously created by that user or the enterprise account associated with that user). For example, deleted tags can show a Tag Status of removing after being deleted until the deletion is complete (e.g., when the deletion is complete, the tag status can display as disabled).

As shown at 1408, users can share a tag with security experts by making the tag Public (e.g., to share the tag with other network/security admin users of the platform and/or the security service provider associated with the platform). Also, as similarly described above, users can also revert a tag previously made public back to a private tag. For example, tags can be shared anonymously, or the organization can be identified as the owner of the tag if the user does not want to share the tag anonymously.

As shown at 1410, users can Vote for, Comment on, and Report tags. For example, users can vote up for helpful tags and down-vote tags that they believe are misleading or are too general to be meaningful. As another example, users can comment on tags, such as to provide feedback on tags or share additional, relevant information with the threat intelligence/security community users of the platform. As yet another example, users can report tags that are offensive or reveal sensitive information. In this example, private tags would not show these options, as such options would only be applicable to publicly accessible/shared tags.

As shown at 1412, users can search based on a single tag condition or delete a single tag condition. For example, a user can select the Search icon in the Actions column, to the right of the condition for which the user wants to open a search (e.g., this option can be used to add conditions from an existing tag to the search editor, modify the conditions, and/or create a new tag).

Artifacts of Analyzed Malware Sample Results

In one embodiment, the interface for the malware analysis platform for threat intelligence made actionable identifies artifacts that are extracted from and/or determined to be associated with analyzed samples (e.g., attributes, such as behaviors, features, and/or other artifacts, as similarly described above). In an example implementation, the malware analysis platform includes an automated analysis of malware samples (e.g., the WildFire™ cloud security service provided by Palo Alto Networks, Inc., or another malware analysis platform/service) that classifies previously unknown samples as either malware, grayware, or benign, so that a firewall can be configured to then block or enforce the newly-identified malware or grayware according to a security policy (e.g., an enterprise security policy or other security policy). As also similarly described above, when the automated analysis of malware samples observes and executes a sample in the sandbox environment during a dynamic analysis phase and/or determines attributes during a static analysis phase, the malware analysis platform can process the results to automatically identify artifacts of the analyzed malware sample results (e.g., file properties and/or behaviors including observed behavior, process activity, connection activity, service activity, and/or other behaviors/activities, such as registry activity, file activity, other API activity, mutex activity, DNS activity, and/or static analysis including suspicious file properties and/or other static analysis properties) that can be accessed, analyzed, and/or made actionable utilizing the interface or the malware analysis platform for threat intelligence made actionable as will now be further described below with respect to FIGS. 15A-D.

FIGS. 15A-D are screen shots of an interface for viewing and/or performing actions based on artifacts utilizing the malware analysis platform for threat intelligence made actionable in accordance with some embodiments. In one embodiment, the malware analysis platform for threat intelligence made actionable (e.g., AutoFocus cloud security service provided by Palo Alto Networks, Inc., or another malware analysis platform/service for threat intelligence) provides a new lens through which to view, analyze, and perform actions based on the artifacts collected by the malware analysis platform.

In one embodiment, the malware analysis platform for threat intelligence made actionable includes various analysis and statistics for the artifacts. In an example implementation, layers statistics over artifacts found to be associated with a sample can be provided to show the number of times a given artifact has been determined/detected with other malware, grayware, or benign samples using various techniques described herein. For example, high-risk artifacts that are frequently observed with malware can be determined to be Suspicious or Highly Suspicious using various techniques described herein.

In one embodiment, the high-risk artifacts can be determined, viewed, analyzed, and acted upon using the disclosed platform and techniques. In an example implementation, the malware analysis platform for threat intelligence made actionable identifies high-risk artifacts included in file analysis details for a sample. In this example, an interface of the malware analysis platform for threat intelligence made actionable can include a File Analysis tab that groups similar artifacts into Analysis Categories for easy reference, such as similarly described herein. As similarly described above, a user can utilize the interface to add high-risk artifacts to a search, or use them to generate an export list for configuring a network/security device (e.g., a firewall or another network/security device) to perform actions (e.g., block, alert, or other actions) based on the high-risk artifacts using various techniques described herein.

Figure 15A:
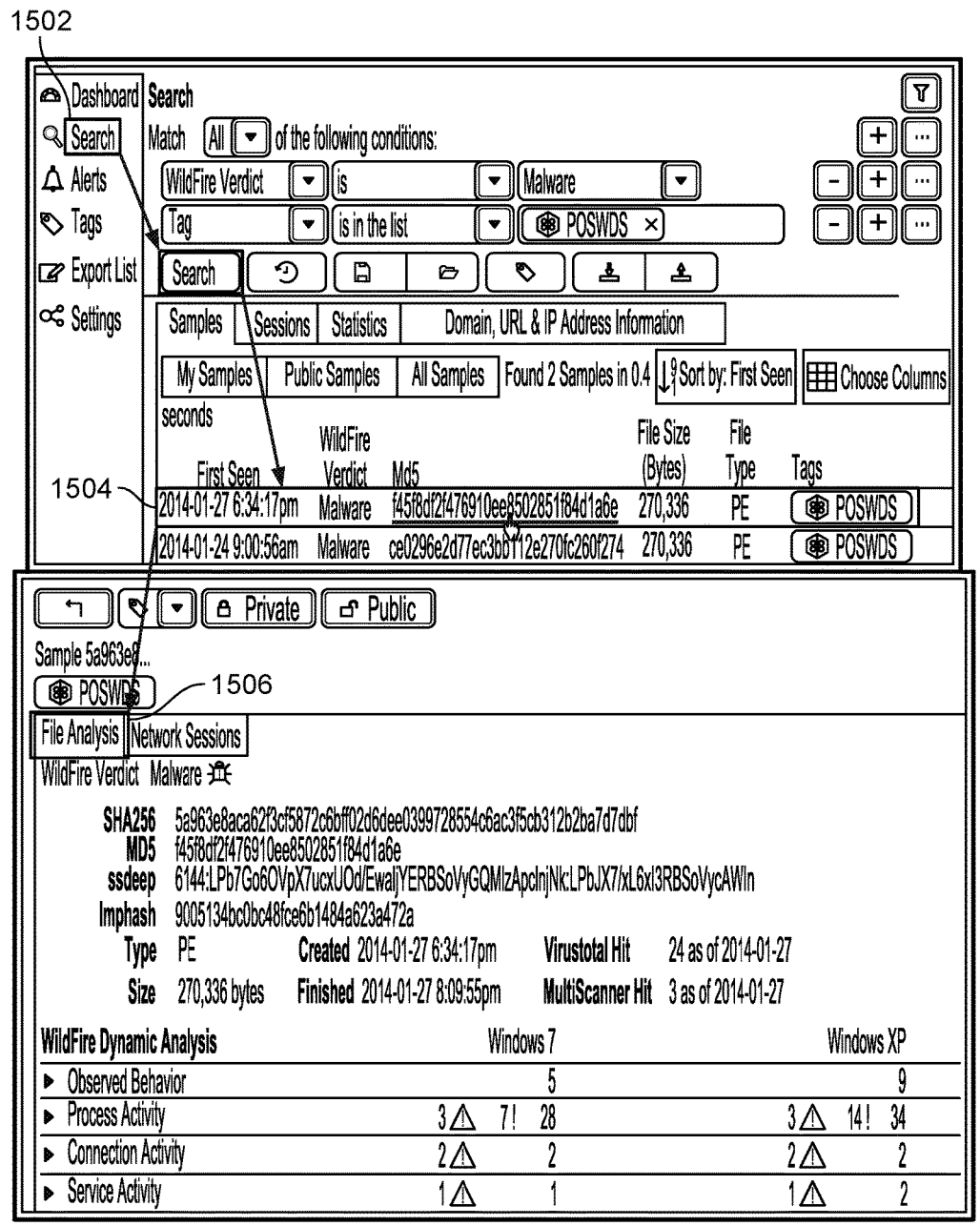

Referring to FIG. 15A, a user can utilize the interface of the platform to perform a search as shown at 1502 (e.g., utilizing the Search Editor to set up a search as similarly described above) and select a sample from the search results as shown at 1504 to see the File Analysis details for that sample. As shown at 1506, a File Analysis tab for a sample can display high-risk artifacts and the number of times the artifact was observed with malware, grayware, or benign samples (e.g., as shown, dynamic analysis categories of artifacts include observed behavior, process activity, connection activity, and service activity).

Referring to FIG. 15B, a user can utilize the interface of the platform to select a category of the artifacts, such as the Process Activity category as shown to view file analysis artifacts associated with that category. As shown at 1510, for every artifact listed, the number of times the artifact has been detected with malware (#M), grayware (#G), and benign (#B) samples is displayed in a table formatted display output by the interface of the platform. In this example, high risk artifacts are indicated with icons to designate them as Highly Suspicious or Suspicious as shown (e.g., a filled triangle symbol with an exclamation mark shown for Highly Suspicious and an exclamation mark shown for Suspicious).

Figure 15C:
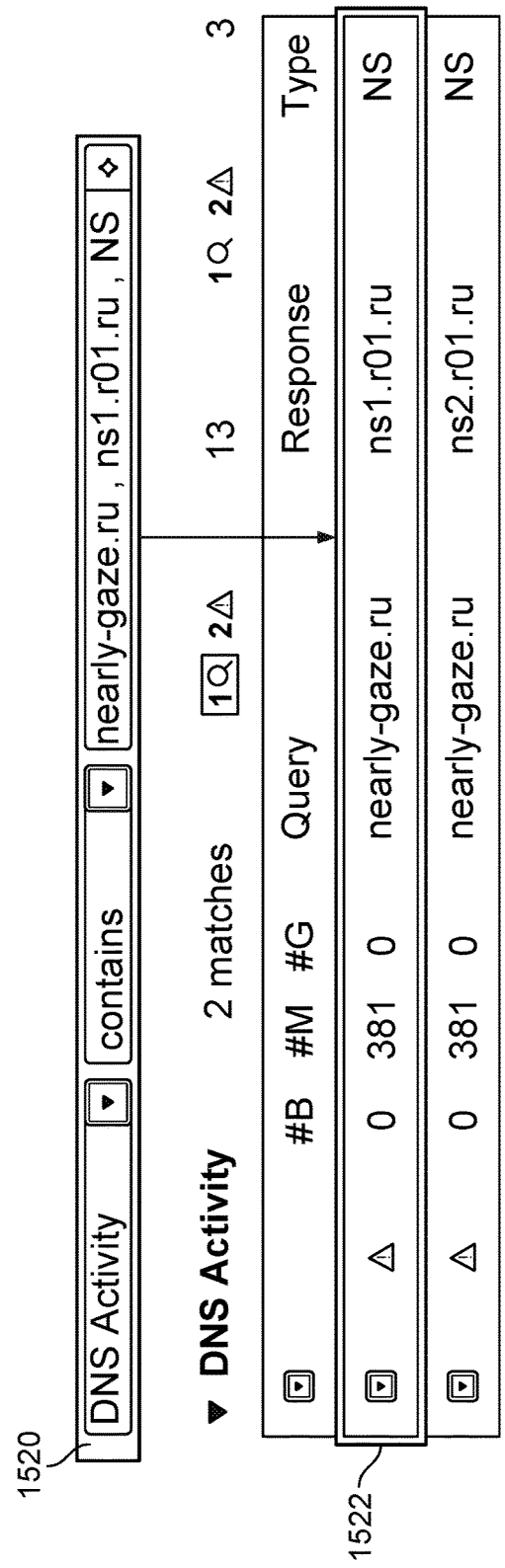

Referring to FIG. 15C, a user can utilize the interface of the platform to select artifacts that match to their search conditions (e.g., even if they are not high-risk), highlighted in the search results. In this example, a search is performed for artifacts that include DNS activity that contains nearly-gaze.ru, ns1.r01.ru, NS as shown at 1520. The results are highlighted in the DNS activity category that match these example search conditions as shown at 1522.

Referring to FIG. 15D, a user can utilize the interface of the platform to select artifacts (e.g., high-risk artifacts) to add the selected artifacts to a search or an export list to perform an action based on the selected artifacts (e.g., to search, export, and drill down on file analysis artifacts). As shown at 1530, a user can add artifacts found on the File Analysis tab for a sample as similarly described above to their existing search and/or to an export list. Domains, URLs, and IP addresses also allow users to view passive DNS history and various categorization information for the artifact.

Figure 16:
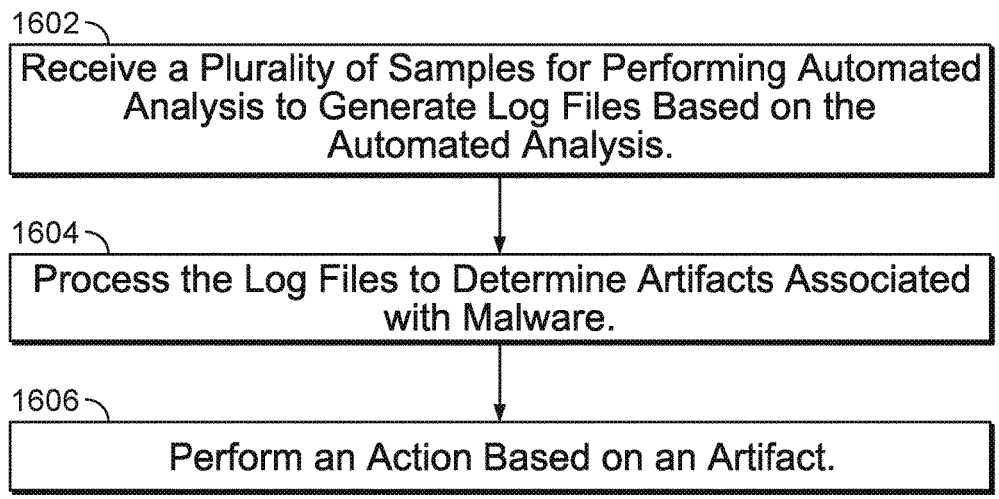
FIG. 16 is a flow diagram for a process performed using the malware analysis platform for threat intelligence made actionable in accordance with some embodiments.

Processes for the Malware Analysis Platform for Threat Intelligence Made Actionable FIG. 16 is a flow diagram for a process performed using the malware analysis platform for threat intelligence made actionable in accordance with some embodiments. In various embodiments, the process shown in FIG. 16 is performed by the platform and techniques as similarly described above including the embodiments described above with respect to FIGS. 1-3.

At 1602, a plurality of samples is received for performing automated malware analysis to generate log files based on the automated malware analysis. For example, the automated malware analysis can include dynamic and/or static analysis as similarly described above.

At 1604, processing the log files is performed to determine artifacts associated with malware. For example, if the artifact is determined to be associated with malware based on the automated malware analysis, then the artifact can be deemed a high-risk artifact as similarly described above.

At 1606, an action is performed based on an artifact. For example, the artifact(s) can be imported to security information and event management (STEM) tools or to support a firewall block list to perform security enforcement on an enterprise network as similarly described above.

Figure 17:
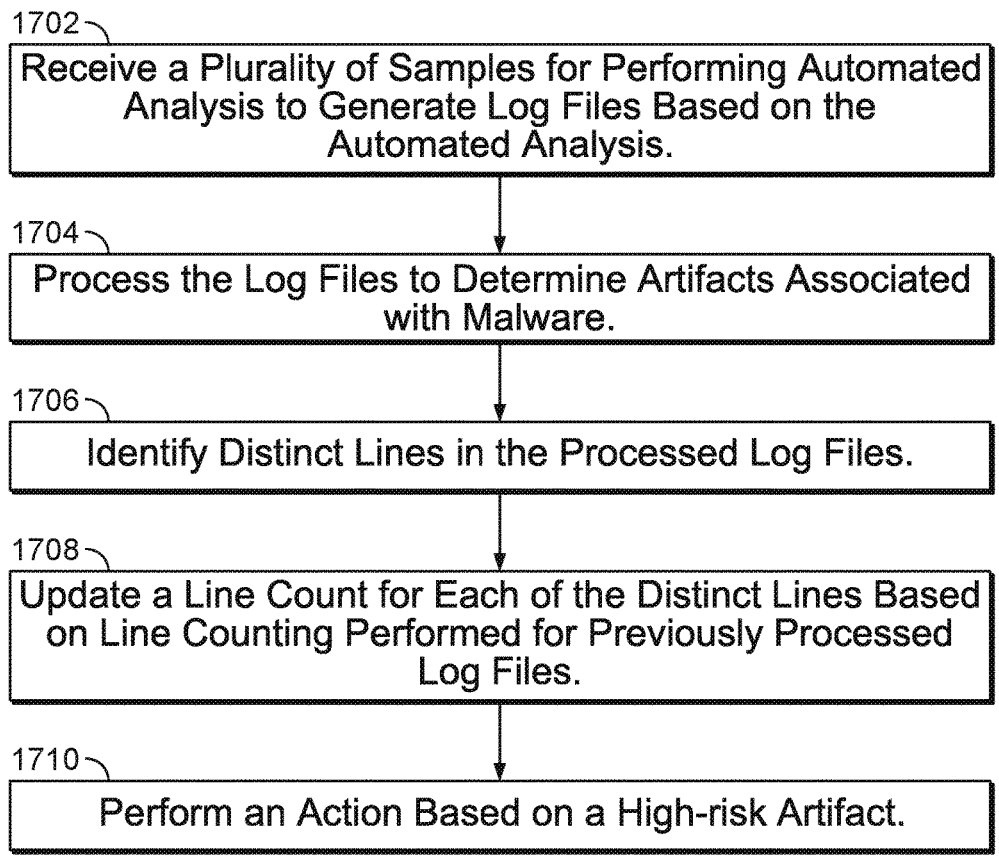
FIG. 17 is another flow diagram for a process performed using the malware analysis platform for threat intelligence made actionable in accordance with some embodiments.

FIG. 17 is another flow diagram for a process performed using the malware analysis platform for threat intelligence made actionable in accordance with some embodiments. In various embodiments, the process shown in FIG. 17 is performed by the platform and techniques as similarly described above including the embodiments described above with respect to FIGS. 1-3.

At 1702, a plurality of samples is received for performing automated malware analysis to generate log files based on the automated malware analysis. For example, the automated malware analysis can include dynamic and/or static analysis as similarly described above.

At 1704, processing the log files is performed to determine artifacts associated with malware. For example, a log file for a sample comprises one or more lines based on the automated malware analysis results for the sample as similarly described above.

At 1706, identifying distinct lines in the processed log files is performed. For example, duplicate lines in the log file can be de-duplicated to generate a processed log file that includes only distinct lines as similarly described above.

At 1708, updating a line count for each of the distinct lines based on line counting performed for previously processed log files is performed. For example, line counts can be utilized to generate statistics and analysis for the malware sample results that can be presented in a dashboard and facilitate user access and analysis of the malware sample results and statistics overlay as similarly described above. As another example, line counts can be processed to determine whether any of the distinct lines can be correlated with malware (e.g., and not likely associated with benign samples), which can be utilized to identify high-risk artifacts as similarly described above.

At 1708, updating a line count for each of the distinct lines based on line counting performed for previously processed log files is performed. For example, a line/sub-line can be updated as similarly described above.

At 1710, an action is performed based on a high-risk artifact. For example, the artifact(s) can be imported to security information and event management (SIEM) tools or to support a firewall block list to perform security enforcement on an enterprise network as similarly described above.

Figure 18:
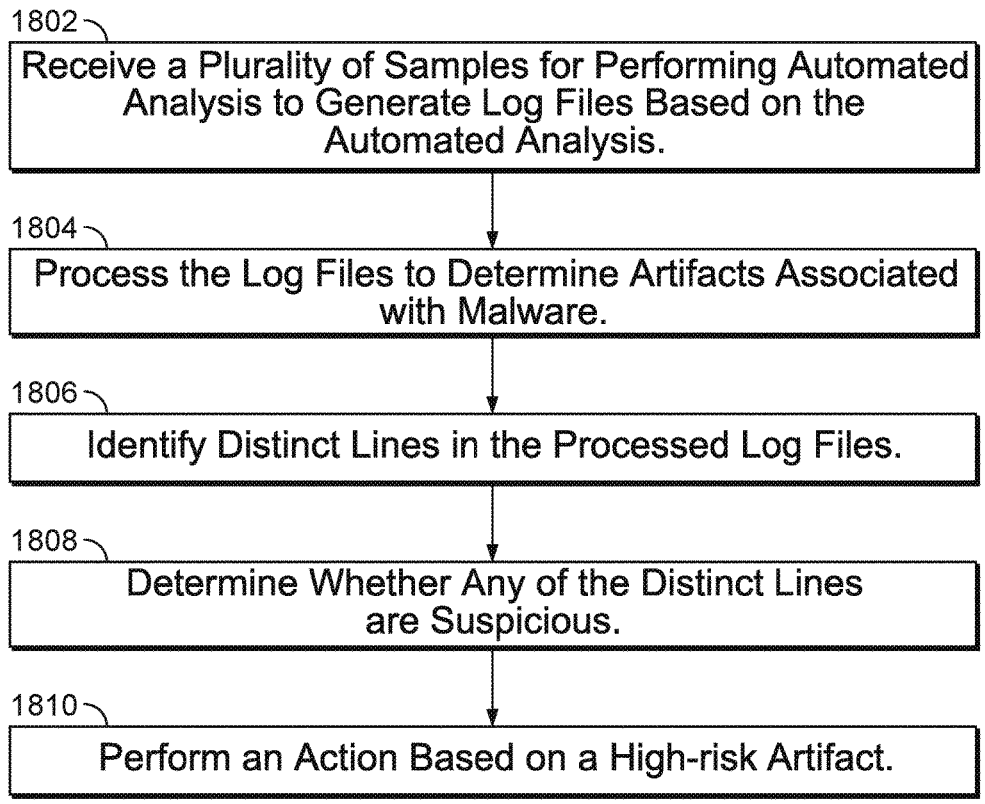
FIG. 18 is another flow diagram for a process performed using the malware analysis platform for threat intelligence made actionable in accordance with some embodiments.

FIG. 18 is another flow diagram for a process performed using the malware analysis platform for threat intelligence made actionable in accordance with some embodiments. In various embodiments, the process shown in FIG. 18 is performed by the platform and techniques as similarly described above including the embodiments described above with respect to FIGS. 1-3.

At 1802, a plurality of samples is received for performing automated malware analysis to generate log files based on the automated malware analysis. For example, the automated malware analysis can include dynamic and/or static analysis as similarly described above.

At 1804, processing the log files is performed to determine artifacts associated with malware. For example, a log file for a sample comprises one or more lines based on the automated malware analysis results for the sample.

At 1806, identifying distinct lines in the processed log files is performed. For example, duplicate lines in the log file can be de-duplicated to generate a log file that includes only distinct lines as similarly described above.

At 1808, determining whether any of the distinct lines are suspicious is performed. For example, if a line/sub-line is determined to be associated with malware, then such can be deemed a high-risk artifact and can be made actionable as similarly described above.

At 1810, an action is performed based on a high-risk artifact. For example, the artifact(s) can be imported to security information and event management (STEM) tools or to support a firewall block list to perform security enforcement on an enterprise network as similarly described above.

Figure 19:
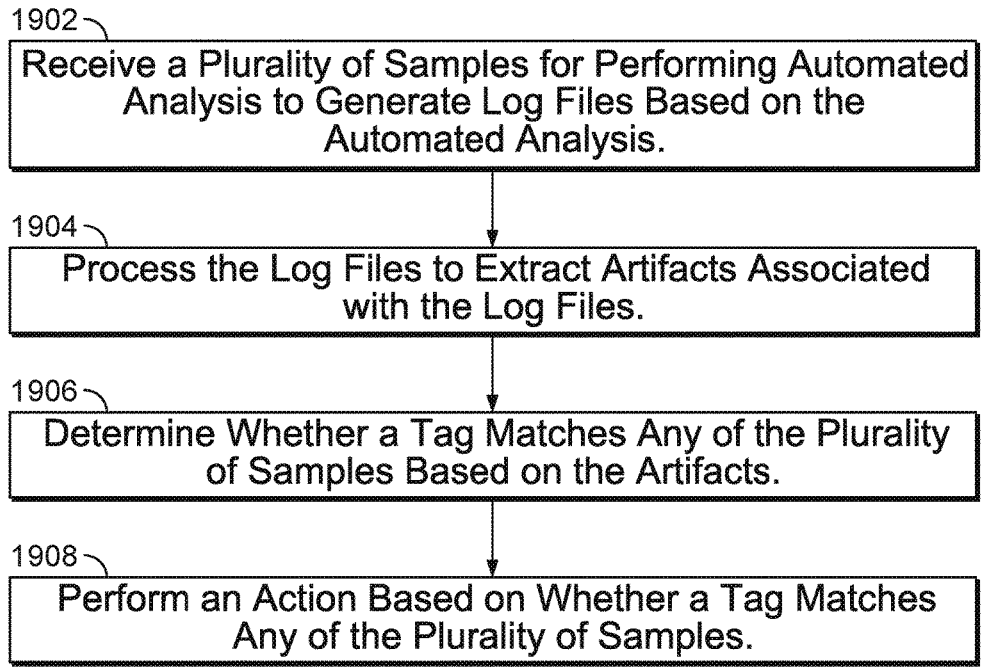
FIG. 19 is a flow diagram for a tagging and alerting process performed using the malware analysis platform for threat intelligence made actionable in accordance with some embodiments.

Processes for Tagging and Alerting Using the Malware Analysis Platform for Threat Intelligence Made Actionable FIG. 19 is a flow diagram for a tagging and alerting process performed using the malware analysis platform for threat intelligence made actionable in accordance with some embodiments. In various embodiments, the process shown in FIG. 19 is performed by the platform and techniques as similarly described above including the embodiments described above with respect to FIGS. 1-3.

At 1902, a plurality of samples is received for performing automated malware analysis to generate log files based on the automated malware analysis. For example, the automated malware analysis can include dynamic and/or static analysis as similarly described above.

At 1904, processing the log files is performed to extract artifacts associated with the log files. For example, a log file for a sample comprises one or more lines based on the automated malware analysis results for the sample as similarly described above.

At 1906, determining whether a tag matches any of the plurality of samples based on the artifacts is performed. As an example, a new tag can be created by tagging a sample (e.g., the hash for the sample can be tagged, such as similarly described herein). As another example, a set of search conditions can be tagged.

At 1908, an action is performed based on whether a tag matches any of the plurality of samples. For example, an alert can be triggered based on whether a tag matches any of the plurality of samples as similarly described above.

Figure 20:
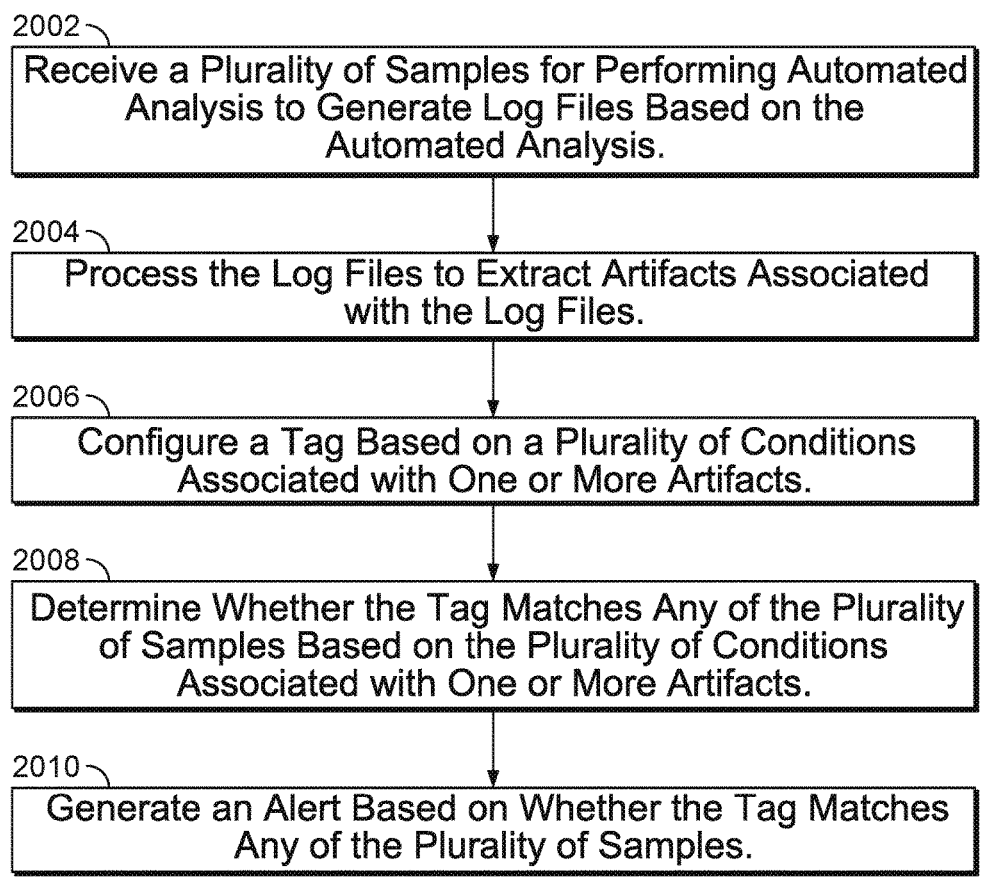
FIG. 20 is another flow diagram for a tagging and alerting process performed using the malware analysis platform for threat intelligence made actionable in accordance with some embodiments.

FIG. 20 is another flow diagram for a tagging and alerting process performed using the malware analysis platform for threat intelligence made actionable in accordance with some embodiments. In various embodiments, the process shown in FIG. 20 is performed by the platform and techniques as similarly described above including the embodiments described above with respect to FIGS. 1-3.

At 2002, a plurality of samples is received for performing automated malware analysis to generate log files based on the automated malware analysis. For example, the automated malware analysis can include dynamic and/or static analysis as similarly described above.

At 2004, processing the log files is performed to extract artifacts associated with the log files. For example, a log file for a sample comprises one or more lines based on the automated malware analysis results for the sample as similarly described above.

At 2006, a tag is configured based on a plurality of conditions associated with one or more artifacts. For example, a set of search conditions can be tagged as similarly described above.

At 2008, determining whether the tag matches any of the plurality of samples based on the plurality of conditions associated with one or more artifacts is performed. For example, the platform can determine such tag matches for new and historical samples as similarly described above.

At 2010, an alert is generated based on the determination that the tag matches at least one of the plurality of samples. For example, a prioritized alert can be generated as similarly described above.

Automatically Determining Whether Malware Samples are Similar

A problem that exists in the current malware analysis and security field is that attackers tend to modify (e.g., making minor changes or other modifications to) existing malware (e.g., malicious programs or other malware/grayware content) and reuse them to attack/infect additional networks and environments. This approach presents significant technical challenges for defenders (e.g., anti-malware solution providers) to effectively and efficiently detect and respond to each malware program independently. For example, this problem can cause delays, errors, and result in extra time being spent on effectively similar malware being repeatedly re-analyzed over time.

Thus, new and improved techniques are needed to address this security technology problem. Accordingly, new and improved techniques for automatically determining whether malware samples are similar are disclosed. For example, techniques for automatically determining whether malware samples are similar can be implemented using the above-described malware analysis platform for threat intelligence made actionable as further described below.

In one embodiment, automatically determining whether malware samples are similar includes determining similarities between malware based on artifacts. For example, artifacts can include attributes or behaviors (e.g., based on dynamic and/or static analysis techniques performed using the automated malware analysis system, such as similarly described above).

In one embodiment, similarities between two or more malware samples are automatically detected. For example, a textual format of attributes and/or behaviors observed during an automated malware analysis of samples can be generated (e.g., in a log file generated by the automated malware analysis system as similarly described above), and then the textual representation of these attributes and behaviors can be compared to automatically determine whether two malware samples are similar based on their respective attributes and/or behaviors observed (e.g., based on a threshold comparison and/or percentage of similarity of the attributes and/or behaviors). In an example case of two malware samples that correspond to the same malware that were developed in two different programming languages, the disclosed techniques can be performed to detect that the malware samples are similar as their respective behaviors would be similar.

In some embodiments, a system, process, and/or computer program product for automatically determining whether malware samples are similar includes receiving a plurality of samples for performing automated malware analysis to generate log files based on the automated malware analysis; comparing the log files based on the automated malware analysis; determining whether any of the plurality of samples are similar based on the comparison of the log files based on the automated malware analysis; and performing an action based on determining that at least two samples are similar.

In one embodiment, a system, process, and/or computer program product for automatically determining whether malware samples are similar further includes processing the log files to extract artifacts associated with the log files; and determining whether a first malware sample is similar to any of the plurality of samples based on the artifacts.

As a result, the disclosed techniques effectively and efficiently detect similar malware to more effectively detect and perform actions in response to the detected malware and thereby reduce the load and time spent to analyze and defend against the same family of malware (e.g., a set of malware that generally is associated with common attributes and/or common behaviors, such as further described below).

Another benefit of the disclosed techniques for automatically determining whether malware samples are similar is that by correlating and comparing artifacts (e.g., attributes and/or behaviors) across a big data set of analyzed malware samples (e.g., millions of analyzed malware samples), degrees of "maliciousness" can be assigned to individual artifacts (e.g., suspicious or highly suspicious artifacts, such as similarly described above), thereby allowing the defenders to focus on more important artifacts to investigate further.

Components for Automatically Determining Whether Samples are Similar

Figure 21:
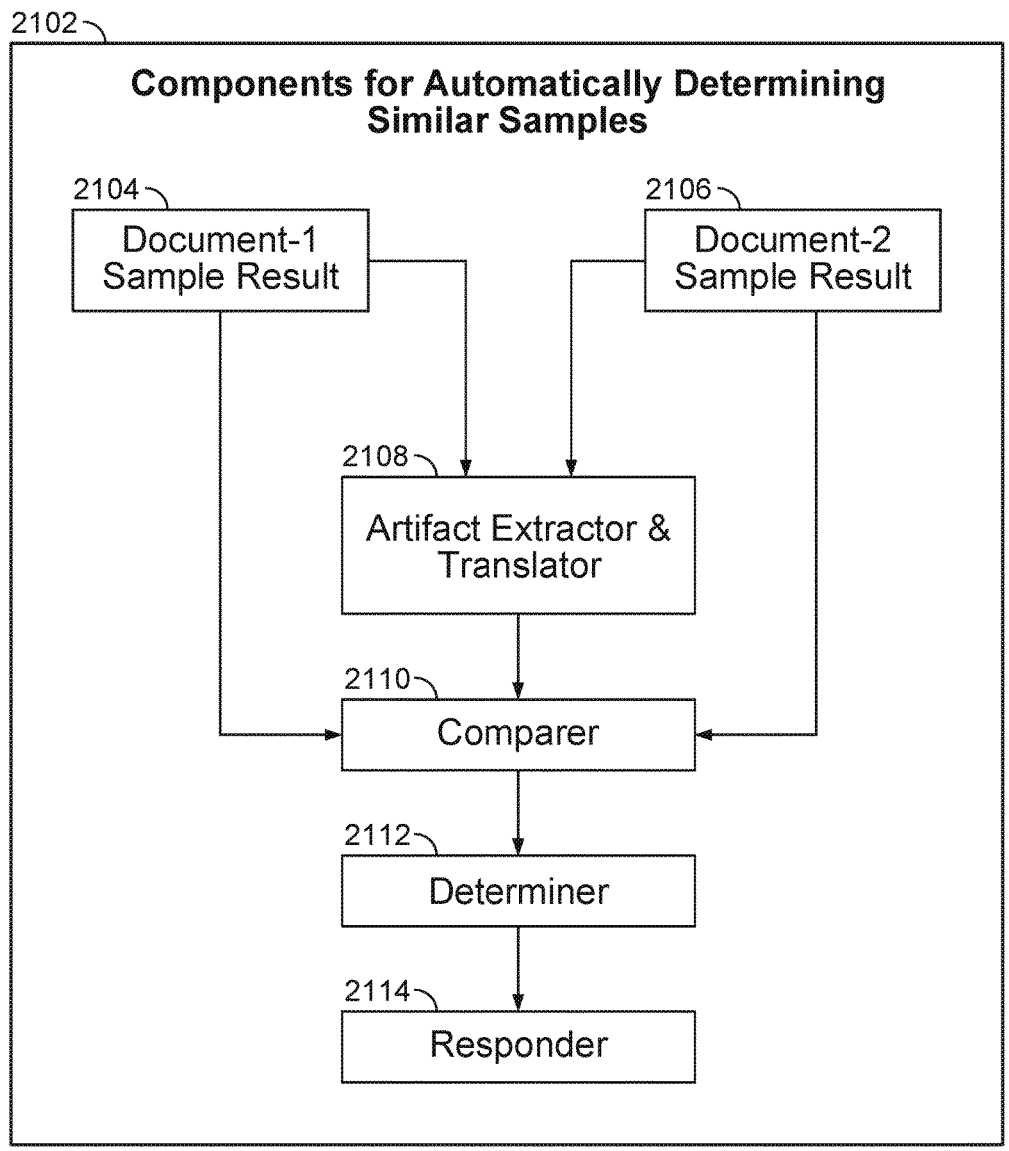
FIG. 21 is a component diagram of functional components for automatically determining whether malware samples are similar in accordance with some embodiments.

FIG. 21 is a component diagram of functional components for automatically determining whether malware samples are similar in accordance with some embodiments. In various embodiments, the components shown in FIG. 21 can be implemented by the platform and techniques as similarly described above including the embodiments described above with respect to FIGS. 1-3 and as further described below.

Referring to FIG. 21, as shown at 2102, a component architecture for automatically determining whether malware samples are similar includes an artifact extractor component 2108 that extracts artifacts from automated analysis results for samples, such as from document-1 for automated analysis results for a first sample as shown at 2104 and from document-2 for automated analysis results for a second sample as shown at 2106. For example, these documents can be log files that include lines (e.g., de-duplicated lines) from the automated analysis results from the automated malware analysis system as similarly described above. The artifacts that can be extracted can include highly suspicious lines and suspicious lines. Other example artifacts can include grayware lines/sub-lines. In one embodiment, a translator component (e.g., implemented as part of the extractor component or as a distinct component) is provided for translating document-1 2104 and document-2 2106 from a first format to a second format. For example, document-1 2104 can be translated from an original log file format to a new format for performing a comparison with another document (e.g., the translated version of the original log file can be a subset of content from the original log file, such as a version that just includes the extracted lines/sub-lines from the original log file to facilitate an artifact-based comparison and/or to facilitate a similarity document comparison, such as further described below).

As also shown in FIG. 21, the extracted artifacts can be provided to a comparer component 2110. For example, the comparer component can perform a comparison to generate a comparison result based on the extracted artifacts using various techniques described herein. The comparison result can then be provided to a determiner component 2112. For example, the determiner component can perform a similarity determination (e.g., a threshold-based determination) based on the comparison result using various techniques described herein. The similarity determination can then be applied by a responder component 2114 to perform a responsive action based on the similarity determination. For example, a report can be generated to indicate that the samples are similar or are not similar based on the similarity determination (e.g., the samples can be grouped into a new or existing malware family as further described below). As another example, a response/action can be performed if the samples are determined to be similar (e.g., the common artifact(s) can be imported to security information and event management (SIEM) tools or to support a firewall block list to perform security enforcement on an enterprise network to automatically block such similar malware as similarly described above and further described below).

In one embodiment, the components of the system as shown in FIG. 21 illustrate an overall view of an architecture for implementing the disclosed techniques for determining whether malware samples are similar. In an example implementation, the disclosed components for determining whether malware samples are similar can be implemented using various open source and/or commercially available components such as described above and coded in various programming languages, such as Python, Java, and/or other programming languages.

In one embodiment, the disclosed techniques can be implemented using the components of the system as shown in FIG. 21 as further described below.

For example, malware families can be identified and samples grouped into the malware families using the disclosed techniques as further described below. As another example, the automated similarity determinations can be performed in a batch mode to identify malware families and reduce indexing of data performed by the above-described malware analysis platform for threat intelligence made actionable (e.g., using only one copy of similar malware samples). As yet another example, the automated similarity determinations can be performed in a manual mode to allow a user to search between two malware samples. As yet another example, the automated similarity determinations can be performed in a navigation mode to allow a user to view other samples that are related to a selected, given sample.

Processes for Automatically Determining Whether Samples are Similar

Figure 22:
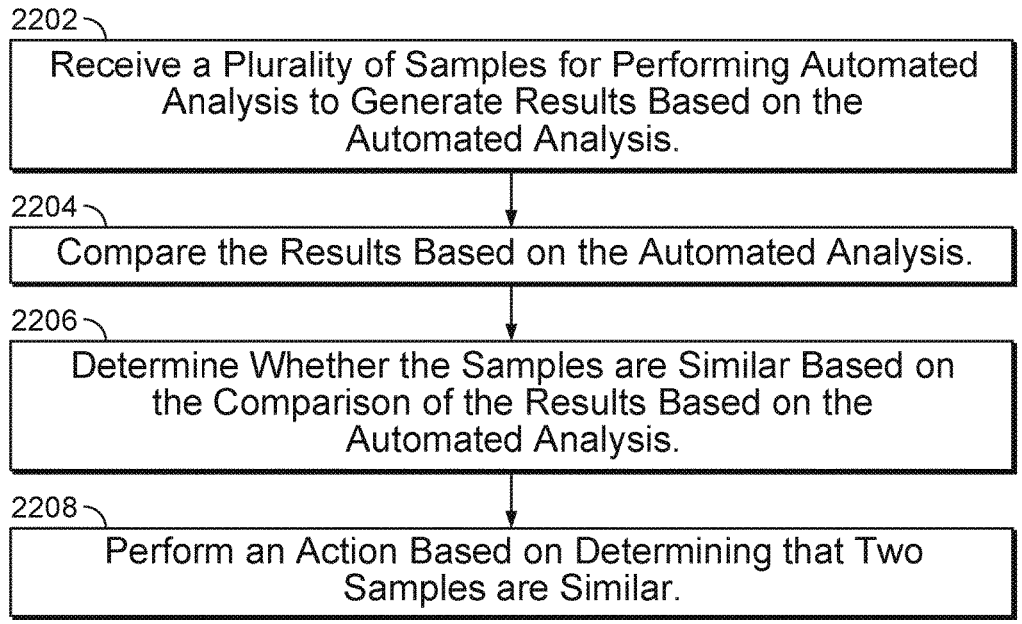
FIG. 22 is a flow diagram for automatically determining whether malware samples are similar in accordance with some embodiments.

FIG. 22 is a flow diagram for automatically determining whether malware samples are similar in accordance with some embodiments. In various embodiments, the process shown in FIG. 22 is performed by the platform and techniques as similarly described above including the embodiments described above with respect to FIGS. 1-3 and 21.

At 2202, a plurality of samples is received for performing automated malware analysis to generate results (e.g., the results that are generated can be output in the form of one or more raw log files/reports, such as similarly described above) based on the automated malware analysis. For example, the automated malware analysis can include dynamic and/or static analysis as similarly described above.

At 2204, comparing the results based on the automated analysis is performed. For example, a textual format of attributes and/or behaviors observed during an automated malware analysis of samples can be generated (e.g., in a log file generated by the automated malware analysis system as similarly described above) to facilitate a comparison of the results.

At 2206, whether the samples are similar based on the comparison of the results based on the automated analysis is performed. For example, the textual representation of these attributes and behaviors can be compared to automatically determine whether two malware samples are similar based on their respective attributes and/or behaviors observed (e.g., based on a threshold comparison and/or percentage of similarity of the attributes and/or behaviors).

At 2208, an action is performed based on determining that two samples are similar. For example, the similar malware samples can be associated with an existing or new malware family for further analysis and/or automated responses/defenses that can be performed for malware associated with the family. As another example, the artifact(s) can be imported to security information and event management (STEM) tools or to support a firewall block list to perform security enforcement on an enterprise network to automatically block such similar malware (e.g., a malware family associated with the similar malware samples), such as similarly described above.

In one embodiment, artifacts are extracted and classified from malware analysis results using the malware analysis platform for threat intelligence made actionable, such as similarly described above. In one embodiment, artifacts are classified into categories of highly suspicious artifacts, suspicious artifacts, and harmless artifacts as similarly described above.

As similarly described above, in an example implementation, suspicious artifacts can be determined using line counting techniques based on a line count calculation that the artifact (e.g., line or sub-line) is associated with malware samples at least a threshold value more times than it is associated with benign samples (e.g., a threshold value of three times, such as malware line counts (m#)>3×benign line counts (b#), or some other threshold value or calculation can be applied). As also similarly described above, in an example implementation, highly suspicious artifacts can also be determined using line counting techniques based on a line count calculation that the artifact (e.g., line or sub-line) is associated with malware samples at least a threshold value more times than it is associated with benign samples and is found in a threshold number of malware samples (e.g., a threshold value of three times, such as m#>3×b#, and the artifact (e.g., line or sub-line) is associated with fewer than a threshold number of malware samples (e.g., m#<500 samples); or some other threshold values or calculations can be applied).

For example, as shown in FIGS. 15A-15D, artifacts that are extracted and classified from malware analysis results can be presented in the user interface as highly suspicious artifacts (e.g., indicated with a colored/shaded triangle that has an exclamation mark within the triangle or other distinct indicators can be used), suspicious artifacts (e.g., indicated with a colored/bolded exclamation mark or other distinct indicators can be used), and harmless artifacts (e.g., no special indicator) that also includes a number of benign results (# B) associated with the artifact and a number of malware results (# M) associated with the artifact, as similarly described above.

Figure 23:
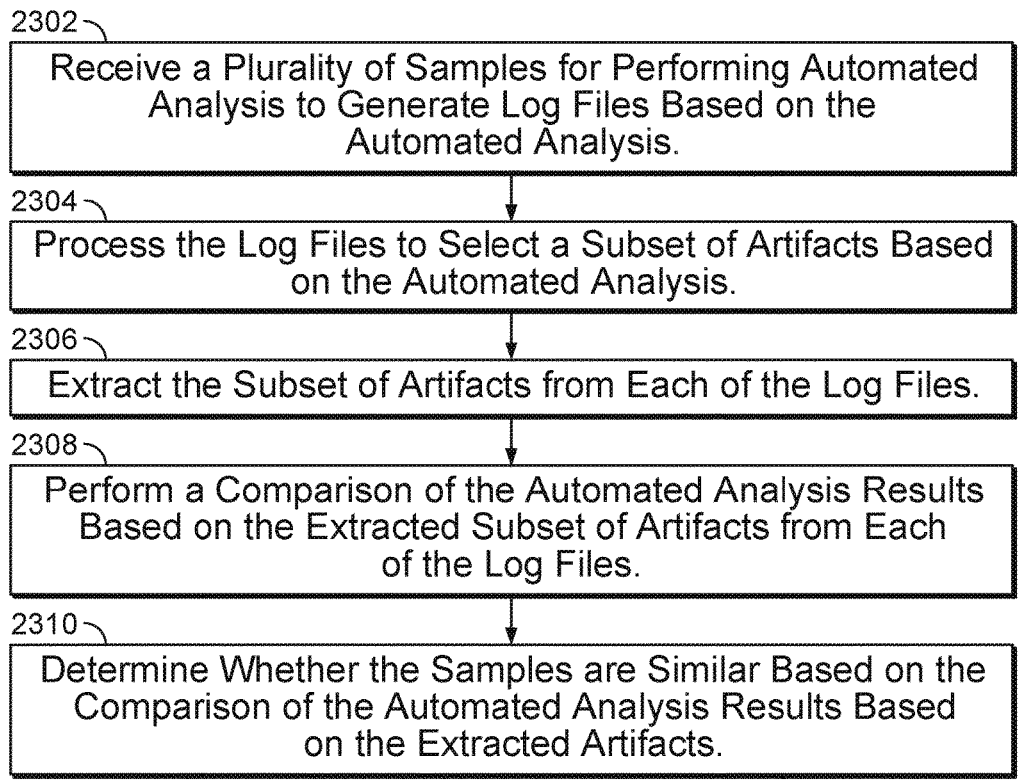
FIG. 23 is another flow diagram for automatically determining whether malware samples are similar in accordance with some embodiments.

FIG. 23 is another flow diagram for automatically determining whether malware samples are similar in accordance with some embodiments. In various embodiments, the process shown in FIG. 23 is performed by the platform and techniques as similarly described above including the embodiments described above with respect to FIGS. 1-3 and 21.

At 2302, a plurality of samples is received for performing automated malware analysis to generate log files based on the automated malware analysis. For example, the automated malware analysis can include dynamic and/or static analysis as similarly described above.

At 2304, processing the log files is performed to select a subset of artifacts based on the automated analysis. For example, suspicious artifacts and highly suspicious artifacts can be determined using the disclosed techniques.

At 2306, extracting the subset of artifacts from each of the log files is performed. For example, suspicious artifacts and highly suspicious artifacts can be extracted using the disclosed techniques.

At 2308, comparing the automated analysis results based on the extracted subset of artifacts from each of the log files is performed. For example, a comparison (e.g., a threshold based or percentage based comparison) of the extracted suspicious artifacts and highly suspicious artifacts can be performed using various techniques such as described herein.

In one embodiment, comparing the automated analysis results based on the extracted subset of artifacts from each of the log files includes performing a weighted comparison of the log files based on the extracted suspicious artifacts and highly suspicious artifacts. For example, a weighting of the documents that includes the extracted suspicious artifacts and highly suspicious artifacts can be performed pairwise on the documents to compare the automated results of two distinct samples. An example weighting function can be performed based on a number of malware results (# M) associated with the artifact and a number of benign results (# B) associated with the artifact as indicated below.

w=ƒ(#M,#B) where # M and # B are determined as described above.

In an example implementation, a weighting function can be implemented using the below example function, where # M and # B are determined as described above.

$$w = \frac{(\#M + 1)}{(\#B + 1)}$$

In another example, grayware (# G) determinations can similarly be computed and included in the weighted factor and comparison analysis.

In one embodiment, artifacts correspond to extracted lines from log files as similarly described above, and the comparison of automated analysis results can be performed using a weighted comparison of the highly suspicious lines and the suspicious lines. In this example, the weighted comparison performed pairwise for a pair of documents (d1, d2) that summarizes automated analysis results of two distinct samples can be implemented using the below equation, in which RL refers to an extracted highly suspicious line and YL refers to an extracted suspicious line, $RL_c$ refers to an extracted highly suspicious line that is in common with each of the documents (d1, d2), and $RL_d$ refers to an extracted suspicious line that is not in common with each of the documents (d1, d2) (i.e., distinct, non-overlapping highly suspicious lines), and $YL_c$ refers to an extracted suspicious line that is in common with each of the documents (d1, d2), and $YL_d$ refers to an extracted suspicious line that is not in common with each of the documents (d1, d2) (i.e., distinct, non-overlapping suspicious lines).

An example weighted computation of lines is shown below.

$$W_{(d1,d2)} = W_{RL}\left(\sum_{i\_RLc} W_i \div \sum_{i\_RLd} W_i\right) + W_{YL}\left(\sum_{i\_YLc} W_i \div \sum_{i\_YLd} W_i\right)$$

In one embodiment, artifacts correspond to extracted lines from log files and also sub-lines as similarly described above, and the comparison of automated analysis results can be performed using a weighted comparison of the highly suspicious lines and the suspicious lines. In this example, the weighted comparison performed pairwise for a pair of documents (d1, d2) that summarizes automated analysis results of two distinct samples can be implemented using the below equation, in which RL refers to an extracted highly suspicious line and YL refers to an extracted suspicious line, $RL_c$ refers to an extracted highly suspicious line that is in common with each of the documents (d1, d2) and $RL_d$ refers to an extracted highly suspicious line that is not in common with each of the documents (d1, d2) (i.e., distinct, non-overlapping highly suspicious lines), $YL_c$ refers to an extracted suspicious line that is in common with each of the documents (d1, d2), and $YL_d$ refers to an extracted suspicious line that is not in common with each of the documents (d1, d2) (i.e., distinct, non-overlapping suspicious lines), RA refers to an extracted highly suspicious sub-line, and YA refers to an extracted suspicious sub-line, $RA_c$ refers to an extracted highly suspicious sub-line that is in common with each of the documents (d1, d2), and $RA_d$ refers to an extracted highly suspicious sub-line that is not in common with each of the documents (d1, d2) (i.e., distinct, non-overlapping highly suspicious sub-lines), $YA_c$ refers to an extracted suspicious sub-line that is in common with each of the documents (d1, d2), and $YA_d$ refers to an extracted highly suspicious sub-line that is not in common with each of the documents (d1, d2) (i.e., distinct, non-overlapping suspicious sub-lines).

An example weighted computation of lines and sub-lines is shown below.

$$W_{(d1,d2)} = W_{RL}\left(\sum_{i\_RLc} W_i \div \sum_{i\_RLd} W_i\right) + W_{YL}\left(\sum_{i\_YLc} W_i \div \sum_{i\_YLd} W_i\right) + W_{RA}\left(\sum_{i\_RAc} W_i \div \sum_{i\_RAd} W_i\right) + W_{YA}\left(\sum_{i\_YAc} W_i \div \sum_{i\_YAd} W_i\right)$$

In an example implementation, the weighted comparison can be normalized (e.g., to a value between 0 and 1) to facilitate comparison of the automated analysis results using the disclosed techniques. As will now be apparent, various other weighted comparison computations can similarly be implemented to facilitate a comparison of the automated analysis results using the disclosed techniques.

At 2310, determining whether the samples are similar based on the comparison of the automated analysis results based on the extracted artifacts is performed. For example, the above-described weighted comparisons of artifacts (e.g., highly suspicious lines and suspicious lines and/or highly suspicious sub-lines and suspicious sub-lines) can be performed to determine a normalized value for a pairwise comparison of the automated analysis results. The samples can then be determined to be similar or not based on the result of that comparison using a threshold (e.g., applying default and/or configurable threshold value(s)). In an example implementation, using a weighted normalization (e.g., 0 . . . 1), then whether the pairwise comparison indicates that the documents are at least 90% similar (e.g., or some other threshold value can be used as a default or a configured similarity threshold value can be applied for a threshold-based comparison) can be applied to determine similarity.

In one embodiment, a similarity threshold value(s) is configurable. For example, a similarity threshold value(s) can be selected based on whether it is preferred to group similar malware samples (e.g., a lower similarity threshold can be applied) or whether it is preferred to more finely distinguish different malware samples (e.g., a higher similarity threshold can be applied). For example, the similar malware samples can be associated with an existing or new malware family for further analysis and/or automated responses/defenses that can be performed for malware associated with the family.

Figure 24:
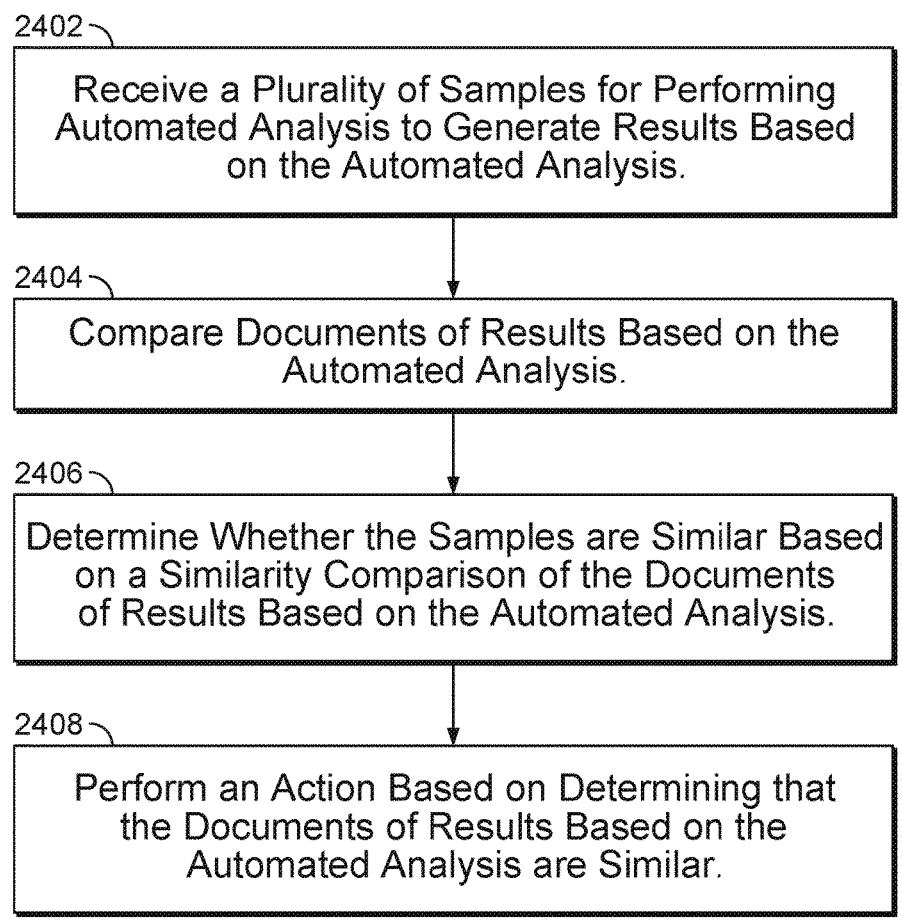
FIG. 24 is another flow diagram for automatically determining whether malware samples are similar in accordance with some embodiments.

FIG. 24 is a flow diagram for automatically determining whether malware samples are similar in accordance with some embodiments. In various embodiments, the process shown in FIG. 24 is performed by the platform and techniques as similarly described above including the embodiments described above with respect to FIGS. 1-3 and 21.

At 2402, a plurality of samples is received for performing automated malware analysis to generate results (e.g., the results that are generated can be output in the form of one or more raw log files/reports, such as similarly described above) based on the automated malware analysis. For example, the automated malware analysis can include dynamic and/or static analysis as similarly described above.

At 2404, comparing documents of the results based on the automated analysis is performed (e.g., comparing the processed log files, which can be processed using various techniques, such as similarly described above). For example, a textual format of attributes and/or behaviors observed during an automated malware analysis of samples can be generated to facilitate a comparison of the results (e.g., raw log file(s)/report(s) can be generated by the automated malware analysis system, which can then be processed to facilitate a comparison of the documents/processed log file(s)/report(s), such as similarly described above).

In one embodiment, comparing documents is performed using similarity document algorithms, such as Cosine Similarity, Jaccard Similarity Index, SimHash, and/or another similarity document algorithm (e.g., implemented using open source or commercially available implementations of these algorithms). For example, the input can be the entire document (e.g., the entire/original log file of the results of the automated malware analysis of each sample to be compared, which can be the above-described processed version of these log files that has de-duplicated lines of the log files as similarly described above). As another example, the document (e.g., the log file) can be translated into a document (e.g., new version of the log file) that just includes a set of extracted artifacts (e.g., highly suspicious and suspicious lines/sub-lines as similarly described above, such as from an original log file just extract row lines {L1, . . . , LN} with or without gray lines (e.g., lines associated with grayware), and then extract artifacts/sub-lines {A1, . . . , An} to generate the new, revised version of the log file). The comparer component (e.g., comparer component 2110 of FIG. 21) can be implemented using a document comparison algorithm(s) (e.g., Cosine Similarity, Jaccard Similarity Index, SimHash, and/or another similarity document algorithm can be implemented) to perform a comparison of results (e.g., original log files or the translated log files as described above) to determine similarities.

At 2406, whether the samples are similar based on the comparison of the documents of the results based on the automated analysis is performed. For example, the document comparison can be performed to automatically determine whether two malware samples are similar based on a threshold comparison (e.g., a configurable threshold, such as a 90% similarity threshold).

At 2408, an action is performed based on determining that two malware results are similar. For example, the similar malware samples can be associated with an existing or new malware family for further analysis and/or automated responses/defenses that can be performed for malware associated with the family. As another example, the artifact(s) can be imported to security information and event management (STEM) tools or to support a firewall block list to perform security enforcement on an enterprise network to automatically block such similar malware (e.g., a malware family associated with the similar malware samples), such as similarly described above.

Automated Grouping of Malware Samples Based on Artifacts

As similarly described above, a problem that exists in the current malware analysis and security field is that attackers often modify (e.g., making minor changes or other modifications to) existing malware (e.g., malicious programs or other malware/grayware content) and reuse them to attack/infect additional networks and environments. This approach presents significant technical challenges for defenders (e.g., anti-malware solution providers) to effectively and efficiently detect and respond to each malware program independently. For example, this problem can cause delays, errors, and result in extra time being spent on effectively similar malware being repeatedly re-analyzed over time.

Thus, new and improved techniques are needed to address this security technology problem. Accordingly, new and improved techniques for automatically grouping malware samples based on artifacts are disclosed. For example, techniques for automatically grouping malware samples based on artifacts can be implemented using the above-described malware analysis platform for threat intelligence made actionable as further described below.

For example, with the growing pervasiveness of breaches and new malware samples being discovered every day, it is desirable to identify groups (e.g., clusters) of malware samples that share artifacts to more effectively and more efficiently defend against such malware.

In one embodiment, automatically grouping malware samples based on artifacts includes receiving results based on an automated malware analysis of a plurality of samples; and performing one or more cluster-based modeling techniques to identify malware samples that are similar based on artifacts (e.g., extracted features as further described below). For example, as similarly described above, artifacts can include attributes or behaviors (e.g., based on dynamic and/or static analysis techniques performed using the automated malware analysis system, such as similarly described above).

In some embodiments, a system, process, and/or computer program product for automatically grouping malware samples based on artifacts includes receiving a plurality of samples for performing automated malware analysis to generate log files based on the automated malware analysis; processing the log files to extract features associated with malware; clustering the plurality of samples based on the extracted features; and performing an action based on the clustering output.

In one embodiment, a system, process, and/or computer program product for automatically grouping malware samples based on artifacts further includes clustering the plurality of samples based on the extracted features using a decision tree clustering process.

In one embodiment, a system, process, and/or computer program product for automatically grouping malware samples based on artifacts further includes clustering the plurality of samples based on the extracted features using a k-means++ clustering process.

In one embodiment, automatically grouping malware samples based on artifacts includes selecting one or more features from the automated malware analysis results of malware samples and assigning a value (e.g., a unique numerical value) to each indicator; collecting the assigned values in an array for each sample; comparing the assigned values of the array between two samples and calculating a distance between the two samples; and clustering the samples within a defined threshold of distance. These and other clustering techniques for automatically grouping malware samples based on artifacts will be further described below.

For example, the disclosed techniques for automatically grouping malware samples based on artifacts can be applied to group malware samples into families based on similar artifacts (e.g., a family of malware that exhibits similar features, such as similar attributes and/or behaviors). Moreover, identified malware families can then facilitate solutions that more effectively and more efficiently detect and respond to malware, such as further described below.

Components for Automatically Grouping Malware Samples Based on Artifacts

Figure 25:
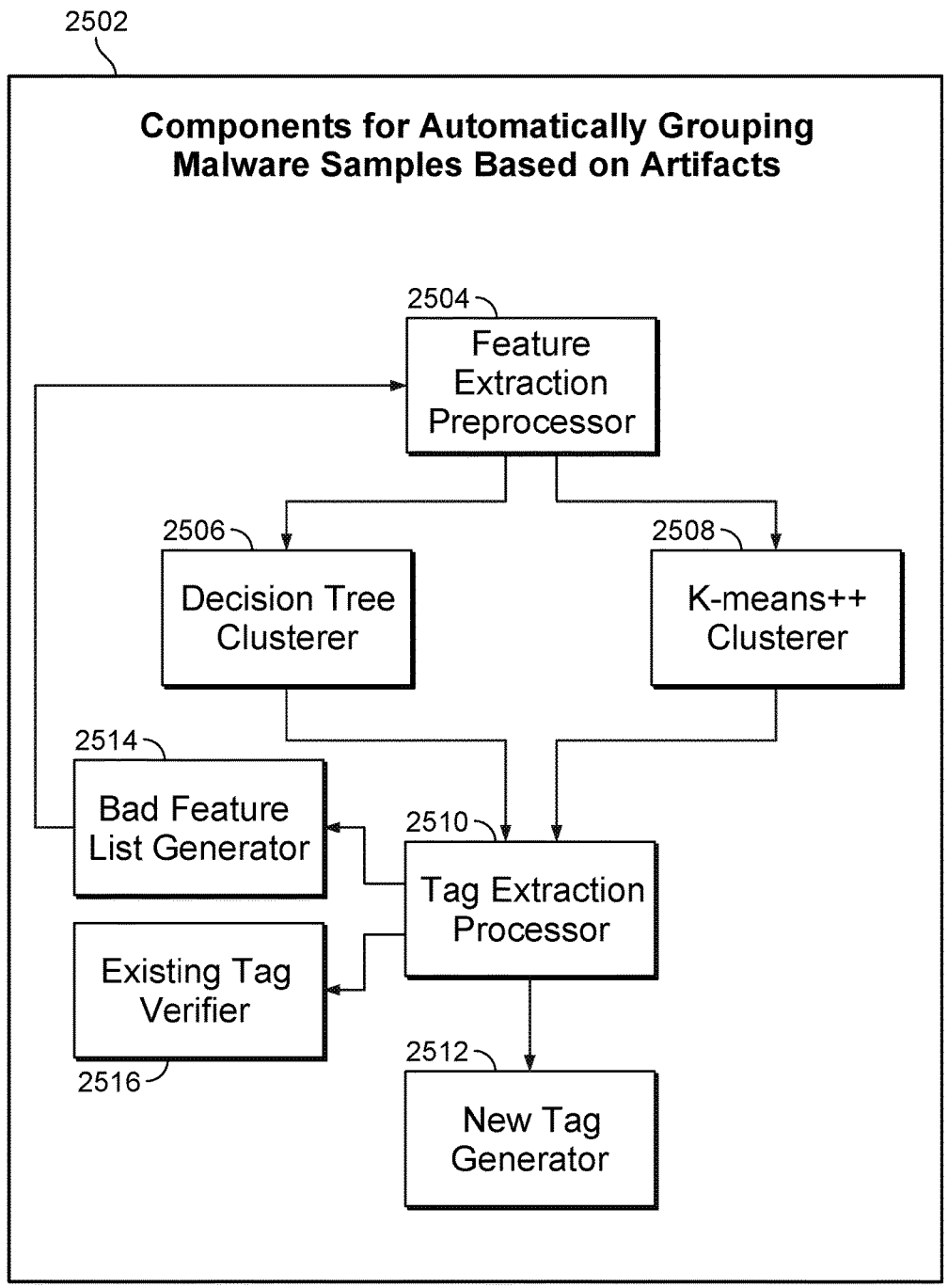
FIG. 25 is a component diagram of functional components for automatically grouping malware samples based on artifacts in accordance with some embodiments.

FIG. 25 is a component diagram of functional components for automatically grouping malware samples based on artifacts in accordance with some embodiments. In various embodiments, the components shown in FIG. 25 can be implemented by the platform and techniques as similarly described above including the embodiments described above with respect to FIGS. 1-3 and 25 and as further described below.

Referring to FIG. 25, as shown at 2502, a component architecture for automatically grouping malware samples based on artifacts includes a feature extraction preprocessor component 2504 that extracts artifacts from automated analysis results for samples, such as the automated analysis results for a plurality of samples (e.g., automated malware analysis results for thousands to millions of samples). For example, these documents can be log files that include lines (e.g., de-duplicated lines) from the automated analysis results from the automated malware analysis system as similarly described above. In this example, the feature extraction preprocessor component extracts features from lines from these log files (e.g., prepping input for clustering, extracting features, such as sub-lines/artifacts from lines of the log files, that extract a malware threshold, such as 80% associated with malware).

In one embodiment, feature selection as an initial stage of processing is performed to pre-filter data sets for applying the above-described automated grouping/clustering techniques. In an example implementation, pre-filtering can be performed based on a feature selection process for applying the disclosed automated grouping/clustering techniques (e.g., for efficiently reducing dimensionality of problem and eliminating noise). In an example implementation, features can be selected based on the following criteria: (1) disregard features if found in >10% of samples (e.g., a common Windows API); and (2) disregard features if found in <n (=10) number of samples. Example feature categories include Mutex, file names, library (lib) names, registry names, DNS, IP, user agent, and/or other feature categories.

As also shown in FIG. 25, the extracted artifacts can be provided to one or more clustering components for clustering the malware samples based on the extracted features. In one embodiment, the clustering components include a decision tree clusterer component 2506 and a k-means++ clusterer component 2508 as shown. For example, each of the clusterer components can generate clusters based on the extracted features using various techniques that are further described below. In one embodiment, additional and/or different clustering algorithms can be implemented for clustering the malware samples based on the extracted features. In one embodiment, a post-processing component can be implemented (e.g., as integrated with the respective clustering components or as a distinct component (not shown)) that standardizes output from the one or more clustering components.

As also shown in FIG. 25, the clustering results can then be provided to a tag extraction processor component 2510. In one embodiment, the tag extraction processor component filters and analyzes the clustering results to determine whether to perform one or more of the following actions: (1) generate new tags; (2) generate a black feature list; and (3) verify an existing tag. In one embodiment, this can be implemented using a fully automated or a semi-supervised expert system (e.g., reduce data set—samples/groups that can be further verified/analyzed by a security analyst). As also shown in FIG. 25, the tag extraction processer component can determine whether to generate a new tag using a new tag generator component 2512. For example, if a new malware family is identified as a result of the clustering analysis, then a new tag can be generated based on the features determined to be associated with the new malware family.

As also shown in FIG. 25, the tag extraction processor is in communication with a black feature list generator component 2514 that can be implemented to generate a black feature list that can be provided to feature extraction preprocessor component 2504. For example, if new features are determined to be associated with a new malware family, then the new features can be provided to feature extraction preprocessor component 2504 as a feedback loop mechanism to have such features extracted as part of that preprocessing stage as will be further described below.

In one embodiment, bad features (e.g., blacklisted features) can be automatically identified by the bad feature list generator to identify features that were determined to not be good features for subdividing/partitioning the malware samples into groups/families, as a feedback loop to the feature extraction preprocessor stage. For example, a common operating system feature can be identified as such a bad feature as such would not be effective for identifying malware families. As an example, a common platform feature, such as windows.ini, as that is a common feature across Windows, would generally be a bad feature to attempt to utilize for grouping malware samples, as opposed to, for example, windows.ini if such was determined during malware analysis to be a version of that common component that was being installed locally rather than getting that common component on the system. As another example, a common Minecraft/other component that may be identified as malware, if there are only malware samples for Minecraft and no benign samples for Minecraft, would generally be a bad feature to attempt to utilize for grouping malware samples, as such can result in a common component feature of Minecraft being used as a feature for identifying Minecraft malware when such really just identifies any Minecraft related apps. Additionally, once malware groups are identified by the automatic process, malware experts can review these groups to check the quality. Generally, the number of groups (~100) is very small relative to the number of samples (~1 billion unique samples) such that the groups are feasible to manually review. After a malware expert(s) reviews a group, they can decide that one of the features is a bad feature, and then they can mark such bad features so that such bad features can be avoided (e.g., not selected) the next time the above-described automated grouping process is executed.

As also shown in FIG. 25, the tag extraction processor is in communication with an existing tag verifier component 2516 that can be implemented to verify that existing tags identify the proper malware family. For example, whether a previously identified tag specified for identifying a previously identified malware family can accurately identify the malware samples that are determined to be clustered into the previously identified malware family can be verified as a feedback mechanism for existing tags as will be further described below.

The results of the automated grouping of malware samples based on artifacts determination can then be applied using the new and/or verified tags to perform various actions. For example, a report can be generated that identifies malware families (e.g., the samples can be grouped into new or existing malware families as further described below). As another example, an alert can be generated if a sample matches a new or verified existing tag (e.g., the sample is determined to match a new or existing malware family). As yet another example, a response/action can be performed based on a new or existing verified tag (e.g., the common artifact(s) associated with the tag can be imported to security information and event management (STEM) tools or to support a firewall block list to perform security enforcement on an enterprise network to automatically block such similar malware as similarly described above and further described below).

In one embodiment, the components of the system as shown in FIG. 25 illustrate an overall view of an architecture for implementing the disclosed techniques for automatically grouping malware samples based on artifacts. In an example implementation, the disclosed components for automatically grouping malware samples based on artifacts can be implemented using various open source and/or commercially available components such as described above and coded in various programming languages, such as Python, Java, and/or other programming languages.

In one embodiment, the disclosed techniques can be implemented using the components of the system as shown in FIG. 25 as further described below.

For example, malware families can be identified and samples grouped into the malware families using the disclosed techniques as further described below. As another example, the automated similarity determinations can be performed in a batch mode to identify malware families and reduce indexing of data performed by the above-described malware analysis platform for threat intelligence made actionable (e.g., using only one copy of similar malware samples).

Decision Tree Clustering Techniques for Automatically Grouping Malware Samples into Families Based on Extracted Features In one embodiment, one of the clustering techniques performed is a decision tree-based clustering technique as further described below. The disclosed decision tree-based clustering technique represents a novel use of decision trees for clustering of an unsupervised set of data (e.g., an unsupervised set of data that includes the results of the automated malware analysis of a plurality of samples). Generally, decision trees have various applications but are not typically used for clustering of data (e.g., there are existing, well-known clustering algorithms, and decision trees are generally not included in that set of existing, well-known clustering algorithms). For example, decision trees are typically used for classifying a data set based on a supervised training set of data.

Also, the clustering of the unsupervised set of data in this problem for automatically grouping malware samples based on artifacts is generally in a context of having to attempt to cluster a data set of a significant size in a computationally efficient manner on a data set that can have relatively large cliques (e.g., the data set is generally associated with clique-like behavior, in which, for example, each node may be connected to every other node or a significant number of other nodes, which is generally a result of malware developers often using a kitchen sink approach—that is, including many different, common malware attacks in a given malware sample). As a result, graphs for attempting to cluster the malware sample results data can grow quickly (e.g., one day of the malware sample results data can generate a 500 GB graph and grows at an n-squared rate using graph-based clustering techniques, so traditional clustering techniques are generally not effective and/or efficient for clustering such a large data set with clique-like behavior).

The clustering of such a large data set that is associated with clique-like behavior presents technical challenges to efficiently implement the clustering from a computational resources and time usage perspective. For example, in this problem context of malware sample results data, the data set to be processed and clustered is a relatively large data set for clustering, such as forty million to hundreds of millions of results of analyzed malware samples to cluster. Moreover, some of these malware sample results (e.g., log files) can have, for example, an average of 40 features, and some can have one hundred thousand or more features (e.g., for malware that is performing the so-called kitchen sink approach to malware that includes attempting many different attack vectors, such as for each version of an operating system, browser, etc.).

As such, the disclosed clustering techniques are designed to identify new groups/malware families and also verify existing groups/malware families. In addition, the disclosed clustering techniques are designed to avoid clustering of benign groups (e.g., as such would be too costly from a computational resources and time usage perspective and can lead to erroneous results when the objective is to identify malware groups).

In one embodiment, the malware sample results data that is to be processed and clustered includes a label that indicates whether each of the malware samples is labelled as a benign or malware sample (e.g., as determined and identified by the automated malware analysis system as described above, and in some cases, can also be labelled as grayware as also discussed above). As similarly described above, a feature extraction preprocessing stage can first be performed on the malware sample results data (e.g., to extract features, such as sub-lines/attributes of relative interest for purposes of clustering the malware samples into groups/families). The disclosed decision tree-based clustering technique can then be performed to associate groups hierarchically into groups and subsets of groups in which the tree can be built on selected features (e.g., a left branch indicating a true value for a given feature, and right branch indicating a false value for the given feature).

Figure 26:
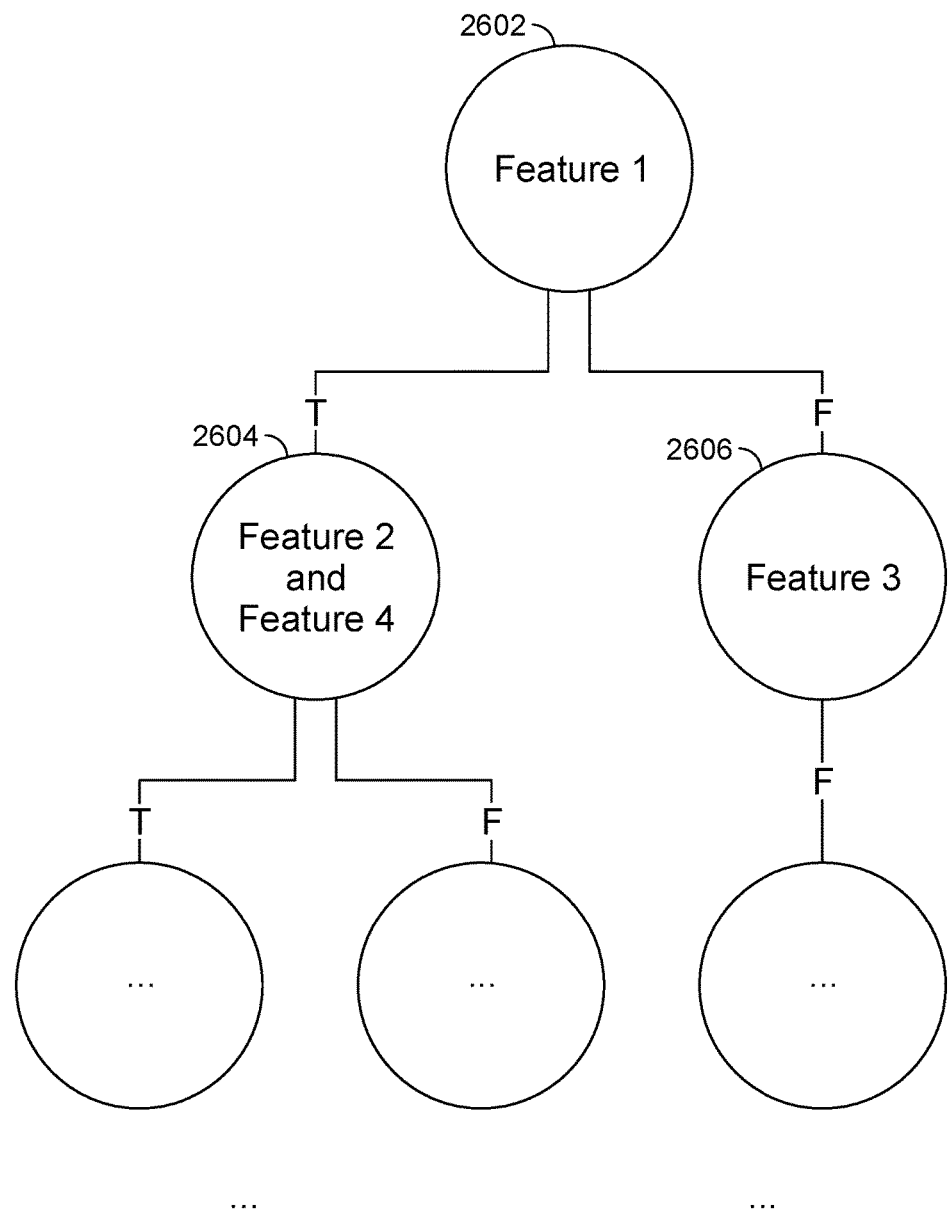
FIG. 26 is a graphical visualization of a decision tree that can be generated for clustering malware samples into malware families in accordance with some embodiments.

FIG. 26 is a graphical visualization of a decision tree that can be generated for clustering malware samples into malware families in accordance with some embodiments. As shown at 2602, a first feature is selected and a left branch is for dividing the samples into a set of samples that include feature 1. A next set of one or more features can be selected, such as features 2 and 4 as shown at 2604, for further subdividing this subset of samples. As shown at 2602, a right branch is for dividing the samples into a set of samples that do not include feature 1. A next set of one or more features can be selected, such as feature 3 as shown at 2606, for further subdividing this subset of samples. In one embodiment, the decision tree clustering process is implemented by decision tree clusterer component 2506 as shown in FIG. 25.

In one embodiment, the decision tree can be generated to identify a malware family based on a set of features being present and/or not present in the group of malware samples. For example, the decision tree technique can be performed to identify malware groups/families based on one or more constraints (e.g., at least 99%, or some other threshold value, of the group is malware, and at least a threshold number of malware samples, such as at least 1000 malware samples or some other threshold number of malware samples) and can be identified by a set of features that are common in that group. In an example implementation, the feature extraction preprocessing stage (e.g., implemented using feature extraction preprocessor 2504) includes selecting and extracting features that satisfy a feature threshold (e.g., extracts only features that are each associated with malware at least 90% of the time, or some other threshold value can be configured, as this threshold feature constraint can be implemented to avoid extracting and attempting to utilize features that are benign, for example, as a common benign feature may just be common to a particular OS platform and will not generally facilitate an efficient and effective clustering of malware samples based on such features). Another feature can then be selected that satisfies the threshold value (e.g., a feature threshold can be configured to require that a feature that is selected is a feature that is associated with malware at least 90% of the time, or some other threshold value can be configured) and further subdivides/partitions the largest group that is at least a threshold percentage of samples that were identified/labeled as malware (e.g., at least 99%, or some other threshold value, of the group is malware). This iteration can be performed for each level in the tree for each new selected extracted feature (e.g., has feature 2 and feature 4, or does not have feature x and does have feature y, etc.) and the threshold value can be applied until a new subdivision/partition of a group of malware samples is identified that has the threshold properties (e.g., group is at least 99% malware, selected features are threshold features, and at least a threshold number of malware samples, such as at least 1000 malware samples or some other threshold number of malware samples).

In an example implementation, this decision tree clustering process can be performed in a first pass of the malware sample results data set to iterate to a predetermined depth level (e.g., to iterate to a n-depth level, such as a predetermined tree depth of x=100 maximum levels). In this example, a second pass can then be performed to identify a best feature for each group (e.g., applying the above-described 99% threshold for selecting the best feature). For example, a set of features (e.g., features 2 and 4) can be collapsed if the features are determined to identify (approximately) the same group of malware samples.

This decision tree clustering process generally scales well (linearly) and can be computationally efficiently applied to cluster, for example, an entire year of malware results sample data. As similarly described above with respect to FIG. 25, after the malware results sample data is clustered, then the malware sample clusters can be used to tag/classify malware groups/families identified by this decision tree clustering process.

In one embodiment, the decision tree clustering process can also utilize tag data information. For example, another constraint that can be included in the group selection processing can include only selecting groups that are untagged based on a threshold value (e.g., 99% of the malware samples, or another threshold value in the group are untagged) when selecting features to further subdivide/partition groups. The benefit of adding this constraint is to avoid having to attempt to find a malware family that was previously identified (e.g., using the disclosed decision tree clustering process or another clustering/malware family identification technique).

For example, the disclosed decision tree clustering technique can be performed to identify a common set of malware features that uniquely identify malware groups (e.g., 99% of the malware samples in the group are malware) of a threshold size (e.g., a group that includes at least a threshold number of malware samples, such as 1000 or more malware samples), where the identified features are associated with malware based on a threshold (e.g., the features are each associated with malware at least 90% of the time, such as high-risk artifacts/features).

The malware grouping/family results generated by the disclosed decision tree clustering technique can be validated based on tags to identify previously identified/validated malware groups/families (e.g., predetermined tags and/or tags from security analysts). In addition, as will be further described below, the results of the disclosed decision tree clustering technique can also be validated by applying another clustering approach(es) to the malware sample data set, such as the disclosed k-means++ clustering technique as further described below. For example, the disclosed decision tree clustering technique can group a large number of malware samples (e.g., approximately two-thirds of malware samples were effectively and efficiently grouped using the disclosed decision tree clustering technique, compared to approximately 50% of malware samples using the below described k-means++ clustering technique, although it should be noted that the k-means++ clustering technique is a least expensive clustering algorithm as further described below).

In one embodiment, the decision tree clustering process is implemented by decision tree clusterer component 2506 as shown in FIG. 25. In an example implementation, the decision tree clusterer component can be implemented using a Hadoop framework (e.g., Java Hadoop or another open source or commercially available Hadoop framework) and can be programmed in Java, Python, and/or another programming language (e.g., and the decision tree itself can be implemented in Java Hadoop or Java). In this example, the data set processed using this implementation can be performed periodically (e.g., once or twice per week or some other frequency or upon demand) and executed in less than 24 hours (e.g., executed on server class hardware, assuming approximately one million plus number of features).

K-Means++ Clustering Techniques for Automatically Grouping Malware Samples into Families Based on Extracted Features In one embodiment, one of the clustering techniques performed is a k-means++ based clustering technique as further described below. Generally, k-means++ clustering refers to a technique for providing a classification of data, so that points assigned to the same cluster are similar (e.g., in some aspects, such as similar based on the extracted features associated with the samples in a given cluster). The k-means++ algorithm can generally be implemented similar to the k-means algorithm except for the selection of the initial conditions as would be apparent to one of ordinary skill in the art. The output result of applying the k-means cluster is generally a list of clusters (e.g., related sets of points).

In one embodiment, a k-means++ clusterer (e.g., which can be implemented using k-means++ clusterer component 2508 as shown in FIG. 25) is disclosed that is uniquely applied to the malware samples data set and extracted features to effectively and efficiently generate clusters/groups of malware samples that are associated based on the extracted features (e.g., grouping the malware samples into malware families based on their features/attributes) as further described below. For example, the disclosed k-means++ clusterer provides a scalable implementation of k-means++ to identify malware groups/families based on the extracted features. As similarly described above, the disclosed k-means++ clustering process can be applied independently or in combination with the decision tree-based clustering process and/or another clustering process to verify/complement identification of malware groups/families.

As similarly described above, the feature selection and extraction performed as a preprocessing stage of the overall process for automatically grouping malware samples based on artifacts as described above with respect to FIG. 25 provides an initial input stage in the process for malware family identification based on features associated with the malware samples. As such, in one embodiment, the k-means++ clusterer component receives (e.g., received from the feature extraction preprocessor) an input for each malware sample (e.g., each malware sample being uniquely identified, such as by applying a hash function to provide a hash of each malware sample, such as SHA1, SHA2, and/or another hash function(s) can be applied as similarly described above) that includes a list of extracted features identified by a numerical representation (e.g., line numbers that were extracted for each malware sample can be provided as the initial input, such as SHA1: 1, 3, 7, 9; SHA2: 2, 3, 6, 8 and/or sub-lines/attributes can be similarly identified).

As a next stage of processing, in a multidimensional space, the k-means++ clusterer assigns for each malware sample, a point/vector in the multidimensional space. Another input (e.g., configurable input) that is provided as a constraint to the k-means++ clusterer is a constant value that determines a k-number of clusters that the k-means++ algorithm clusterer will cluster. As an initialization step, the k-means++ clusterer chooses k number of random points.

In one embodiment, another approach can be implemented using signatures (e.g., byte patterns and/or strings in malware executables/content can be a signature for malware) that can be utilized for an initialization stage for applying the disclosed k-means++ clustering process (e.g., to avoid having to simply choose k number of random points to initialize the multidimensional space). For example, a set of samples can be placed into buckets (e.g., bucketized) based on signature matches (e.g., signature matches for malware samples determined during the automated malware sample analysis system, such as signature matches for samples determined by the WildFire™ cloud-based malware analysis environment that is a commercially available cloud security service provided by Palo Alto Networks, Inc., or a similar solution provided by another vendor can be utilized, as similarly described above). This initial bucketing stage allows for the following three options/versions of the disclosed k-means++ clustering process that can utilize signature buckets as a down sampling initialization stage: (1) perform the disclosed k-means++ clustering process against each bucket to verify whether there is one or more clusters within a given single bucket; (2) select (e.g., randomly select) one sample from each bucket, then perform the disclosed k-means++ clustering process with respect to that set of selected samples; and (3) select k-means++ starting points/centers by selecting a sample from each of these buckets to select the starting point for a given k cluster (e.g., in this option/version, the disclosed k-means++ clustering process still is applied to all of the samples, so this is not downsizing but rather an efficient mechanism for selecting starting points for the initialization of the multidimensional k-space for applying the disclosed k-means++ clustering process). In this example, each sample is associated with a signature (e.g., so, each sample is in a bucket, but a given bucket may just be a bucket of a single sample, whereas other buckets can have many samples).

In one embodiment, after initialization of the multidimensional k-space, the k-means++ clusterer iterates through all the documents (e.g., malware samples with their extracted features) to assign each to its closest selected k points (e.g., which are starting centers of each of the respective initial k clusters), in which the k points are randomly selected to be distributed across the k space. After a first pass/iteration through all of the documents, the k-means++ clusterer determines the new center for each k cluster, selected based on an average/means of documents assigned to that respective k cluster.

In one embodiment, the k-means++ clusterer reiterates until a convergence condition(s) is satisfied (e.g., an example convergence condition can be that less than a threshold move/distance of k-center(s)). In another embodiment, the k-means++ clusterer reiterates until at least a threshold number of k clusters have converged (e.g., at least 90% of k clusters have converged or another threshold number of k clusters have converged).

In an example implementation, the k-means++ clusterer can be implemented as a semi-supervised clustering technique, where k is selected based on experimentation (e.g., for the malware samples input, as similarly described above, k can be selected to be 50-100, such as approximately 70-80). In this example implementation, the disclosed k-means++ clustering technique is generally directed to identify relatively larger groups, as opposed to attempting to identify very small groups (e.g., by selecting a large k value that would attempt to subdivide/partition the malware samples into smaller malware groups/families).

After convergence is determined or the k-means++ clustering process is otherwise determined to be completed or exhausted based on one or more criteria/constraints, the output is a k number of clusters. Each of the k clusters in the output result of the k-means++ clusterer includes a unique set of malware samples (e.g., points/vectors assigned to such k clusters).

In one embodiment, the process includes extracting a set of features that uniquely identify each of the k clusters and also describe most of the documents in this k cluster. This can be implemented using a scoring algorithm to identify the extracted features for each k cluster that can be determined to be associated (e.g., uniquely associated) with the set of malware samples in each k cluster:

In an example implementation, the k-means++ clustering process can be implemented on a Hadoop framework (e.g., Java Hadoop or another open source or commercially available Hadoop framework), and can be programmed in Java, Python, and/or another programming language. In this example, the data set processed using this implementation can be performed periodically (e.g., once or twice per week or some other frequency or upon demand) and executed in less than 12 hours (e.g., executed on server class hardware, assuming approximately one million plus number of features).

Processes for Automatically Grouping Malware Samples Based on Artifacts

Figure 27:
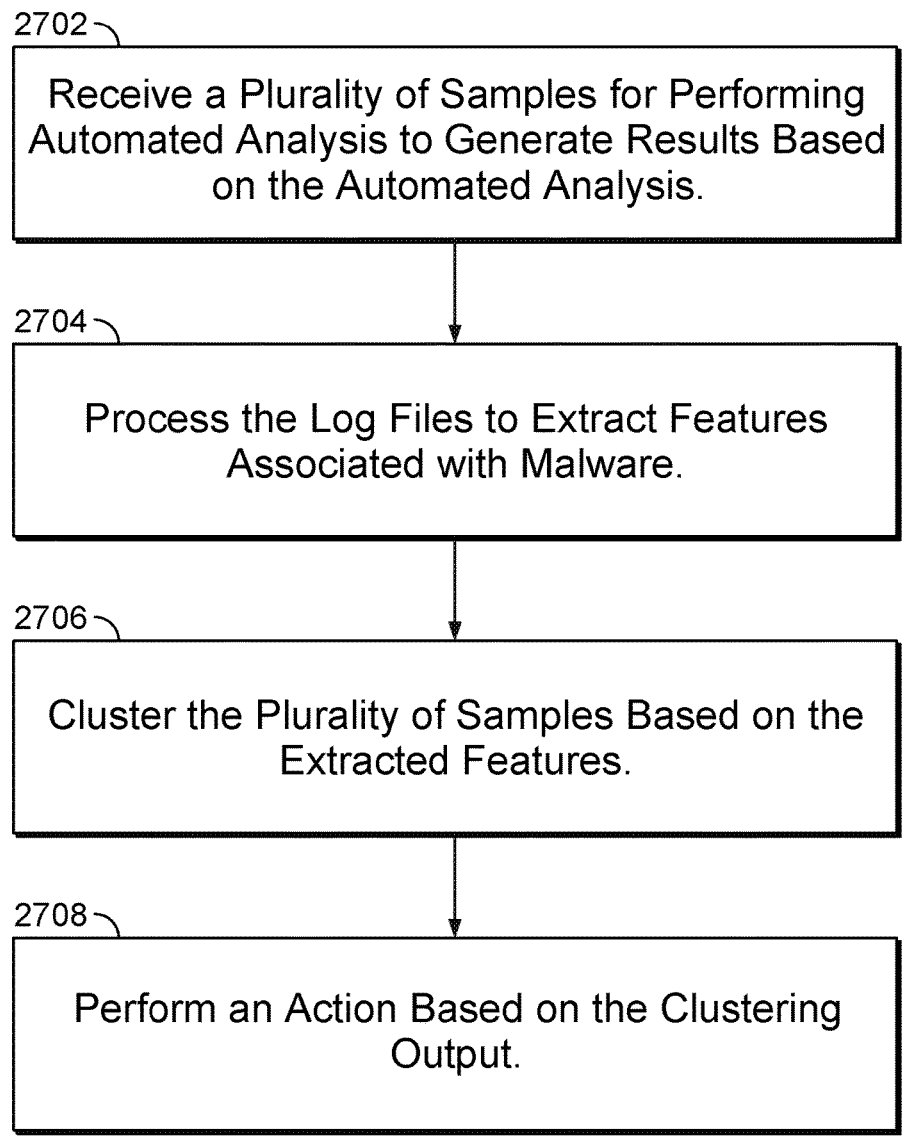
FIG. 27 is a flow diagram for automatically grouping malware samples based on artifacts in accordance with some embodiments.

FIG. 27 is a flow diagram for automatically grouping malware samples based on artifacts in accordance with some embodiments. In various embodiments, the process shown in FIG. 27 is performed by the platform and techniques as similarly described above including the embodiments described above with respect to FIGS. 1-3 and 25.

At 2702, a plurality of samples is received for performing automated malware analysis to generate results (e.g., the results that are generated can be output in the form of one or more raw log files/reports, such as similarly described above) based on the automated malware analysis. For example, the automated malware analysis can include dynamic and/or static analysis as similarly described above.

At 2704, the log files are processed to extract features associated with malware. For example, a feature extraction preprocessing stage can be performed as similarly described above.

At 2706, clustering the plurality of samples based on the extracted features is performed. For example, the disclosed decision tree clustering and/or the disclosed k-means++ clustering can be performed as similarly described above.

At 2708, an action is performed based on the clustering output. For example, the clustering output can be applied to group malware samples into families based on similar artifacts (e.g., a family of malware that exhibits similar features, such as similar attributes and/or behaviors).

Figure 28:
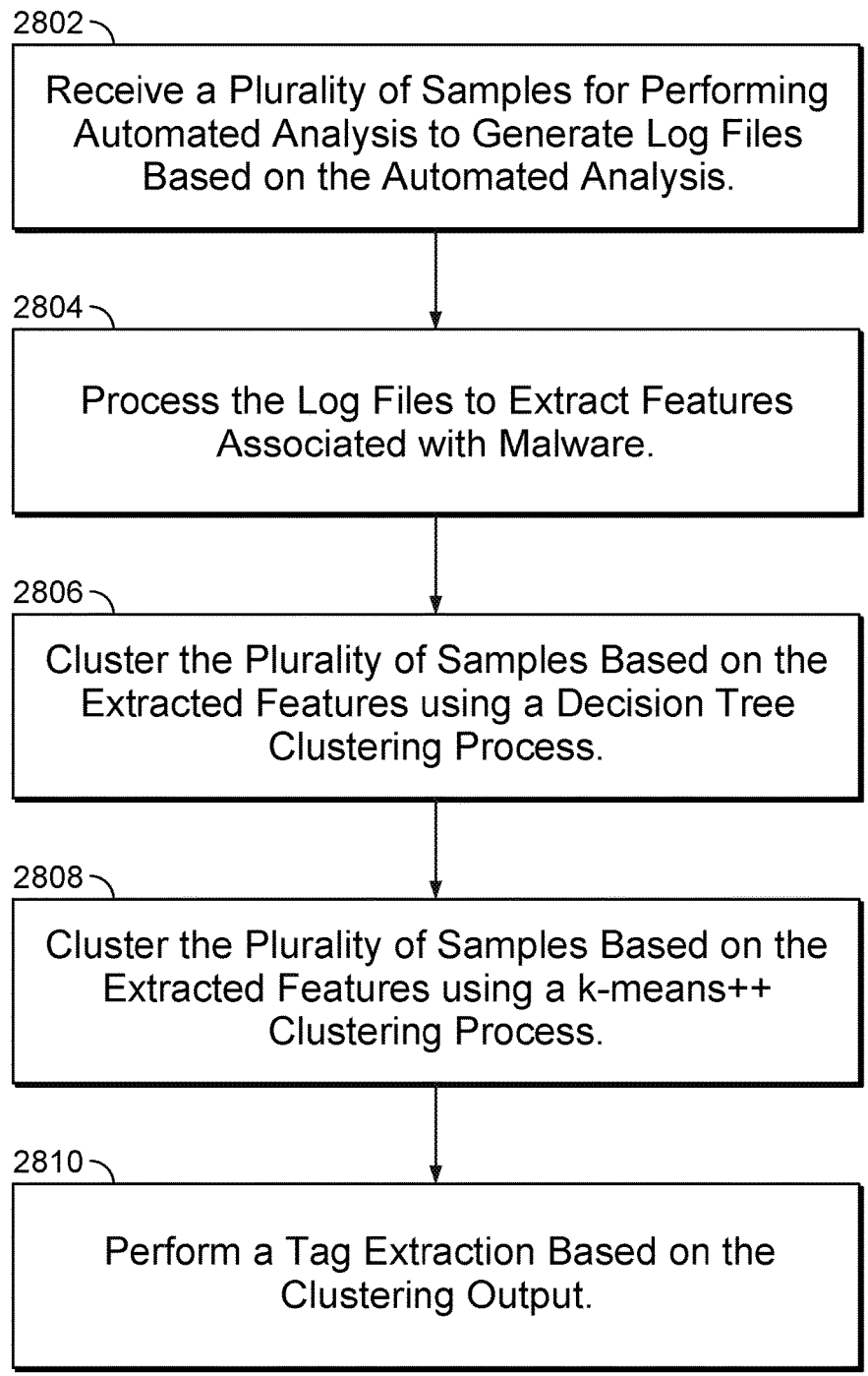
FIG. 28 is another flow diagram for automatically grouping malware samples based on artifacts in accordance with some embodiments.

FIG. 28 is another flow diagram for automatically grouping malware samples based on artifacts in accordance with some embodiments. In various embodiments, the process shown in FIG. 28 is performed by the platform and techniques as similarly described above including the embodiments described above with respect to FIGS. 1-3 and 25.

At 2802, a plurality of samples is received for performing automated malware analysis to generate log files based on the automated malware analysis. For example, the automated malware analysis can include dynamic and/or static analysis as similarly described above.

At 2804, the log files are processed to extract features associated with malware. For example, a feature extraction preprocessing stage can be performed as similarly described above.

At 2806, clustering the plurality of samples based on the extracted features using a decision tree clustering process is performed. For example, the disclosed decision tree clustering can be performed as similarly described above.

At 2808, clustering the plurality of samples based on the extracted features using a k-means++ clustering process is performed. For example, the disclosed k-means++ clustering can be performed as similarly described above.

At 2810, a tag extraction is performed based on the clustering output. For example, a new tag can be generated based on a newly identified malware family, an existing tag can be verified, and/or a bad feature list can be generated as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method, comprising:
    receiving a plurality of samples for performing automated malware analysis to generate log files based on the automated malware analysis;
    processing the log files to determine artifacts associated with malware, wherein a raw log file generated for each of the plurality of samples comprises one or more lines based on results of the automated malware analysis for each of the plurality of samples, and wherein processing the log files to determine artifacts associated with malware further comprises:
        processing the raw log files for each of the plurality of samples to generate processed log files, wherein each of the processed log files provides a human readable format of the automated malware analysis; and
        identifying distinct lines in each of the processed log files; and comparing the processed log files based on the automated malware analysis based on a threshold comparison of a textual representation of one or more artifacts;

determining whether any of the plurality of samples are similar based on comparing the processed log files based on the automated malware analysis; and performing an action based on determining that at least two samples are similar.

2. The method of claim 1, wherein the log files are processed to extract one or more artifacts and/or one or more high-risk artifacts associated with the log files.

3. The method of claim 1, wherein performing automated malware analysis includes performing a dynamic analysis.

4. The method of claim 1, wherein performing automated malware analysis includes performing a static analysis.

5. The method of claim 1, wherein a first processed log file for a first sample comprises one or more lines and one or more sub-lines based on the automated malware analysis results for the first sample.

6. The method of claim 1, further comprising:
processing the log files to extract high-risk artifacts associated with the log files.

7. The method of claim 1, further comprising:
determining whether a first malware sample is similar to any of the plurality of samples based on the artifacts.

8. A system, comprising:
a processor configured to:
receive a plurality of samples for performing automated malware analysis to generate log files based on the automated malware analysis;
process the log files to determine artifacts associated with malware, wherein a raw log file generated for each of the plurality of samples comprises one or more lines based on results of the automated malware analysis for each of the plurality of samples, and wherein process the log files to determine artifacts associated with malware further comprises:
process the raw log files for each of the plurality of samples to generate processed log files, wherein each of the processed log files provides a human readable format of the automated malware analysis; and
identify distinct lines in each of the processed log files; and
compare the processed log files based on the automated malware analysis;
determine whether any of the plurality of samples are similar based on comparing the processed log files based on the automated malware analysis based on a threshold comparison of a textual representation of one or more artifacts; and
perform an action based on determining that at least two samples are similar; and
a memory coupled to the processor and configured to provide the processor with instructions.

9. The system recited in claim 8, wherein the log files are processed to extract one or more artifacts and/or one or more high-risk artifacts associated with the log files.

10. The system recited in claim 8, wherein performing automated malware analysis includes performing a dynamic analysis.

11. The system recited in claim 8, wherein performing automated malware analysis includes performing a static analysis.

12. The system recited in claim 8, wherein a first processed log file for a first sample comprises one or more lines and one or more sub-lines based on the automated malware analysis results for the first sample.

13. The system recited in claim 8, wherein the processor is further configured to:
process the log files to extract high-risk artifacts associated with the log files.

14. The system recited in claim 8, wherein the processor is further configured to:
determine whether a first malware sample is similar to any of the plurality of samples based on the artifacts.

15. A computer program product, the computer program product being embodied in a non-transitory tangible computer readable storage medium and comprising computer instructions for:
receiving a plurality of samples for performing automated malware analysis to generate log files based on the automated malware analysis;
processing the log files to determine artifacts associated with malware, wherein a raw log file generated for each of the plurality of samples comprises one or more lines based on results of the automated malware analysis for each of the plurality of samples, and wherein processing the log files to determine artifacts associated with malware further comprises:
processing the raw log files for each of the plurality of samples to generate processed log files, wherein each of the processed log files provides a human readable format of the automated malware analysis; and
identifying distinct lines in each of the processed log files; and
comparing the processed log files based on the automated malware analysis based on a threshold comparison of a textual representation of one or more artifacts;
determining whether any of the plurality of samples are similar based on comparing the processed log files based on the automated malware analysis; and
performing an action based on determining that at least two samples are similar.

16. The computer program product recited in claim 15, wherein the log files are processed to extract one or more artifacts and/or one or more high-risk artifacts associated with the log files.

17. The computer program product recited in claim 15, wherein performing automated malware analysis includes performing a dynamic analysis.

18. The computer program product recited in claim 15, wherein performing automated malware analysis includes performing a static analysis.

19. The computer program product recited in claim 15, wherein a first processed log file for a first sample comprises one or more lines and one or more sub-lines based on the automated malware analysis results for the first sample.

20. The computer program product recited in claim 15, further comprising computer instructions for:
processing the log files to extract high-risk artifacts associated with the log files.

* * * * *

UNITED STATES PATENT AND TRADEMARK OFFICE
CERTIFICATE OF CORRECTION

PATENT NO. : 10,200,390 B2
APPLICATION NO. : 15/056980
DATED : February 5, 2019
INVENTOR(S) : Rostami-Hesarsorkh et al.

Page 1 of 1

It is certified that error appears in the above-identified patent and that said Letters Patent is hereby corrected as shown below:

In the Specification

In Column 14, Line 52, delete "(STEM)" and insert --(SIEM)--, therefor.
In Column 35, Line 31, delete "(STEM)" and insert --(SIEM)--, therefor.
In Column 47, Line 48, delete "(STEM)" and insert --(SIEM)--, therefor.
In Column 48, Line 53, delete "(STEM)" and insert --(SIEM)--, therefor.
In Column 52, Line 53, delete "(STEM)" and insert --(SIEM)--, therefor.
In Column 56, Line 52, delete "(STEM)" and insert --(SIEM)--, therefor.
In Column 60, Line 6, delete "(STEM)" and insert --(SIEM)--, therefor.

Signed and Sealed this
Eighteenth Day of June, 2019

Andrei Iancu
*Director of the United States Patent and Trademark Office*